(12) United States Patent
DeSantola et al.

(10) Patent No.: US 11,594,048 B2
(45) Date of Patent: Feb. 28, 2023

(54) IMAGE-BASED KITCHEN TRACKING SYSTEM WITH ANTICIPATORY PREPARATION MANAGEMENT

(71) Applicant: Agot Co., Pittsburgh, PA (US)

(72) Inventors: Evan DeSantola, Pittsburgh, PA (US); Alex Litzenberger, Pittsburgh, PA (US); Rassoul Mesbah, Aukland (NZ); Prashasti Sar, Pittsburgh, PA (US)

(73) Assignee: Agot Co., Pittsburgh, PA (US)

( * ) Notice: Subject to any disclaimer, the term of this patent is extended or adjusted under 35 U.S.C. 154(b) by 0 days.

(21) Appl. No.: 17/499,797

(22) Filed: Oct. 12, 2021

(65) Prior Publication Data

US 2022/0292288 A1 Sep. 15, 2022

Related U.S. Application Data

(60) Provisional application No. 63/160,668, filed on Mar. 12, 2021.

(51) Int. Cl.
*G06K 9/00* (2022.01)
*G06V 20/68* (2022.01)
(Continued)

(52) U.S. Cl.
CPC .............. *G06V 20/68* (2022.01); *G01B 11/22* (2013.01); *G01S 17/89* (2013.01); *G06F 3/0482* (2013.01);
(Continued)

(58) Field of Classification Search
CPC .. G06Q 50/12; G06Q 10/0875; G06Q 20/102; G06Q 20/42; G06N 20/00;
(Continued)

(56) References Cited

U.S. PATENT DOCUMENTS

| 9,324,070 B1 | 4/2016 | Bekmann et al. |
| 10,009,780 B2 | 6/2018 | Awiszus |

(Continued)

FOREIGN PATENT DOCUMENTS

| CA | 2851688 A1 | 11/2014 |
| EP | 2055146 B1 | 11/2013 |

OTHER PUBLICATIONS

Food Safety Conditions in Home-Kitchens: A Cross-Sectional Study in the Federal District/Brazil—2020.
(Continued)

*Primary Examiner* — Phuoc H Doan

(57) ABSTRACT

The subject matter of this specification can be implemented in, among other things, methods, systems, computer-readable storage medium. A method can include receiving, by a processing device, image data including one or more image frames indicative of a current state of a meal preparation area. The processing device determines a first quantity of a first ingredient disposed within a first container based on the image data. The processing device determines a meal preparation procedure associated with the first ingredient based on the first quantity. The processing device causes a notification indicative of the meal preparation procedure to be displayed on a graphical user interface (GUI).

19 Claims, 15 Drawing Sheets

(51) Int. Cl.
| | |
|---|---|
| *G06Q 50/12* | (2012.01) |
| *G06V 10/764* | (2022.01) |
| *G06V 20/00* | (2022.01) |
| *G06T 7/70* | (2017.01) |
| *G06V 20/52* | (2022.01) |
| *G06Q 10/0631* | (2023.01) |
| *G06V 10/70* | (2022.01) |
| *G06T 7/20* | (2017.01) |
| *H04N 5/247* | (2006.01) |
| *H04N 7/18* | (2006.01) |
| *G06N 20/00* | (2019.01) |
| *G06V 20/20* | (2022.01) |
| *G06V 20/64* | (2022.01) |
| *G06F 3/0482* | (2013.01) |
| *G06K 9/62* | (2022.01) |
| *G06T 7/11* | (2017.01) |
| *G01B 11/22* | (2006.01) |
| *G01S 17/89* | (2020.01) |
| *G06Q 20/20* | (2012.01) |

(52) U.S. Cl.
CPC .......... *G06K 9/6256* (2013.01); *G06N 20/00* (2019.01); *G06Q 10/063112* (2013.01); *G06Q 20/20* (2013.01); *G06Q 50/12* (2013.01); *G06T 7/11* (2017.01); *G06T 7/20* (2013.01); *G06T 7/70* (2017.01); *G06V 10/70* (2022.01); *G06V 10/765* (2022.01); *G06V 20/20* (2022.01); *G06V 20/36* (2022.01); *G06V 20/52* (2022.01); *G06V 20/64* (2022.01); *H04N 5/247* (2013.01); *H04N 7/18* (2013.01); *G06T 2200/24* (2013.01); *G06T 2207/10028* (2013.01); *G06T 2207/20081* (2013.01); *G06T 2207/30232* (2013.01); *G06V 2201/08* (2022.01)

(58) Field of Classification Search
CPC .... G05B 15/02; H05B 6/6464; G08B 21/245; H04L 12/2829; H04L 12/2834; H04L 12/2812
USPC .............................................. 382/103; 703/6
See application file for complete search history.

(56) References Cited

U.S. PATENT DOCUMENTS

| | | | |
|---|---|---|---|
| 10,140,602 B2 | 11/2018 | Kelly et al. | |
| 10,185,928 B2 | 1/2019 | Quezada | |
| 10,252,419 B2 | 4/2019 | Fritz et al. | |
| 10,289,989 B2 | 5/2019 | Kelly et al. | |
| 10,304,147 B2 | 5/2019 | Kelly et al. | |
| 10,387,945 B2 | 8/2019 | Burry et al. | |
| 10,467,559 B1 | 11/2019 | Svenson et al. | |
| 10,600,041 B2 | 3/2020 | Kelly et al. | |
| 10,860,995 B2 | 12/2020 | Kelly et al. | |
| 11,200,575 B2 | 12/2021 | Seo et al. | |
| 11,228,700 B2 | 1/2022 | Rajhansa et al. | |
| 11,285,878 B2 | 3/2022 | Sigle | |
| 11,345,040 B2 | 5/2022 | Oleynik | |
| 2006/0213904 A1 | 9/2006 | Kates | |
| 2007/0150371 A1 | 6/2007 | Gangji | |
| 2008/0178749 A1 | 7/2008 | Stutman | |
| 2010/0274633 A1 | 10/2010 | Scrivano et al. | |
| 2011/0075192 A1 | 3/2011 | Kumamoto | |
| 2015/0086179 A1 | 3/2015 | Hurst et al. | |
| 2015/0088594 A1 | 3/2015 | Hurst et al. | |
| 2015/0220935 A1 | 8/2015 | Iwai | |
| 2015/0228062 A1 | 8/2015 | Joshi et al. | |
| 2015/0356668 A1 | 12/2015 | L'Heureux et al. | |
| 2016/0180381 A1 | 6/2016 | Kaiser et al. | |
| 2017/0221296 A1 | 8/2017 | Jain et al. | |
| 2017/0323370 A1 | 11/2017 | Burry et al. | |
| 2018/0196403 A1 | 7/2018 | Lagares-Greenblatt et al. | |
| 2018/0324908 A1 | 11/2018 | Denker et al. | |
| 2019/0291277 A1 | 9/2019 | Oleynik | |
| 2020/0019861 A1 | 1/2020 | Jeong | |
| 2020/0028619 A1 | 1/2020 | Maevskii et al. | |
| 2020/0043156 A1 | 2/2020 | Fox et al. | |
| 2020/0159750 A1 | 5/2020 | Shadrokh et al. | |
| 2020/0175564 A1 | 6/2020 | Kulasooriya | |
| 2020/0175673 A1 | 6/2020 | Wen et al. | |
| 2020/0202462 A1 | 6/2020 | Muyskens | |
| 2020/0249660 A1 | 8/2020 | Rao et al. | |
| 2020/0286192 A1 | 9/2020 | Roy et al. | |
| 2020/0294018 A1 | 9/2020 | Wolter | |
| 2020/0334628 A1 | 10/2020 | Goldberg et al. | |
| 2020/0351557 A1 | 11/2020 | Drake | |
| 2020/0363778 A1* | 11/2020 | Mahapatra | H05B 6/6464 |
| 2021/0022559 A1 | 1/2021 | Zito et al. | |
| 2021/0027485 A1 | 1/2021 | Zhang | |
| 2021/0192329 A1 | 6/2021 | Shin et al. | |
| 2021/0248637 A1 | 8/2021 | Ramos et al. | |
| 2021/0251263 A1 | 8/2021 | Knightson et al. | |
| 2021/0366033 A1 | 11/2021 | Yamamoto et al. | |
| 2021/0374430 A1 | 12/2021 | Siemer et al. | |
| 2021/0383302 A1 | 12/2021 | Covell et al. | |
| 2022/0012801 A1 | 1/2022 | Maddalo et al. | |

OTHER PUBLICATIONS

Design of a Kitchen-Monitoring an dDecision-Making System to Support AAL Applications—2021.

* cited by examiner

IMAGE-BASED KITCHEN TRACKING SYSTEM WITH ANTICIPATORY PREPARATION MANAGEMENT

RELATED APPLICATIONS

The present application claims the benefit under 35 U.S.C. § 119(e) of U.S. Provisional Patent Application No. 63/160,668 filed Mar. 12, 2021, which is incorporated by reference herein. This application is also related to U.S. patent application Ser. No. 17/499,795 filed Oct. 12, 2021, entitled "Image-Based Kitchen Tracking System with Order Accuracy Management," and is also related to U.S. patent application Ser. No. 17/542,251 filed Dec. 3, 2021, entitled "Image-Based Drive-Thru Management System," and is also related to U.S. patent application Ser. No. 17/690,537 filed Mar. 9, 2022, entitled "Image-Based Kitchen Tracking System with Dynamic Labeling Management" and is also related to U.S. patent application Ser. No. 17/690,539 filed Mar. 9, 2022, entitled "Image-Based Kitchen Tracking System with Metric Management and Kitchen Display System (KDS) Integration."

TECHNICAL FIELD

The instant specification generally relates to monitoring a kitchen and/or drive-thru of a restaurant. More specifically, the instant specification relates to using image acquisition, data processing, and machine learning to produce a representation of the state of the restaurant and to manage order accuracy based on the state of the restaurant.

BACKGROUND

Restaurants, or eateries, are businesses that prepare and serve meals (e.g., food and/or drinks) to customers. Meals can be served and eaten on-site of a restaurant, however some restaurants offer a take-out (e.g., such as by implementing a drive-thru) and/or food delivery services. Restaurant food preparation can involve developing systems for taking orders, cooking, and/or serving a collection of items typically organized on a menu. Some food preparation systems involve preparing some ingredients in advance (e.g., cooking sauces and/or chopping vegetables), and completing the final steps when a customer orders an item (e.g., assembly of an order). Menu items are often associated with a series of preparation steps that involve ingredients and actions to be performed in association with those ingredients (e.g., cook a hamburger or apply salt to the French fries). Food preparation systems can depend on knowing precisely how long it takes to prepare each menu item and planning tasks so that the menu items are prepared efficiently and accurately.

SUMMARY

In some embodiments, a method can include receiving, by a processing device, image data comprises one or more image frames indicative of a current state of a meal preparation area. The processing device determines one of a meal preparation item or a meal preparation action associated with the state of the kitchen based on the image data. The processing device receives order data comprising one or more pending meal orders. The processing device determines an order preparation error based on the order data and at least one of the meal preparation item or the meal preparation action. The processing device causes the order preparation error to be displayed on a graphical user interface (GUI).

In some embodiments, a system includes a first camera to capture image data comprised of one or more image frames of a first field of view of a meal preparation area. The system may further include a memory and a processing device coupled to the memory. The processing device may receive, from the first camera, the image data. The processing device may determine one of a meal preparation item or a meal preparation action associated with a current state of the meal preparation area based on the image data. The processing device may determine an order preparation error based on the order data and at least one of the meal preparation item or the meal preparation action. The processing device may cause the order preparation error to be displayed on a graphical user interface (GUI).

In some embodiments, a method for training a machine learning model to identify meal preparation items or meal preparation actions from image data that includes one or more image frames indicative of a current state of a meal preparation area may include generating, by a computing device, training data for the machine learning model, wherein generating the training data includes, identifying, by the computing device, a first training input having first image data indicative of a first state of the meal preparation area. The computing device may further identify a first target output for the first training input. The first target output may include at least one of a first meal preparation item or a meal preparation action associated with the first image data. The computing device may further provide the training data to the machine learning model on (i) a set of training inputs including the first training input and (ii) a set of target outputs including the first target output. The trained machine learning model is trained to receive a new input including new image data and to produce a new output based on the new input, the new output indicating at least one of a new meal preparation item or a new meal preparation action associated with the new image data.

In some embodiments, a method includes receiving, by a processing device, image data including one or more image frames indicative of a state of a meal preparation area. The processing device determines a first quantity of a first ingredient disposed within a first container based on the image data. The processing device determines a meal preparation procedure associated with the first ingredient based on the first quantity. The processing device causes a notification indicative of the meal preparation procedure to be displayed on a graphical user interface (GUI).

In some embodiments, a system includes a first camera to capture image data including one or more image frames of a first field of view of a meal preparation area. The one or more image frames may be indicative of a current state of the meal preparation area. The system may include a memory and a processing device coupled to the memory. The processing device may receive the image data from the first camera. The processing device may determine a first quantity of a first ingredient disposed within a first container based on the image data. The processing device may determine a meal preparation procedure associated with the first ingredient based on the first quantity. The processing device may cause an indication associated with the meal preparation procedure to be displayed on a graphical user interface (GUI).

In some embodiments a method includes receiving by a processing device from a depth sensor, ranging data indicative of a current state of a meal preparation area. The processing device determines a first quantity of a first ingredient disposed within a first container based on the ranging data. The processing device determines a meal preparation procedure associated with the first ingredient based on the first quantity. The processing device causes a notification indicative of the meal preparation procedure to be displayed on a graphical user interface (GUI).

BRIEF DESCRIPTION OF THE DRAWINGS

Aspects and implementations of the present disclosure will be understood more fully from the detailed description given below and from the accompanying drawings, which are intended to illustrate aspects and implementations by way of example and not limitation.

DETAILED DESCRIPTION

Figure 1:
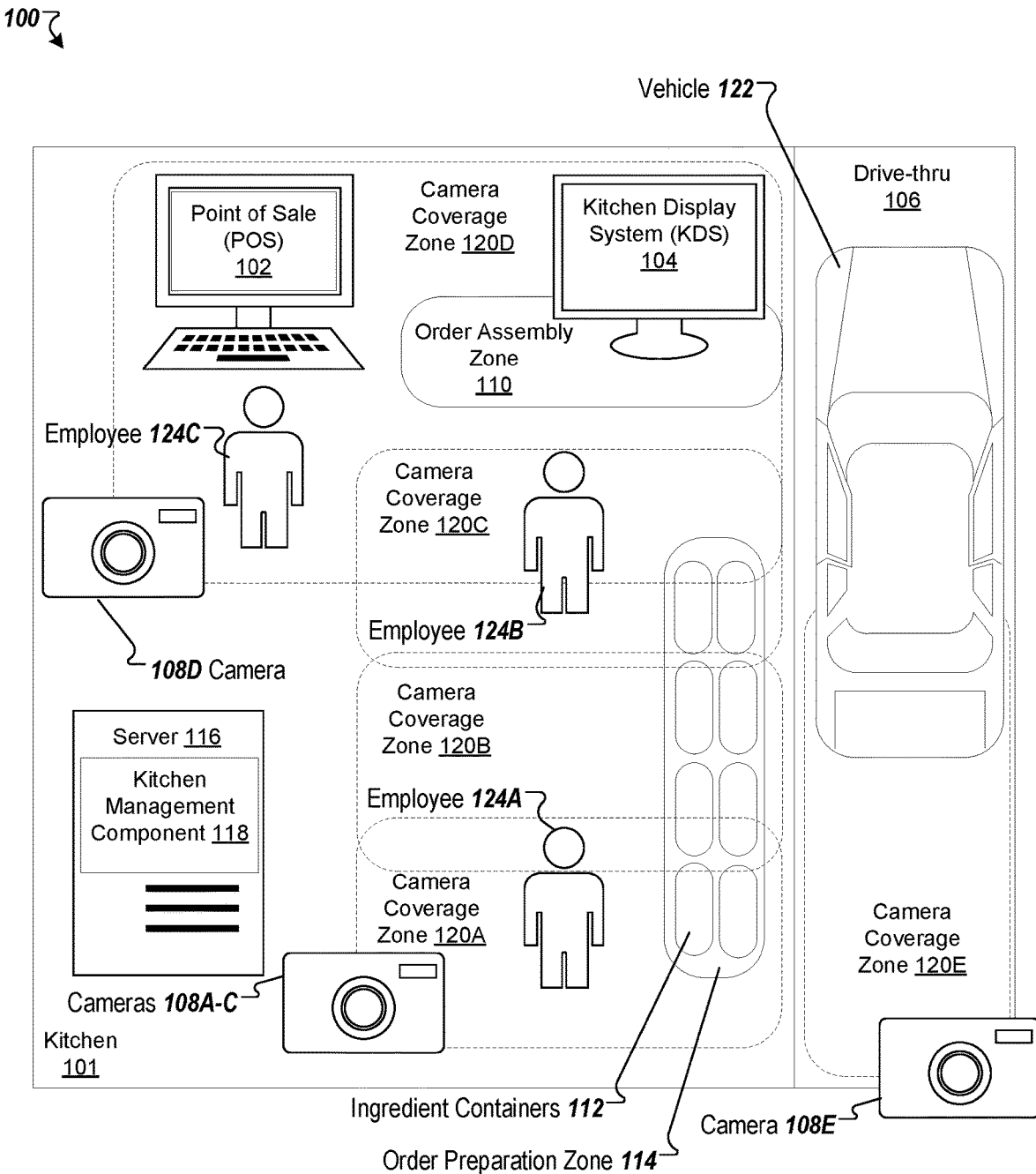
FIG. 1 depicts an image-based kitchen tracking system, in which implementations of the disclosure may operate.

The growing digitization of live operation data in restaurants has led to increased tracking, analysis, and prediction of future data (e.g., future sales data). The increasing digitization of restaurant data has led to an increasing use of digital point of sale (POS) systems, where data is digitized and processed for sales analysis. Conventional POS systems often track orders as they come in and communicate to a display (e.g., a kitchen display system (KDS)) order data (e.g., a queue of upcoming orders) and can communicate with a kitchen interface (e.g., a "bump bar") to receive inputs from users (e.g., employees, chefs, etc.) to update the order data (e.g., advance order queue, delete and order, mark as completed and/or partially completed, etc.).

Advancements in digital technology like POS systems have further increased the efficiency of restaurant preparations operations. However, even in the presence of digital technology, like POS systems, restaurants run the risk of delivering inaccurate orders (e.g., incorrect and/or incomplete orders), late orders, and/or otherwise deficient orders. The deficient orders may be caused by various rationale, for example, employee mistakes when preparing an order, lack of inventory for a given menu item, delays in preparing ingredients used for a given menu item, and/or the like. Identifying the reasons for erroneous orders can be time consuming and inefficient. However, if left uncorrected orders may continue to be prepared incorrectly, which can lead to customer dissatisfaction. Restaurants often take remedial action (e.g., complimentary items, refunds, remaking menu items, etc.) responsive to deficient orders; however, these actions come at a cost to the restaurant. Additionally, there may exist other restaurant procedures that can be updated and/or improved that may result in increased order accuracy and/or efficiency. However, identifying these updates and/or improvements can be difficult and costly.

Aspects and implementations of the present disclosure address these and other shortcomings of the existing technology by providing methods and systems for monitoring a state of a kitchen and/or drive-thru of a restaurant. The present disclosure includes cameras designed to capture images of the kitchen disposed throughout a food preparation area, ordering area, and/or order delivery area (e.g., a drive-thru). The cameras are configured to acquire image-based data of the restaurant in one or more of the various areas previously described. The image data received from the cameras can be processed (e.g., in a distributed fashion) through models (e.g., machine learning models) associated with one or more of performing object detection, action recognition, tracking, volumetric estimation, and/or geometric methods.

The results from the processing models can be post processed into various useful data points such as, for example, action times (e.g., what time was chicken added to a taco), durations (e.g., how long was the chicken being breaded), locations (e.g., which preparation station), meal assembly tracking (i.e., understanding what is in what meal at a given time), and bin fill levels. These data points can be consumed by individual applications or subsystems, which may combine multiple types of data points (e.g., action times and locations). For example an order accuracy subsystem may consume meal assembly tracking data points, while a drive-thru management subsystem may consume data regarding what is currently available in the kitchen, what is being actively prepped, the number of cars in the drive-thru line, and data about average preparation times.

The outputs based on processing of the image data can be consumed in a number of ways to assist with live correction of order accuracy. In an exemplary embodiment, a processing system can consume outputs using an order accuracy tool that is designed to improve accuracy of orders. In some embodiments, the outputs may be used to determine inaccurate ingredients, missing order items, incorrect packaging, incorrect numbers of items, incorrect quantity of items, and the like. In an exemplary embodiment, the outputs may be consumed by an anticipatory prep system that is designed to provide indications regarding which ingredients should be prepared and when. For example, a state of the kitchen such as inventory analysis (e.g., to determine whether a restaurant is running low on a prepared ingredient) may be performed and compared against a current and/or predicted volume of orders coming in.

In an exemplary embodiment, a drive-thru routing tool that coordinates routing of vehicles in a drive-thru may consume the one or more outputs of one or more trained ML models. For example, the drive-thru routing tool may consume data associated with the state of items currently available in the kitchen. The system may prompt an employee to direct a car to a waiting bay or alternate route for delivery of an order.

In an exemplary embodiment, a gamification tool may consume an output of processing the image data. Conventional tracking of employee metrics may be limited to drive-thru throughput. However, more detailed and targeted metrics can be obtained from the processed image-data to promote efficiency and order accuracy through incentives or remedial action. This targeted data can allow for targeted improvement at a cheaper cost than that of a full-scale incentive and/or remedial action program.

Aspects of the present disclosure provide various technological advantages and improvements over conventional systems. As previously outlined, the kitchen management system can structure kitchen operation video into data that is consumable by a number of applications. This data can be presented to employees to improve the efficiency of the restaurant and improve metrics such as order accuracy, preparation speed, mean drive-thru time, and the like. For in-store interactive solutions, data can be presented to in-store employees through the existing Kitchen Display System (KDS). Targeted corrections and/or improvement may increase the efficiency of a restaurant as well as provide additional details that can be used for post-mortem analysis for larger restaurant operational decisions and changes. The system further can provide live corrections to prevent erroneous orders from being filled.

FIG. 1 depicts a kitchen tracking system 100, in which implementations of the disclosure may operate. As shown in FIG. 1, the kitchen tracking system 100 may be associated with a kitchen 101 and/or a drive-thru 106. The kitchen 101 may include an order preparation zone 114 where food and/or drinks are prepared. For example, the order preparation zone 114 may include food preparation equipment such as ovens, mixers, ingredient containers 112, and the like. The food and/or drinks can be associated with an order that includes a collection of food and/or drinks to be prepared. The kitchen may include an order assembly zone 110 where orders are to be assembled. In some embodiments, the order assembly zone 110 is designed to assemble prepared food and/or drinks that was prepared at the order preparation zone 114.

The kitchen tracking system may include one or more cameras 108A-E capable of capturing images of the kitchen 101 and/or drive-thru 106. The cameras 108A-E may be associated with camera coverage zones 120A-E within the kitchen 101 and/or drive-thru 106. The cameras 108A-E may include video cameras. For example, the cameras 108A-E may include closed-circuit televisions (CCTV) cameras. In some embodiments, one or more of the cameras may include depth sensors such as using a light detection and ranging (LIDAR) camera.

One or more of the cameras 108A-E may be disposed overhead to capture images of the kitchen from a downward looking perspective. One or more of the cameras 108A-E may capture images associated with the state of the kitchen. For example, the cameras may capture employees 124A-C performing food preparation, assembly, and/or delivery functions. In some embodiments, the cameras 108A-E may be associated with camera coverage zones 120A-E. In some embodiments, at least some of the camera coverage zones 120A-E overlap.

As shown in FIG. 1, the kitchen tracking system 100 may include a point of sale (POS) system 102. The POS system 102 may include one or more devices that carry out day-to-day restaurant operations and functionality. For example, the POS system 102 may include an order input device such as a computer and/or register used to enter data associated with upcoming orders. In some embodiments, the POS system 102 includes information associated with each of the menu items. For example, POS system 102 may include ingredient lists, preparation and assembly instructions, prices, and the like for one or more menu items.

As shown in FIG. 1, the kitchen tracking system 100 may include a kitchen display system (KDS) 104. The kitchen display system 104 may be integrated with or otherwise communicate with POS system 102. The KDS 104 can be designed to display kitchen data such as upcoming order, status of currently/partially prepared orders, and/or other kitchen data received from the POS system 102 and/or the kitchen management component 118. In some embodiments, multiple KDS's 104 are used. For example, a KDS 104 may be assigned to a given food preparation station and may display data indicative of order statuses and/or preparation steps associated with a given food preparation stations. For example, the KDS 104 may be associated with an order assembly station and/or display data indicative of what packaging should be used to assemble the order.

As shown in FIG. 1, the kitchen tracking system 100 may include a server 116 with a kitchen management component 118. The kitchen server may receive image-based data from one or more of cameras 108A-E associated with the state of the kitchen. The kitchen management component 118 may include instructions that cause a processor to perform image-processing methodology, as described herein.

In some embodiments, the kitchen management component 118 can perform one or more order accuracy functions. The kitchen management component 118 may receive image data associated with upcoming orders and order data from the POS system 102. The kitchen management component 118 may process the image data to determine inaccuracies in the order preparation. For example, inaccuracies can include inaccurate ingredients (e.g., missing an ingredient or too much or too little of an ingredient), incorrect item (e.g., incorrect drink), inaccurate packaging (e.g., used a packaging for a menu item when a second menu item packaging should be used), incorrect number of items (e.g., five pieces of chicken when an order calls for four pieces of chicken), missing miscellaneous item (e.g., missing sauce packets, utensils, etc.), incorrect quantity of an item (e.g., too little or too much special sauce), and/or missing or incorrect sets of items in a completed order (e.g., missing or incorrect items in a combination menu item).

In some embodiments, the kitchen management component 118 may determine and/or detect inaccuracies in order preparation and alert one or more employees 124A-C through an auditory and/or visual indicator. For example the kitchen management component 118 may send data indicative of the error to the KDS 104 to be displayed to employees 124A-C.

The employees 124A-C can check the flagged instance of order inaccuracy and/or improper use of the kitchen tracking system 100 and either rectify the inaccuracy or otherwise indicate (e.g., using an input on the KDS 104) that the determined order inaccuracy was incorrect. In the case in which there is no inaccuracy, either on the part of the system or in the preparation, no intervention is made and the meal preparation process proceeds as it would in the absence of the flagged error. In the case of a kitchen management component 118 inaccuracy, the data from the instance of detected inaccuracy may then be used to further train the kitchen management component 118 and associated data processing models. For example, the kitchen management component 118 may perform functionality that includes creating labels that can be used to retrain the system to further improve the kitchen management component's 118 accuracy. In another example, the kitchen management component 118 may generate tags for new food items or limited time offers that the kitchen management component 118 has now seen before.

In the case of an order inaccuracy being correctly determined, the KDS 104 can provide further information associated with rectifying the order accuracy. For example, the KDS 104 may display the changes needed (or course of action to be taken) in order to rectify the mistake or a list of possible alternatives from the POS associated with the menu item that was made incorrectly. In some embodiments, an intervention can be made to preempt any potential order inaccuracy. For example, an intervention can be applied before the incorrectly scooped ingredient is placed on a meal, potentially saving the ingredient and meal from being wasted and/or having to be remade.

In some embodiments, the kitchen management component 118 can perform one or more anticipatory preparation functions. For example, the kitchen management may indicate (e.g., through the KDS 104) to the employees 124A-C which items the system anticipates should be prepared and when. The kitchen management component 118 may include one or more models, as will be discussed later, that process image data received from cameras 108A-E to determine factors indicative of future preparation times (e.g., state of the kitchen, customer ingress (e.g., vehicles 122 in drive-thru and customers in line to order), delivery drivers available or soon to be available, and other factors indicative of the states of the kitchen.

In some embodiments, as mentioned previously, one or more cameras include LIDAR cameras capable of acquiring depth data. The kitchen management component 118 can receive image-depth including depth data and recognize and distinguish between different dishes and/or meal items in a restaurant. In some embodiments, the kitchen management component 118 can determine how much product is left in a given container 112. In some embodiments, the kitchen management component can track how long a product has been in the container 112. In some embodiments, the kitchen management component 118 can track when containers are replaced and/or relocated and determine when new inventory needs to be prepared.

In some embodiments, the kitchen management component 118 can perform one or more drive-thru management functions. As shown in FIG. 1, one or more cameras (e.g., camera 108C) may include a camera coverage zone 120C associated with the drive-thru 106. The kitchen management component 118 may combine data indicative of the state of the kitchen 101, as previously described, with data indicative of the drive-thru (e.g., vehicle 122 ingress, current wait times, etc.). The kitchen management component 118 may determine how to route vehicles (e.g., to most efficiently service each order). One or more alternative drive-thru routes may be used, such as a waiting bay for vehicles associated with orders that are determined to be filled after a wait time that is above a threshold wait time. For example, the kitchen management component may determine that a first meal item (e.g., French fries) are low in stock and will need extra time to prepare. This increased wait time may be flagged by the kitchen management component (e.g., through the KDS 104) and an employee may instruct a vehicle to a waiting bay which may allow a queue of vehicles to continue while the vehicle is in the waiting bay until the associated order is filled. Some restaurants that use a single food delivery window for the drive-thru may make use of a waiting bay and/or parking spot designed as an alternate delivery method for longer orders.

In some embodiments, the kitchen management component 118 can perform one or more kitchen gamification functions. The kitchen management component 118 may process image data from cameras 104A-C to evaluate and determine metrics associated with the state of the kitchen. For example, the kitchen management component 118 can determine preparation times for various meal items, preparation times for a given preparation station, order fill times, ingredient preparation times, and so on. The image data can be processed to determine more granular metrics that can be used as a form of gamification and/or incentive system. The system can evaluate various granular efficiencies for a given employee (e.g., time to prepare a meal item, time to take an order, time to deliver orders, accuracy of order preparation, amount of waste attributed to an employee, and so on). The kitchen management component 118 may use a scoring system that evaluates individual employees, shifts, menu items, ingredient preparation, and the like.

As noted in some embodiments, the outputs generated based on processing the image data by the kitchen management component 118 may be consumed and/or utilized in a live environment such as to correct orders and inaccuracies as they arise. In other embodiments, the kitchen management component 118 may process images to generate data to be consumed post-mortem or after the system has run for a period of time. For example, analytics data on drive-thru queue time may be evaluated. In another example, analytics data on average pacing of employees per shift for specific actions (e.g., pacing chicken preparation) may be evaluated. Such data can be used in time-sliceable aggregate analytics (e.g., how long did employees spend prepping dough on Monday between 9 am and 11 am). Pacing and accuracy data may be used to improve throughput, employee accountability, and operational efficiency.

Figure 2:
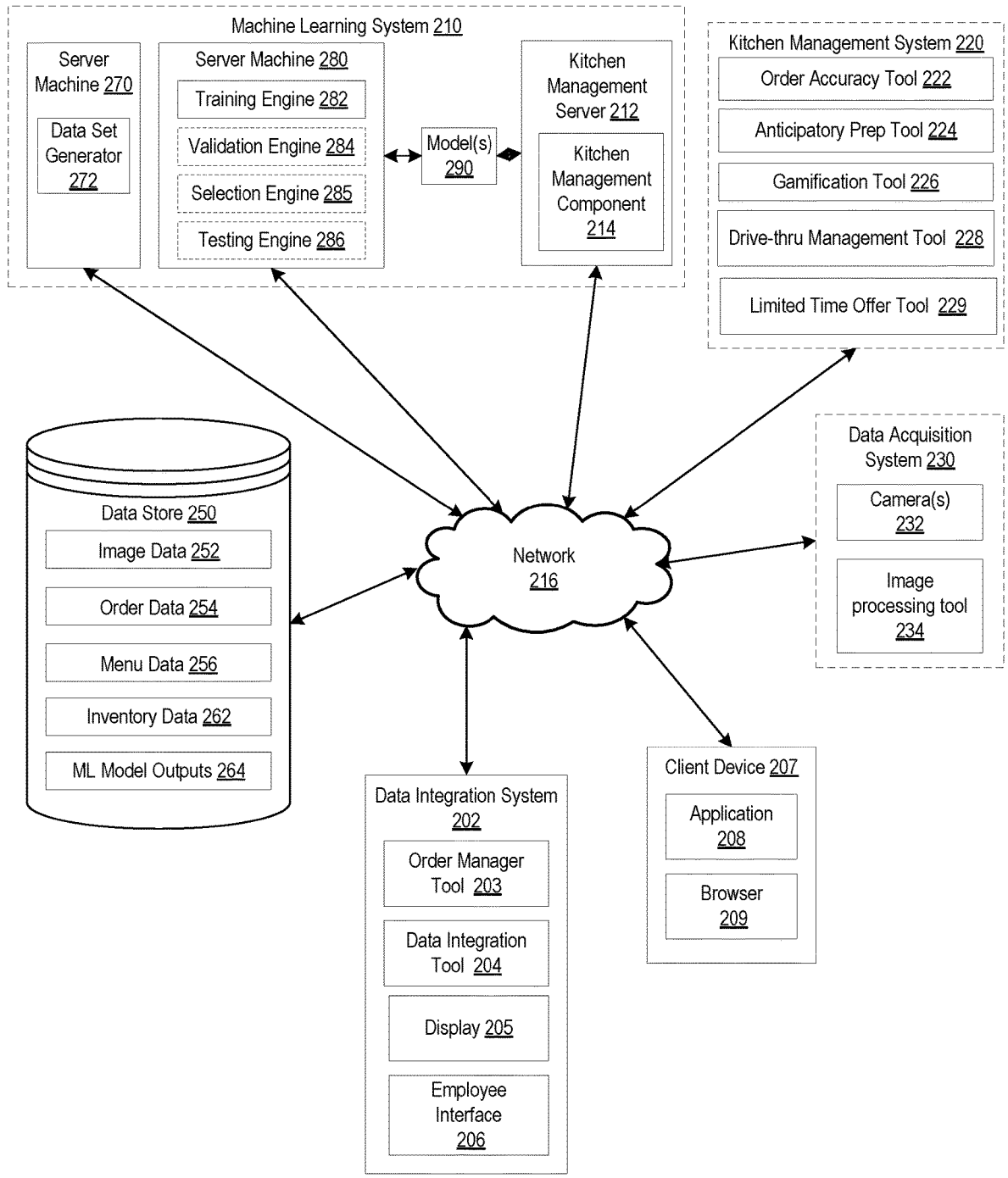
FIG. 2 is a block diagram illustrating an exemplary data acquisition system architecture in which implementations of the disclosure may operate.

FIG. 2 is a block diagram illustrating an exemplary system architecture of system 200, according to certain embodiments. The system 200 includes a data integration system 202, a client device 207, a kitchen management system 220, a data acquisition system 230, a kitchen management server 212, and a data store 250. The kitchen management server 212 may be part of a machine learning system 210. Kitchen management server 212 may correspond to server 116 of FIG. 1 in embodiments. The machine learning system 210 may further include server machines 270 and 280.

The data acquisition system 230 may include one or more data acquisition devices, such as camera(s) 232. The one or more camera(s) 232 may include closed-circuit television (CCTV) cameras, light detect and ranging (LIDAR) enabled cameras, and/or other image acquisition devices. The cameras may be disposed through a kitchen preparation area, a customer ordering area, and/or an order delivery area (e.g., a drive-thru). The camera may provide a continuous stream of images associated with food preparation and delivery. The cameras may be disposed in an orientation and/or configuration to overlap image acquisition areas. For example, a first image capture area of a first camera may also be partially captured by a second camera. The data may be spliced and/or further processed and analyzed together, as will be discussed in other embodiments. The image-processing tool 234 may include processing logic that receives image based data acquired by the camera(s) 232 and performs a feature extraction to identify features (e.g., inventory data, recipe data, current order performance, etc.) associated with the state of the kitchen. As will be discussed in more detail below, the image-processing tool 234 may employ one or more machine learning models (e.g., using machine learning system 210) to perform the feature extraction.

The data integration system 202 includes one or more of a server, client devices, and/or data stores housing operational data and/or processing instructions associated with a restaurant's operations (e.g., a restaurant's operations system (e.g., a point of sale (POS) system 102 of FIG. 1) server. The data integration system 202 may include an order manager tool 203 that manages a menu and collection of upcoming orders. In some embodiments, the order manager tool 203 maintains data associated with upcoming orders (e.g., a list of upcoming orders). The order manager tool 203 may also include menu recipe data. For example, each menu item may be broken down to individual menu items (e.g., combinations of items such as an entrée and a beverage) and recipe items (e.g., a hamburger may include buns, meat, vegetables, condiments, etc.). The order manager tool 203 may further include additional data associated with the preparation, cooking, and/or assembly of menu items (e.g., cooking duration, quantity of a first ingredient, packaging instructions, etc.)

The data integration system 202 may include a data integration tool 204 that includes hardware and/or processing logic associated with connecting and communicating with external devices. For example, the data integration tool 204 may include an application programming interface (API) configured to connect with the kitchen management system 220 and transmit data (e.g., data associated with the order manager tool 203) between the systems (e.g., using network 216).

The data integration system 204 may include a display 205 (e.g., a kitchen display system (KDS)). Display 205 may communicate and/or otherwise work with order manager tool 203 to display upcoming orders and associated menu items and recipes for the upcoming orders. In some embodiments, multiple displays 205 are used. For example, a display 205 may be associated with a particular station (e.g., cooking station, assembly station, etc.) and order steps associated with that particular station are displayed. In some embodiments, the data integration system 202 further includes an employee interface 206. The employee interface may include data input devices (e.g., buttons, keyboards, touch screens) capable of applying an input to the data integration system 204. For example, an employee at a particular station may press a button when a portion of a recipe associated with that particular station is completed for an associated order. The interface 206 may communicate or otherwise work with the display 205 to advance orders as they are completed. In some embodiments, additional data may be received from employees through interface 206 such as deleting orders, flagging orders, completing orders, modifying orders, and so on.

In some embodiments, the display 205 may present a current status of a pending meal order. For example, a meal order may include a set of meal items. During preparation of the meal order one or more of the meal items of the set of meal items may be completed before other items and a status indicative of partial completion of the set may be displayed in association with the completed items (e.g., by affirmatively indicating one or more tasks as completed) and/or the incomplete item (e.g., by providing an indications of the tasks needed to be performed to complete a pending meal order).

In some embodiments, the display 205 may present the orders in a priority order. The order may be based on a temporal association between the orders (e.g., oldest order is displayed with the highest priority (i.e., first on the list)). In some embodiments, the employee interface may receive input that alters a current display state of the pending meal orders on the display 205. The employee interface 206 may receive input (e.g., from an employee) associated with an order. For example, the employee interface may receive an input that a first preparation stage of a meal item has been completed and can update a status of a pending meal order based on the received input by the employee interface 206. The employee interface 206 may receive input associated with altering a priority of one or more pending meal orders presented on the display 205 of the data integration system 202. For example, a sequence of pending meal orders may be adjusted based on input received by the employee interface 206. The display may update a state and/or manner of display based on an input received by the employee interface 206. For example, the display 205 may present one or more tasks remaining to complete an order and can update the list of remaining tasks based on the input received by the employee interface 206.

The client device 207 may be or include any personal computers (PCs), laptops, mobile phones, tablet computers, netbook computers, network connected televisions ("smart TV"), network-connected media players (e.g., Blue-ray player), a set-top-box, over-the-top (OOT) streaming devices, operator boxes, etc. The client device 207 may include a browser 209, an application 208, and/or other tools as described and performed by other system of the system architecture 200. In some embodiments, the client device 207 may be capable of accessing the data integration system 202, the data acquisition system 230, the kitchen management system 220, machine learning system 210, and data store 250 and communicating (e.g., transmitting and/or receiving) data associated with the state of the kitchen. For example, data from kitchen management system may be transmitted to client device 207 for displaying, editing, and/or further processing. Client device 207 may include an operating system that allows users to one or more of generate, view, or edit data (e.g., data stored in data store 250).

The kitchen management system 220 may include an order accuracy tool 222, an anticipatory prep tool 224, a gamification tool 226, a drive-thru management tool 228, and/or a limited time offer tool 229. The order accuracy tool 222 may receive output data generated based on processing of image data such as detected objects and order data, such as data managed by order manager tool 203 and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, the order accuracy tool 222 may communicate with the display 205 of the data integration system 202 to display a visual indication of the error. In another example, the data integration system may include an auditory device (e.g., a speaker) that may indicate the error to an employee through an auditory alert.

In some embodiments, the order accuracy tool 222 may include a tracking tool that uses data from multiple processed images to detect and follow an order, as it is prepared. For example, the tracking tool may follow and order and store the last action performed on an order to ensure an order is prepared properly. In some embodiments, the order accuracy tool 222 determines compound actions based on the image data 252.

The anticipatory prep tool 224 may receive ML model outputs 264 associated with objects detected (ingredients, menu items, packaging, etc.). The detected objects may be associated with a current inventory of the kitchen. For example, the image data 252 may be processed to determine how much of a given ingredient is available. The kitchen data may be monitored over a period of time and a model may be generated to predict when more of a given ingredient needs to be prepared. For example, the rate of consumption of a first ingredient (e.g., grilled chicken) will be monitored over a series of outputs generated based on processing image data. The anticipatory prep tool 224 may include a model that predicts, based on the image data 252 and/or ML model outputs 264, future preparation times and quantities. For example, to ensure a restaurant has a given ingredient available, the anticipatory prep tool 224 may indicate to an employee a future prep time and/or quantity of the given ingredient.

The gamification tool 226 includes methodology and subsystems that provide targeted, specific metrics associated with a restaurant's food preparation and delivery services. In some embodiments, image data is processed to determine preparation times of given employees, menu items, and/or preparations steps. The gamification tool 226 may determine preparation and/or delivery times of individual employees, shifts, stations, and/or menu items. For example, conventional systems may rely on sales data or start to end inventory changes. However, the gamification tool 226 may provide for more granular metric measurements such as those metrics previously described. The gamification tool 226 may then provide incentives to increase one or more metrics for individuals, shifts, restaurants, and so on. The incentives may be tailored to specific metrics that may have values lagging expected and/or target values for those metrics.

The drive-thru management tool 228 may receive outputs generated based on processing image data, the outputs associated with a state of the kitchen and/or drive-thru of a restaurant. For example, the drive-thru management tool 228 may receive data indicative of current availability of items in the kitchen (e.g., inventory analysis). The system may track the order fill rate, monitor wait time of the vehicles in the drive-thru, and make a determination that a given vehicle associated with an order should be rerouted to an alternative delivery procedure. For example, a vehicle may be directed to a waiting bay if the drive-thru management tool determines a wait time for an order associated with the vehicle is above a threshold value. Additionally or alternatively, the drive-thru management tool 228 may make determination of whether to offer a promotion or attempt an up sale procedure based on the state of the drive-thru and/or visual features of a vehicle disposed within the vehicle (e.g., make/model of the vehicle).

The limited time offer tool 229 may receive one or more outputs generated based on processing image data, where the outputs may be associated with object detection. A large amount of the detected objects may be associated with an item identified by the data integration system 202 (e.g., through the order manager tool 203). However, in some cases, a restaurant may introduce new recipes, menu items, ingredients, etc. Conventional machine learning systems often require extensive retraining in order to perform novel object detection. However, the limited time offer tool 229 may perform clustering of image process data to determine multiple instances of an undetectable object. Based on the clustering of image process data, the limited time offer tool 229 determines that a novel unknown item (e.g., ingredient, menu item, combination of menu items) exists. In some embodiments, the novel item is indicated and/or flagged to an employee through the data integration server or the client device 207. Limited time offer tool 229 may update a training of one or more other tools to teach them to recognize the new item using properties (e.g., feature vectors) of the determined cluster for the novel item. User input or additional data may be used to assign labels to the new menu item (e.g., indicating a name for the new menu item, ingredients of the new menu item, and so on).

In some embodiments, outputs from the order accuracy tool 222, the anticipatory prep tool 224, gamification tool 226, drive-thru management tool 228, and/or limited time offer tool 229 may be consumed by the data integration system (e.g., such as to provide live order accuracy data, anticipatory prep data, gamification data, drive-thru management data and/or limited time data as described herein). In some embodiments, outputs from the order accuracy tool 222 anticipatory prep tool 224, gamification tool 226, drive-thru management tool 228, and/or limited time offer tool 229 may be consumed by a client device 207 (e.g., using application 208 and/or browser 209).

The data integration system 202, client device 207, data acquisition system 230, kitchen management system 220, machine learning system 210, data store 250, server machine 270, and server machine 280 may be coupled to each other via a network 216 for monitoring the state of a kitchen. In some embodiments, network 216 is a public network that provides client device 207 with access to the kitchen management server 212, data store 250, and other publically available computing devices. In some embodiments, network 216 is a private network that provides data integration system 202 access to the kitchen management system 220, data acquisition system 230, data store 250, and other privately available computing devices and that provides client device 207 access to the kitchen management server 212, data store 250, and other privately available computing devices. Network 216 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The data integration system 202, kitchen management server 212, data acquisition system 230, kitchen management system 220, server machine 270, and server machine 280 may each include one or more computing devices such as a rackmount server, a router computer, a server computer, a PC, a mainframe computer, a laptop computer, a tablet computer, a desktop computer, graphics processing unit (GPU), accelerator application-specific integrated circuit (ASIC) (e.g., tensor processing unit (TPU)), etc.

The kitchen management server 212 may include a kitchen management component 214. In some embodiments, the kitchen management component 214 may retrieve image data 252 from the data store and generate outputs 264 (e.g., action data, depth data, object data, etc.) In some embodiments, the kitchen management component 214 may use one or more trained machine learning models 290 to receive image data from one or more cameras and to determine the output for the image data (e.g., images acquired through camera(s) 232). The one or more trained machine learning models 290 may be trained using image data 252 to learn object detection, action recognition, object tracking, volumetric estimation, and/or geometric identification associated with image data of images of a kitchen. Based on the training, one or more model(s) 290 are trained to receive input images and to generate an output including detected objects, identified actions, tracking data, and so on. In some embodiments, the predictive component 214 makes determinations by providing image data (e.g., current image data) into the trained machine learning model 290, obtaining the outputs 264 from the trained machine learning model 290, and processing and/or using the output 264.

Data store 250 may be memory (e.g., random access memory), a drive (e.g., a hard drive, a flash drive), a database system, or another type of component or device capable of storing data. Data store 250 may include multiple storage components (e.g., multiple drives or multiple databases) that may span multiple computing devices (e.g., multiple server computers). The data store 250 may store image data 252, order data 254, menu data 256, inventory data 262, ML model outputs 264 (e.g., action data, depth data, and object data. The image data 252, order data 254, menu data 256, inventory data 262, ML model outputs 264 may include historical data (e.g., for training the machine learning model 290).

Image data 252 may include images taken by the data acquisition system 230 (e.g. using camera(s) 232). Order data 254 may include data associated with orders previously filled and/or currently needing to be filled. Menu data 256 may include a listing of menu items, associated recipes, and/or preparation instructions for each menu item. Inventory data 262 may be data indicative of a past and/or current state of inventory of operational supplies (e.g., ingredients, tools and machines, food packaging, etc.) ML model outputs 264 may include object data, pacing data, action data, tracking data, instance segmentation data, depth data, and/or pose data, among other things. Action data may include past and/or current actions being performed by employees in the kitchen (e.g., scooping a first ingredient, cooking a second ingredient, packaging a first menu item, etc.) Instance segmentation data may include divisions between objects and/or zones. For example, instance segmentation may include data indicative of divisions of ingredient containers (e.g., ingredient containers 112). In some embodiments, instance segmentation data may be indicative of associating objects together. For example, instance segmentation data may make an association of a detected employee hand to the rest of their body and can later be used to determine what order an employee is currently filling (e.g., what actions is an employee performing). Depth data may include data associated with a depth of an ingredient in a bin. For example, depth data may be used to compute a volumetric estimation of how much sauce is left in a container based on known dimensions of the container (e.g., depth, width, length, etc.)

Object data may include previously and/or currently detected objects in the kitchen. For example, object data may include a hamburger, packaging, a cooking tool, an employee, and the like. Pose data may include data indicative of a pose of an employee (e.g., employees 124A-C). Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient). Tracking data may include an indication of where an object is located. The tracking data can be indicative of the last actions performed in association with an object (e.g., cheese placed on a burger, a side scooped into a meal container, meal items assembled into a combination meal, etc.). Tracking data may also be indicative of a current state of a meal or component of a meal (e.g., a burger is cooking, a portion of a combination meal is assembled, a meal is awaiting delivery to customer, etc.)

In some embodiments, the client device 207 may store current data (e.g., image data 252, ML model outputs 264) in the data store 250 and the kitchen management server 212 may retrieve the current data from the data store 250. In some embodiments, the kitchen management server 212 may store output (e.g., output generated based on processing image data) of the trained machine learning model 290 in the data store 250 and the client device 207 may retrieve the output from the data store 250.

In some embodiments, machine learning system 210 further includes server machine 270 and/or server machine 280. Server machine 270 includes a data set generator 272 that is capable of generating data sets (e.g., a set of data inputs and a set of target outputs) to train, validate, and/or test a machine learning model 290. Some operations of data set generator 272 are described in detail below with respect to FIGS. 4A-B. In some embodiments, the data set generator 272 may partition the image data 252 into a training set (e.g., sixty percent of the image data 252), a validating set (e.g., twenty percent of the image data 252), and a testing set (e.g., twenty percent of the image data 252). In some embodiments, the machine learning system 210 (e.g., via kitchen management component 214) generates multiple training data items each including one or more sets of features and associated labels (e.g., for object detection, action identification, object tracking, volumetric estimation, pacing determination, pose detection, etc.).

Server machine 280 may include a training engine 282, a validation engine 284, a selection engine 285, and/or a testing engine 286. An engine (e.g., training engine 282, a validation engine 284, selection engine 285, and/or a testing engine 286) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 282 may be capable of training a machine learning model 290 using one or more sets of features associated with the training set from data set generator 272. The training engine 282 may generate multiple trained machine learning models 290, where each trained machine learning model 290 may be trained based on a distinct set of features of the training set and/or a distinct set of labels of the training set. For example, a first trained machine learning model may have been trained using images and associated object labels, a second trained machine learning model may have been trained using images and associated pose labels, and so on.

The validation engine 284 may be capable of validating a trained machine learning model 290 using the validation set from data set generator 272. The testing engine 286 may be capable of testing a trained machine learning model 290 using a testing set from data set generator 272.

The machine learning model(s) 290 may refer to the one or more trained machine learning models that are created by the training engine 282 using a training set that includes data inputs and, in some embodiments, corresponding target outputs (correct answers for respective training inputs). Patterns in the data sets can be found that cluster the data input and/or map the data input to the target output (the correct answer), and the machine learning model 290 is provided mappings that captures these patterns. The machine learning model(s) 290 may include artificial neural networks, deep neural networks, convolutional neural networks, recurrent neural networks (e.g., long short term memory (LSTM) networks, convLSTM networks, etc.), and/or other types of neural networks. The machine learning models 290 may additionally or alternatively include other types of machine learning models, such as those that use one or more of linear regression, Gaussian regression, random forests, support vector machines, and so on. In some embodiments, the training inputs in a set of training inputs is mapped to target outputs in a set of target outputs.

Kitchen management component 214 may provide current data to the trained machine learning model 290 and may run the trained machine learning model 290 on the input to obtain one or more outputs. The kitchen management component 214 may be capable of making determinations and/or performing operations from the output 264 of the trained machine learning model 290. ML model outputs 264 may include confidence data that indicates a level of confidence that the ML model outputs (e.g., predictive data) 264 correspond to detected objects, identified actions, object tracking, detected poses and/or gestures, and so on. Kitchen management component 214 may perform volumetric quantity estimations based on image data and/or ML model outputs 264 in embodiments. The kitchen management component 214 may provide the ML model outputs 264 (e.g., detected objects, identified actions, object tracking data, volumetric quantity estimation) to one or more tools of the kitchen management system 220.

The confidence data may include or indicate a level of confidence that the ML model output 264 is correct (e.g., ML model output 264 corresponds to a known label associated with a training data item). In one example, the level of confidence is a real number between 0 and 1 inclusive, where 0 indicates no confidence that the ML model output 264 is correct and 1 indicates absolute confidence that the ML model output 264 is correct. Responsive to the confidence data indicating a level of confidence below a threshold level for a predetermined number of instances (e.g., percentage of instances, frequency of instances, total number of instances, etc.), the kitchen management server 214 may cause the trained machine learning model 290 to be re-trained.

For purpose of illustration, rather than limitation, aspects of the disclosure describe the training of a machine learning model using image data 252 and inputting current image data into the trained machine learning model to determine ML model output 264 (e.g., detected object, identified actions, object tracking, volumetric quantity estimation, etc.). In other implementations, a heuristic model or rule-based model is used to determine an output (e.g., without using a trained machine learning model). Any of the information described with respect to input data (e.g., data acquired with data acquisition system 302 of FIG. 3) may be monitored or otherwise used in the heuristic or rule-based model.

In some embodiments, the functions of data integration system 202, client device 207, machine learning system 210, data acquisition system 230, kitchen management system 220, server machine 270, and server machine 280 may be provided by a fewer number of machines. For example, in some embodiments server machines 270 and 280 may be integrated into a single machine, while in some other embodiments, server machine 270, server machine 280, and predictive kitchen management server 212 may be integrated into a single machine. In some embodiments, kitchen management system 220, data acquisition system 230, and data integration system 202 may be integrated into a single machine.

In general, functions described in one embodiment as being performed by data integration system 202, client device 207, machine learning system 210, data acquisition system 230, kitchen management system 220, server machine 270, and server machine 280 can also be performed on kitchen management server 212 in other embodiments, if appropriate. In addition, the functionality attributed to a particular component can be performed by different or multiple components operating together. For example, in some embodiments, the kitchen management server 212 may process images. In another example, client device 207 may perform the image process based on output from the trained machine learning model.

In addition, the functions of a particular component can be performed by different or multiple components operating together. One or more of the kitchen management server 212, server machine 270, or server machine 280 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 3:
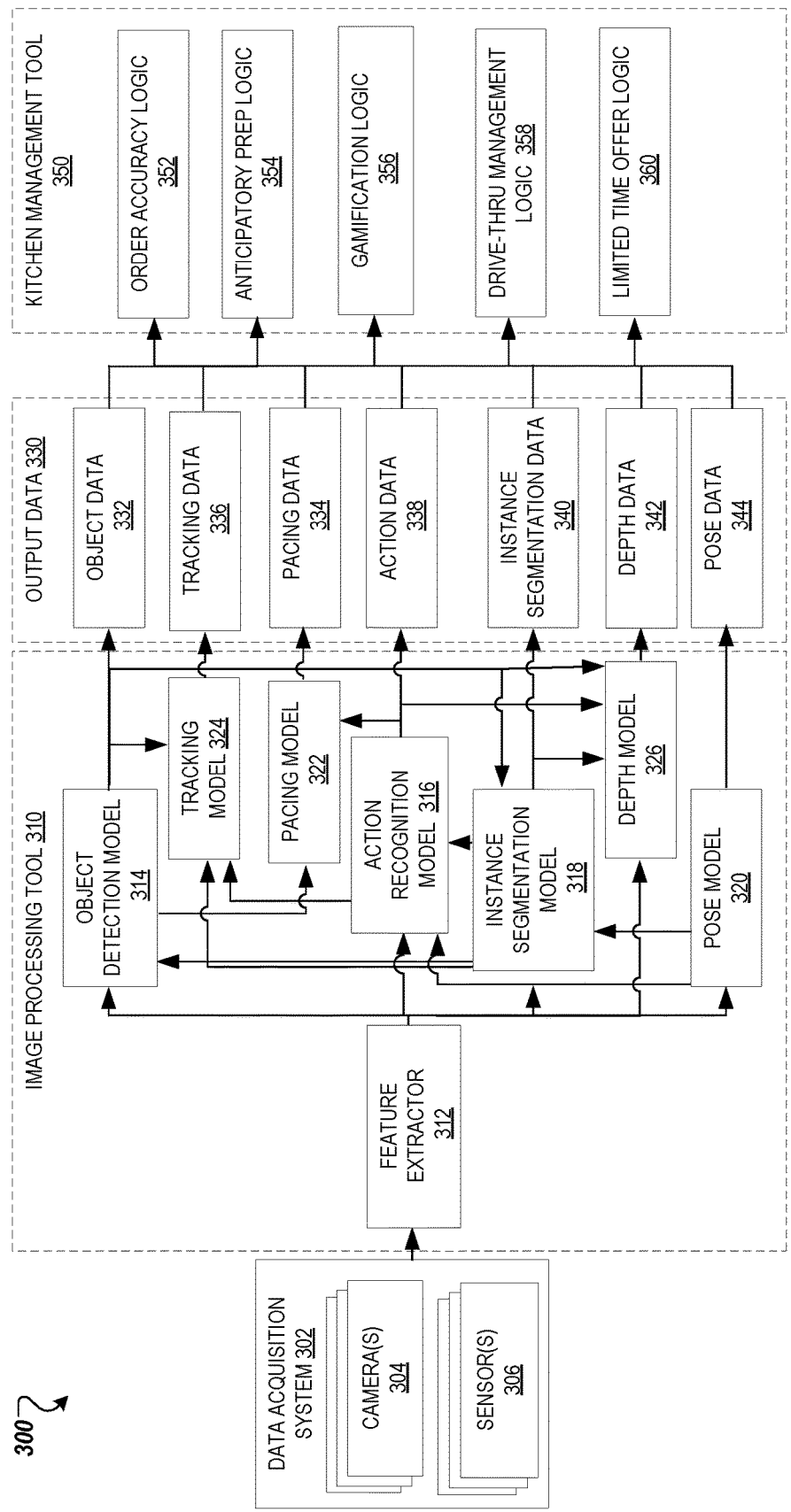
FIG. 3 is a block diagram illustrating an image processing system in which implementations of the disclosure may operate.

FIG. 3 is a block diagram illustrating an image processing system 300 in accordance with embodiments of the present disclosure. As shown in FIG. 3, the image processing system 300 includes a data acquisition system 302. The data acquisition system 302 may include one or more cameras 304 and/or sensors 306 to acquire image data (e.g., image data 252 of FIG. 2) associated with a state of the kitchen. For example, camera(s) 304 may be disposed within a meal preparation area to capture images of current food preparation items and/or actions. The cameras may include CCTV cameras, depth sensors (e.g. LIDAR cameras), depth optical cameras (e.g., stereo vision, structured light projection) and/or other sensors to capture kitchen data.

As shown in FIG. 3 the kitchen state data (e.g., image data) may be processed using an image processing tool 310. The image processing tool 310 may include a feature extractor 312. The feature extractor 312 can receive image data and generate synthetic data associated with various combinations, correlations, and/or artificial parameters of the image data. The feature extractor 312 can dimensionally reduce the raw sensor data into groups and/or features (e.g., feature vectors). For example, the feature extractor 312 may generate features that include images of a specified perspective (e.g., including a specified station).

In some embodiments, the feature extractor 312 includes a neural network trained to perform feature extraction. For example, the feature extractor may be trained to receive data for one or more images and to output features based on the received data. The output features may then be used by further logics and/or models of image processing tool 310.

In some embodiments, image data and/or outputs of the feature extractor 312 are used as inputs to various processing logic including data processing models, which may be or include one or more trained machine learning models. The data processing models may include an object detection model 314, an action recognition model 316, an instance segmentation model 318, a pose model 320, a tracking model 324, a pacing model 322, and/or a depth model 326. In some embodiments, feature extractor 312 is a layer of multiple layers of one or more neural networks, and object detection model 314, action recognition model 316, instance segmentation model 318, pose model 320, tracking model 324, pacing model 322, and/or depth model 326 are further layers of the one or more neural networks. In some embodiments, feature extractor 312 is omitted, and image data is input into object detection model 314, action recognition model 316, instance segmentation model 318, pose model 320, tracking model 324, pacing model 322, and/or depth model 326. The image processing model(s) receive input (e.g., image data, and/or a feature vector from feature extractor 312) and determine output data 330 (e.g., ML model outputs 264). In some embodiments, the output data 330 includes object data 332 (e.g., detected objects in an image), tracking data 336 (e.g., where an object is located, previous actions that have been applied to an object, tracking order through multiple images, and/or vehicle tracking in the drive-thru), pacing data 334 (e.g., paces of actions, food preparation steps, etc.), action data 338 (e.g., action being performed such as scooping an ingredient, cooking an ingredient, assembly a meal order, etc.), instanced segmentation data 340 (e.g., the last action to be performed on an order, data indicative of object association and/or segmentation, connecting object and employee, action and employee, division of macro-object such food preparation zones into individual ingredient containers), and so on. The data processing models may incorporate use of a machine learning model (e.g., trained using method 400A-B of FIG. 4, implemented using method 400C of FIG. 4, using processing architecture of machine learning system 210 of FIG. 2).

As shown in FIG. 3, the object detection model 314 can receive image data from data acquisition system 302 (e.g., through feature extractor 312). In some embodiments, the object detection model 314 detects objects found within an image. For example, the object detection model 314 may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the object detection tool receives data from a POS (e.g., POS 102 of FIG. 1). The received data from the POS may include data indicative of meals, kitchen items, ingredients, or other data indicative of potential objects to be detected in images by object detection model 314. In some embodiments, the data from the POS may be used to train the object detection model 314 on potential objects to be detected in the inputted image data. The object detection model outputs object data 332. The object data 332 may include information on an identified object as well as location data, employee data, meal data, and/or other identifiable information associated with the detected objects.

As shown in FIG. 3, the action recognition model 316 receives image data as input and outputs action data 338. The action recognition model 316 identifies actions being performed in association with the received image data. For example, a series of images may show an employee performing an action such as scooping a sauce. The action recognition model 316 receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

As shown in FIG. 3, the image processing tool 310 may include an instance segmentation model 318. The instance segmentation model 318 may receive image data from the data acquisition system 302 (e.g., through the feature extractor 312). The instance segmentation model 318 may segment images into discreet boundaries. For example, the instance segmentation model 318 may receive an image, identify the boundaries of different ingredient containers (e.g., ingredient containers 112 of FIG. 1), and output the discretized ingredient containers as instance segmentation data 340. In some embodiments, the instance segmentation model 318 may associate various segmented and/or discretized boundaries. For example, the instance segmentation model 318 may receive object data 332 from the object detection model 314. The object data 332 may include a detected hand and a detected cooking utensil. The instance segmentation model 318 may identify an association between the hand and the cooking utensil and output the association as instance segmentation data 340. In another embodiment, the instance segmentation tool may output the data to the action recognition model 316 that determines an action (e.g., action data 338) being performed based on the detected hand and cooking utensil and the identified association between the detected objects. In some embodiments, the instance segmentation model 318 outputs instance segmentation data 340 that is used by tracking model 324 and/or depth model 326

As shown in FIG. 3, the image processing tool 310 may include a tracking model 324. The tracking model 324 may receive object data 332, action data 338, instance segmentation data 340, and/or image data (e.g., from data acquisition system 302). The tracking model may track a detected object over a series of images and identify a current location of an object and/or historical tracking of an object. In some embodiments, the tracking model 324 tracks a status of an order. For example, the tracking model 324 may output tracking data 336 that includes an indication of the last action associated with an order. For example, the tracking model 324 may combine object data 332 with action data 338 to determine a series of actions associated with an order.

In some embodiments, the tracking model may track an object associated with instance segmentation data 340. For example, instance segmentation may include a discretization and/or segmentation of individual containers (e.g., to hold food items). The tracking model 324 may track a location of one or more individual containers over time. In a further embodiment, the tracking model 324 may further combine object data with instance segmentation data to determine the contents of each container is addition to tracking the containers. The tracking model may output data indicative of object tracking, order tracking, and/or action tracking as tracking data 336.

As shown in FIG. 3, image processing tool 310 may include a pacing model 322. The pacing model 322 may receive object data 332 (e.g., from object detection model 314) and/or action data 338 (e.g., from action recognition model 316). The pacing model may determine pacing of various kitchen tasks associated with detected objects and/or actions. For example, not to be interpreted as an exhaustive list, the following could be pacing actions outputted by pacing model 322 and included in pacing data 334: prepping dough, placing toppings, loading and/or unloading a pizza to/from an oven, cutting a pizza, refilling ingredients, opening restaurant, prepping sides, hand washing, using POS system, checking temperature, using the cooler/freezer, assembling a product, packaging a product, attending a phone call, processing an order, counting inventory, delivering food to a customer, drive-thru queue, and so on.

As shown in FIG. 3, image processing tool 310 may include a pose model 320. The pose model 320 receives image data and determines a pose of an employee. For example the pose model 320 may output pose data 344 indicative of locations and/or orientations of employees (e.g., hand, arms, body) and other kitchen equipment (e.g., utensils ovens, counters, etc.) In some embodiments, the pose data 344 is indicative of one or more locations of hands of employees in the presence of occlusions. For example, the pose data 342 may indicate a location and orientation of an arm that is visible in an image frame and determine the location and/orientation of a hand (e.g., that is not visible in an image frame). The pose data 344 may be outputted to the action recognition model 316 for determining actions that may be partially or fully occluded in the image data. The pose data 344 may be used further by instance segmentation model 318. For example, the instance segmentation model 318 may use the pose data 344 to make determination of object associations (e.g., a hand, an arm, and a cooking utensil).

Pose data 344 may include information indicative of a state of one or more hands of employees and associations between their hands and one or more meal preparation items. For example, a location of a hand may be detected within an image frame. In one or more further image frames the hands may be occluded from a field of view of a camera. The pose data 344 may infer a location of one or more hands occluded from the field of view. As will be discussed in later embodiments, the pose data may be tracked over time to infer one or more meal preparation items and/or object occluded or otherwise outside a field of view of a camera. In some embodiments, the pose data 344 is used by processing logic to make associations between segmented objects. For example, the pose data may be used to infer a detected hand is associated with a detected shoulder, elbow, head, etc.

As will be described in future embodiments pose data may be used to infer associations between segmented objects that links objects with pending meal orders. For example, a hand of an employee may be associated with information indicative of an employee ID (e.g., "employee 1") and the hand may be in proximity to a first ingredient associated with a first pending meal order. Using these associations, processing logic may infer a connection between the first employee and the first pending meal order. Associations between pending meal order, stages of pending meal orders, ingredient preparation actions, and other kitchen actions and employees and/or preparations may be inferred based on the pose data 344. For example, pose data 344 may be used to associate an employee's left hand with their right hand and determine a first action performed by the left hand and a second hand performed by the right hand are associated with the same order. In some embodiments, an employee may be associated with more than one order and/or part of an order.

As shown in FIG. 3, image processing tool 310 may include a depth model 326. The depth model receives instance segmentation data 340 identifying individual segmented objects (e.g., individual kitchen containers). The depth data may receive sensor data 306 indicative of a detected depth of an image (e.g., an image taken using a LIDAR camera). The depth model 326 may further receive object specification data (e.g., dimensions of kitchen containers (e.g., length, width, and depth)). The depth model 326 may determine the depth and/or fill level of contents of individual containers.

In some embodiments, the action recognition model 316 may output action data 338 to the depth model 326. The depth model 326 may use action data 338 to determine a depth of a container during an identified action. For example, the presence of a food preparation utensil in a container can result in inaccurate depth data 342 of the enclosed kitchen item in the container (e.g., a sauce). The depth model 326 may determine a depth of the content of a container during a scooping actions where the kitchen utensil is removed from the container for a period of time.

In some embodiments, the depth model 326 makes a volumetric determination of the content of a container. In some embodiments, the depth model 326 receives object data 332 from object detection model 314. The depth model 326 may use the object data 332 to determine the content of a container. The depth model may then use volumetric determination methodology associated with the detected object. For example, the depth model 326 may receive object data 332 indicating that an object enclosed in the container is a thick sauce or a solid ingredient and the depth model 326 can account for this feature when determining a volumetric prediction of the enclosed item in the container.

The image processing system 300 may include a kitchen management tool 350. The kitchen management tool 350 may include order accuracy logic 352, anticipatory prep logic 354, a gamification logic 356, drive-thru management logic 358, and/or limited time offer logic 360. The order accuracy logic 352 may receive output data 330 such as object data 332, action data 338 and/or order data, such as data managed by an order manager tool (e.g., order manager tool 203) and determine inaccuracies between what is being prepared in the kitchen (e.g., detected in the images) and what steps are to be performed (e.g., following recipes and predetermined order preparation instructions). In some embodiments, the order accuracy tool may include flagging or otherwise indicating an error to an employee. For example, order accuracy logic 352 may process data and output instructions for a display (e.g., display 205 of FIG. 2) to display a visual indication of the error.

In some embodiments, the order accuracy logic consumes tracking data 336. For example, the order accuracy logic 352 may identify the last action performed on an order from the tracking data 336 and one or more pending actions to be performed on an order. The order accuracy logic may then determine current actions being performed on an order and compare them against the pending action to be performed following menu/recipe data. In some embodiments, the order accuracy logic 352 may determine compound actions from the action data 338, tracking data 334, and/or action data 338. The order accuracy logic 352 may identify which actions are associated with each order based on the instance segmentation data 340 to determine whether an error is or has occurred with an order.

The anticipatory prep logic 354 may consume output data 330 associated with objects detected (e.g. object data 332 including ingredients, menu items, packaging, etc.). The anticipatory prep logic 354 may consume depth data 342, instance segmentation data 340, and/or object data to determine a current inventory of the kitchen. The anticipatory prep logic 354 may monitor inventory over a period of time and predict when more of a given ingredient needs to be prepared. For example, the anticipatory prep logic can consume pacing data 334 and/or depth data 342 that indicates the rate of consumption of a first ingredient (e.g., grilled chicken). The anticipatory prep logic 354 may include a model that predicts output data 330, future preparation times and/or quantities. For example, to ensure a restaurant has a given ingredient available, the anticipatory prep logic 354 may indicate to an employee a future prep time and/or quantity of the given ingredient.

The gamification logic 356 may consume output data 330 to provide targeted, specific metrics associated with a restaurant's food preparation and delivery services. In some embodiments, gamification logic 356 receives pacing data 334 associated with different preparation times of given employees, menu items, and/or preparations steps. The gamification logic 356 may identify, using one or more of object data 332, action data 338, pacing data 334, and/or pose data 344 preparation and/or delivery times of individual employees, shifts, stations, and/or menu items. The gamification tool 226 may suggest incentives to increase one or more metrics for individuals, shifts, restaurants, and so on. The incentives may be tailored to specific metrics that may have values lagging expected and/or target values for those metrics.

The drive-thru management logic may consume output data 330 associated with kitchen status and drive-thru status. The drive-thru management tool 228 may identify a status of the kitchen from one or more of the pacing data 334, the depth data 342, and/or the action data 338. The drive-thru management logic 358 may consume the output data 330 to identify a current availability of items in the kitchen (e.g., inventory analysis). The drive-thru management logic 358 may track the rate and wait time of the vehicles in the drive-thru and make a determination that a given vehicle associated with an order should be rerouted to an alternative delivery procedure. For example, the drive-thru management logic may output a determination that a vehicle is to be directed to a waiting bay when an order associated with the vehicle is above a threshold value. Additionally or alternatively, the drive-thru management logic 358 may determine whether to offer a promotion or attempt an up sale procedure based on the state of the drive-thru and past transaction with an identified vehicle. For example, past and current object data 332 can be used to determine previous orders from a vehicle with the same license plate.

The limited time offer logic 360 may consume object data 332. The object data 332 may be associated with an item identified by the object detection model. However, in some cases, a restaurant may introduce new recipes, menu items, ingredients, etc. Conventional machine learning systems often require extensive retraining in order to perform novel object detection. However, the limited time offer logic 360 may perform further object detection that may include identifying a clustering of object data 332 to determine multiple instances of an undetectable object. Based on the clustering of object data 332, the limited time offer logic 360 determines that a novel unknown item (e.g., ingredient, menu item, combination of menu items) exists. In some embodiments, the limited time offer logic 360 may output an indication of the novel item (e.g., to be displayed on a KDS) The limited time offer logic 360 may update a training of one or more models of the image processing tool 310 to recognize the new item using properties (e.g., feature vectors) of the determined cluster for the novel item. User input or additional data may be used to assign labels to the new menu item (e.g., indicating a name for the new menu item, ingredients of the new menu item, and so on).

In some embodiments one or more of the order accuracy logic 352, the anticipatory prep logic 354, the gamification logic 356, the drive-thru logic 358, and/or the limited time offer logic 360 include a machine learning model (e.g., trained using method 400A-B of FIG. 4, implemented using method 400C of FIG. 4, using processing architecture of machine learning system 270 of FIG. 2).

Figure 4A:
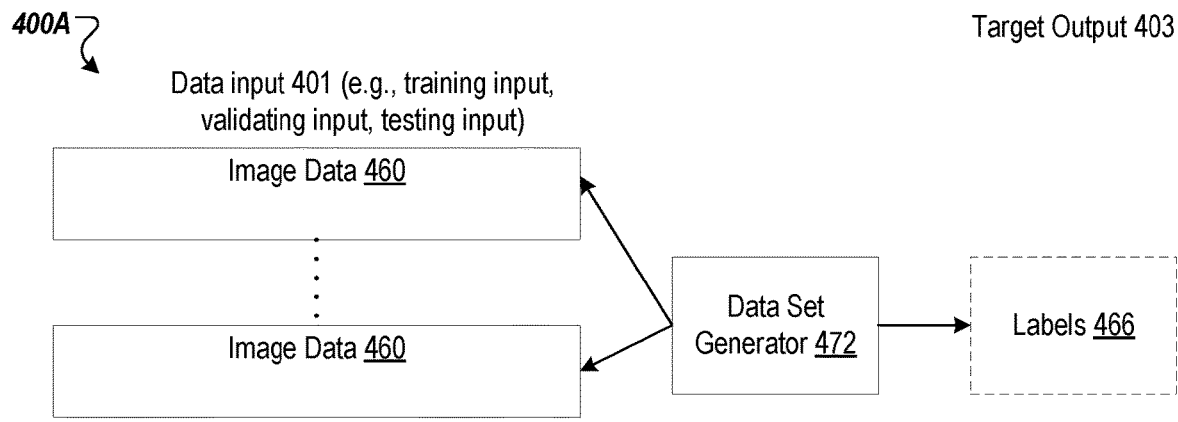
FIG. 4A is an example data set generator to create data sets for a machine learning model, according to certain embodiments.

FIG. 4A is an example data set generator 472 (e.g., data set generator 272 of FIG. 2) to create data sets for a machine learning model (e.g., model 290 of FIG. 2) using image data 460 (e.g., images captured by cameras 108A-C of FIG. 1), according to certain embodiments. System 400A of FIG. 4A shows data set generator 472, data inputs 401, and target output 403.

In some embodiments, data set generator 472 generates a data set (e.g., training set, validating set, testing set) that includes one or more data inputs 401 (e.g., training input, validating input, testing input). In some embodiments, the data set further includes one or more target outputs 403 that correspond to the data inputs 401. The data set may also include mapping data that maps the data inputs 401 to the labels 466 of a target output 403. Data inputs 401 may also be referred to as "features," "attributes," or information." In some embodiments, data set generator 472 may provide the data set to the training engine 282, validating engine 284, and/or testing engine 286, where the data set is used to train, validate, and/or test the machine learning model 290. Some embodiments of generating a training set may further be described with respect to FIG. 5A.

In some embodiments, data set generator 472 generates the data input 401 based on image data 460. In some embodiments, the data set generator 472 generates the labels 466 (e.g., object data 332, pacing data 334, tracking data 336, location data 338, depth data 342) associated with the image data 460. In some instances, labels 466 may be manually added to images and validated by users. In other instances, labels 466 may be automatically added to images.

In some embodiments, data inputs 401 may include one or more images (e.g., a series of image frames) for the image data 460. Each frame of the image data 460 may include various objects (e.g., ingredients such as condiments, entrees, packaging materials, etc.), actions being performed (e.g., cooking, cutting, scooping, packaging, etc.), tracked orders, locations within the kitchen and drive-thru, depth of containers holding ingredients, and so on.

In some embodiments, data set generator 472 may generate a first data input corresponding to a first set of features to train, validate, or test a first machine learning model and the data set generator 472 may generate a second data input corresponding to a second set of features to train, validate, or test a second machine learning model.

In some embodiments, the data set generator 472 may discretize one or more of the data inputs 401 or the target outputs 403 (e.g., to use in classification algorithms for regression problems). Discretization of the data input 401 or target output 403 may transform continuous series of image frames into discrete frames with identifiable features. In some embodiments, the discrete values for the data input 301 indicate discrete objects, actions, location, etc. to be identified to obtain a target output 303 (e.g., output generated based on processing image data).

Data inputs 401 and target outputs 403 to train, validate, or test a machine learning model may include information for a particular facility (e.g., for a particular restaurant location and/or branch). For example, the image data 460 and labels 466 may be used to train a system for a particular floorplan and/or menu associated with a specific restaurant location.

In some embodiments, the information used to train the machine learning model may be from specific types of food preparation equipment (e.g., pizza oven, panini press, deep fryer) of the restaurant having specific characteristics and allow the trained machine learning model to determine outcomes for a specific group of food preparation equipment based on input for image data 460 associated with one or more components sharing characteristics of the specific group. In some embodiments, the information used to train the machine learning model may be for data points from two or more kitchen management functions and may allow the trained machine learning model to determine multiple output data points from the same image (e.g., a detectable object and an identifiable action are used to train the machine learning model using the same image).

In some embodiments, subsequent to generating a data set and training, validating, or testing machine learning model 290 using the data set, the machine learning model 290 may be further trained, validated, or tested (e.g., further image data 252 and labels) or adjusted (e.g., adjusting weights associated with input data of the machine learning model 290, such as connection weights in a neural network).

Figure 4B:
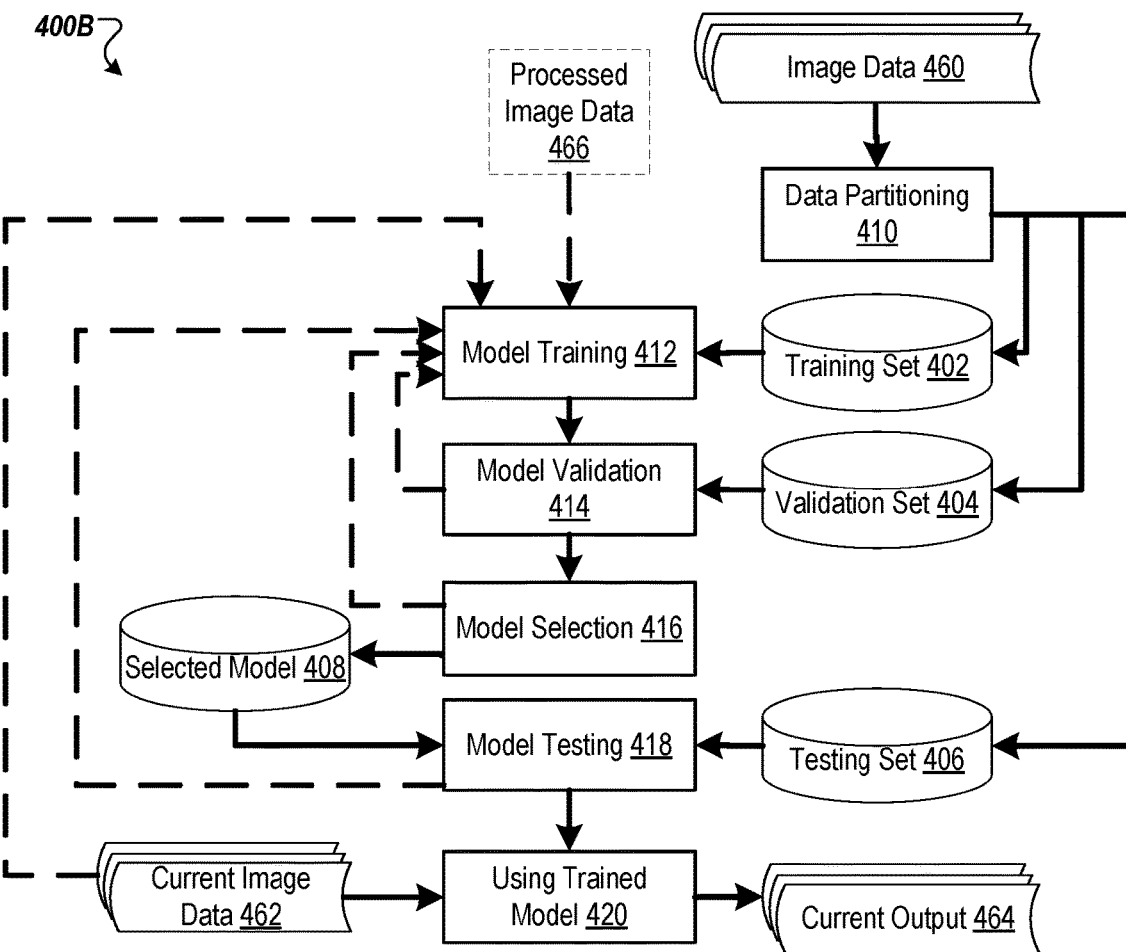
FIG. 4B is a block diagram illustrating determining predictive data, according to certain embodiments.

FIG. 4B is a block diagram illustrating a system 400B for training a machine learning model to generate outputs 464 (e.g., object data 332, pacing data 334, tracking data 336, action data 338, instance segmentation data 340, depth data 342 and/or pose data 344 of FIG. 3), according to certain embodiments. The system 400B may be used to train one or more machine learning models to determine outputs associated with image data (e.g., images acquired using cameras 108A-C).

At block 410, the system (e.g., machine learning system 210 of FIG. 2) performs data partitioning (e.g., via data set generator 272 of server machine 270 of FIG. 1) of the image data 460 (e.g., series of image frame, and in some embodiments outputs 466) to generate the training set 402, validation set 404, and testing set 406. For example, the training set may be 60% of the image data 460, the validation set may be 20% of the image data 460, and the validation set may be 20% of the image data 460. The system 400 may generate a plurality of sets of features for each of the training set, the validation set, and the testing set.

At block 412, the system 400 performs model training (e.g., via training engine 282 of FIG. 2) using the training set 402. The system 400 may train one or multiple machine learning models using multiple sets of training data items (e.g., each including sets of features) of the training set 402 (e.g., a first set of features of the training set 402, a second set of features of the training set 402, etc.). For example, system 400 may train a machine learning model to generate a first trained machine learning model using the first set of features in the training set (e.g., a first camera) and to generate a second trained machine learning model using the second set of features in the training set (e.g., a second camera). The machine learning model(s) may be trained to output one or more other types of predictions, classifications, decisions, and so on. For example, the machine learning model(s) may be trained to perform object detection for particular types of objects found in a restaurant kitchen, to perform tracking of one or more objects found in a kitchen, to determine pacing for food preparation in a kitchen, to identify actions performed in a kitchen, and so on.

In one embodiment, training a machine learning model includes providing an input of a training data item into the machine learning model. The input may include one or more image frames indicative of a state of a kitchen. In some embodiments, the machine learning model receives order data indicative of one or more pending meal orders. The machine learning model processes the input to generate an output. The output may include a prediction, inference, and/or classification associated with a state of the kitchen. For example, the machine learning may output objects and/or actions associated with the one or more image frames. In another example, the machine learning model may output object data (e.g., object data 332), tracking data (e.g., tracking data 334), pacing data (e.g., pacing data 336), action data (e.g., action data 338), instance segmentation data (e.g., instance segmentation data 340), depth data (e.g., depth data 342), pose data (e.g., pose data 344). In another example, outputs from the machine learning model may be further processed (e.g., using business logic) to generate order accuracy data (e.g., associated with order accuracy logic 352), anticipatory preparation data (e.g., associated with anticipatory prep logic 354), gamification data (e.g., associated with gamification logic 356), drive-thru management data (e.g., associated with gamification logic 356), limited time offer data (e.g., associated with limited time offer logic 360), Processing logic then compares the output to one or more labels associated with the input. Processing logic determines an error based on differences between the output and the one or more labels. Processing logic adjusts weights of one or more nodes in the machine learning model based on the error.

In some embodiments, input may be received indicating a stopping criterion in met. In some embodiments, processing logic determines if a stopping criterion is met. If a stopping criterion has not been met, the training process repeats with additional training data items, and another training data item is input into the machine learning model. If a stopping criterion is met, training of the machine learning model is complete.

In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., overlapping regions captured by multiple cameras).

At block 414, the system 400 performs model validation (e.g., via validation engine 284 of FIG. 2) using the validation set 404. The system 400 may validate each of the trained models using a corresponding set of features of the validation set 404. For example, system 400 may validate the first trained machine learning model using the first set of features in the validation set (e.g., image data from a first camera) and the second trained machine learning model using the second set of features in the validation set (e.g., image data from a second camera). In some embodiments, the system 400 may validate hundreds of models (e.g., models with various permutations of features, combinations of models, etc.) generated at block 412. At block 414, the system 400 may determine an accuracy of each of the one or more trained models (e.g., via model validation) and may determine whether one or more of the trained models has an accuracy that meets a threshold accuracy. Responsive to determining that one or more of the trained models has an accuracy that meets a threshold accuracy, flow continues to block 416. In some embodiments, model training at block 412 may occur at a first meal preparation area (e.g., at a first kitchen location) and model validation (block 414) may occur at a second meal preparation area (e.g., at a second kitchen location). For example, training of the one or more machine learning models may occur at a first restaurant location of a franchise chain and validation of the machine learning model may occurs at a second restaurant location of the franchise chain. The layout and footprint of the validation location may be similar to the training location, however, logistical differences (e.g., storage location of items, small layout differences, etc.) may be used to further refine the one or more machine learning models.

At block 418, the system 400 performs model testing (e.g., via testing engine 286 of FIG. 2) using the testing set 406 to test the selected model 408. The system 400 may test, using the first set of features in the testing set (e.g., image data from a first camera), the first trained machine learning model to determine the first trained machine learning model meets a threshold accuracy (e.g., based on the first set of features of the testing set 406). Responsive to accuracy of the selected model 408 not meeting the threshold accuracy (e.g., the selected model 408 is overly fit to the training set 402 and/or validation set 404 and is not applicable to other data sets such as the testing set 406), flow continues to block 412 where the system 400 performs model training (e.g., retraining) using further training data items. Responsive to determining that the selected model 408 has an accuracy that meets a threshold accuracy based on the testing set 406, flow continues to block 420. In at least block 412, the model may learn patterns in the image data 469 to make predictions and in block 418, the system 400 may apply the model on the remaining data (e.g., testing set 406) to test the predictions.

At block 420, system 400 uses the trained model (e.g., selected model 408) to receive current data (e.g., current image data) and receives a current output 464 based on processing of the current image data 462 by the trained model(s) 420.

In some embodiments, outputs 464 corresponding to the current data 462 are received and the model 408 is re-trained based on the current data 462 and the outputs 464.

In some embodiments, one or more operations of the blocks 410-420 may occur in various orders and/or with other operations not presented and described herein. In some embodiments, one or more operations of blocks 410-420 may not be performed. For example, in some embodiments, one or more of data partitioning of block 410, model validation of block 414, model selection of block 416, or model testing of block 418 may not be performed.

Figure 4C:
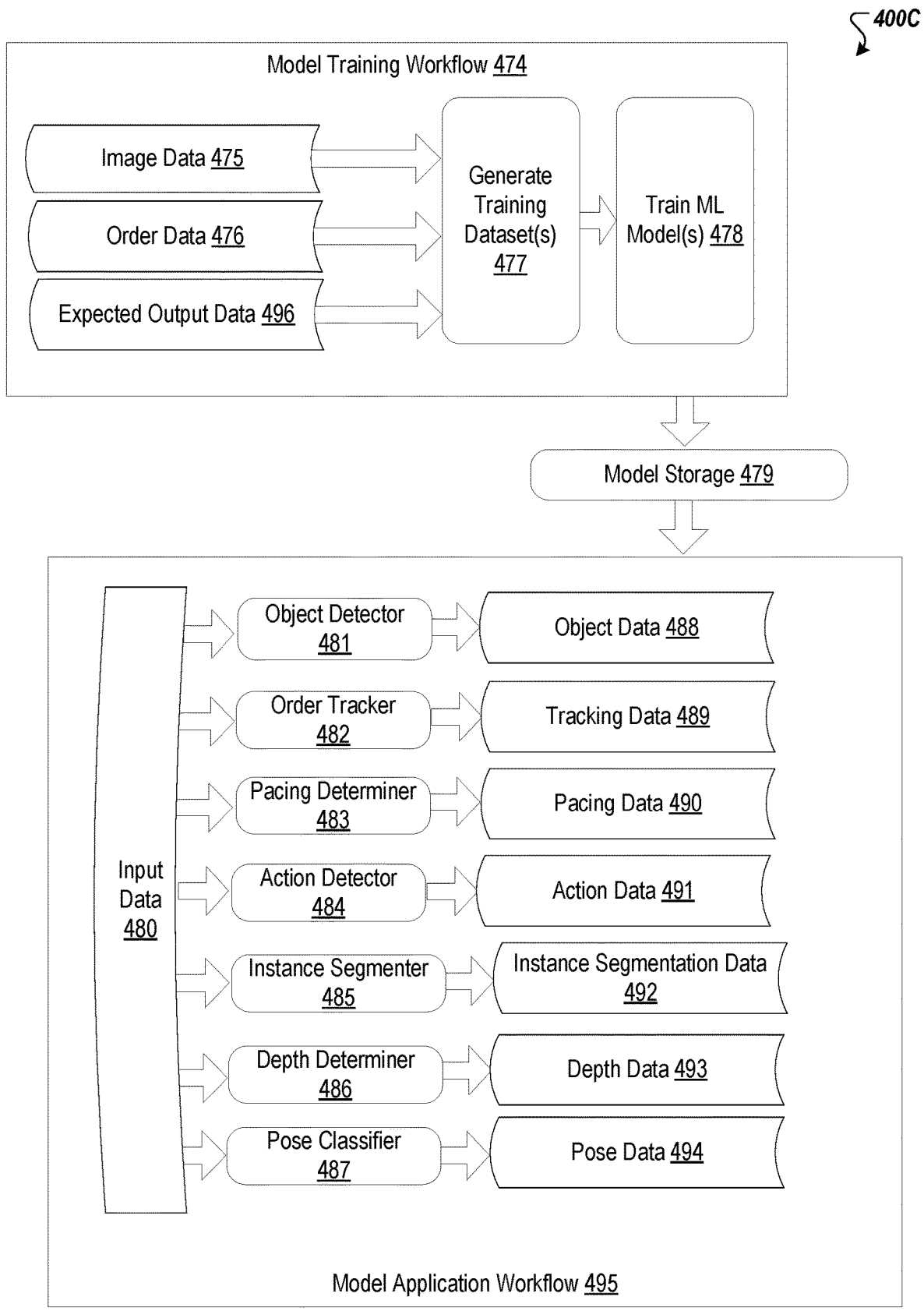
FIG. 4C illustrates a model training workflow and a model application workflow for a image-based kitchen management system, in accordance with an embodiments of the present disclosure.

FIG. 4C illustrates a model training workflow 474 and a model application workflow 495 for an image-based kitchen management system, in accordance with embodiments of the present disclosure. In embodiments, the model training workflow 474 may be performed at a server (e.g., server 116 of FIG. 1) which may or may not include a kitchen management application, and the trained models are provided to a kitchen management application (e.g., on client device 207 or machine learning system 210 of FIG. 2), which may perform the model application workflow 495. The model training workflow 474 and the model application workflow 495 may be performed by processing logic executed by a processor of a computing device. One or more of these workflows 474, 495 may be implemented, for example, by one or more machine learning modules implemented in an image processing tool 234, order accuracy tool 222, anticipatory prep tool 224, gamification tool 226, drive-thru management tool 228, limited time offer tool 229, and/or other software and/or firmware executing on a processing device as shown in FIG. 2.

The model training workflow 474 is to train one or more machine learning models (e.g., deep learning models) to perform one or more classifying, segmenting, detection, recognition, decision, etc. tasks associated with a kitchen management system (e.g., detecting objects and/or actions, tracking meal preparation items and/or orders, determining pacing or kitchen processes, segmenting image data, determining container depths, etc.). The model application workflow 495 is to apply the one or more trained machine learning models to perform the classifying, segmenting, detection, recognition, determining, etc. tasks for image data (e.g., one or more image frames indicative of a state of a meal preparation area). Various machine learning outputs are described herein. Particular numbers and arrangements of machine learning models are described and shown. However, it should be understood that the number and type of machine learning models that are used and the arrangement of such machine learning models can be modified to achieve the same or similar end results. Accordingly, the arrangements of machine learning models that are described and shown are merely examples and should not be construed as limiting.

In embodiments, one or more machine learning models are trained to perform one or more of the below tasks. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

a. Object detector—The object detector can receive image data (e.g., from data acquisition system 302), and can detect objects found within an image. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like. In some embodiments, the processing logic receives data from a POS (e.g., POS 102 of FIG. 1). The received data from the POS may include data indicative of meals, kitchen items, ingredients, or other data indicative of potential objects to be detected in images by object detection model. Processing logic may output object data (e.g., object data 332). The object data may include information on an identified object as well as location data, employee data, meal data, and/or other identifiable information associated with the detected objects.

b. Order tracker—Processing logic may receive object data (e.g., object data 332, action data (e.g., action data 338), instance segmentation data (e.g., instance segmentation data 340), and/or image data (e.g., from data acquisition system 302). The tracking model may track a detected object over a series of images and identify a current location of an object and/or historical tracking of an object. In some embodiments, the processing logic tracks a status of an order. For example, processing logic may output tracking data that includes an indication of top data or data indicative of the last action associated with an order. For example, processing logic may combine object data with action data to determine a series of actions associated with an order.

c. Pacing determiner—Processing logic may receive object data (e.g., object data 332 from object detection model 314) and/or action data (e.g., action data 338 from action recognition model 316). Processing logic may determine pacing of various kitchen tasks associated with detected objects and/or actions. Pacing data time stamps associated with actions including one or more action durations. Pacing data may be aggregated into a broader statistical data such as an average time duration for an associated action. For example, not to be interpreted as an exhaustive list, the following could be pacing actions outputted by the processing logic: prepping dough, placing toppings, loading and/or unloading a pizza to/from an oven, cutting a pizza, refill ingredients, opening a restaurant, prepping sides, hand washing, using POS system, checking temperature, using the cooler/freezer, assembling a product, packaging a product, attending a phone call, processing an order, counting inventory, delivering food to customer, drive-thru queue, and so on.

d. Action determiner—processing logic receives image data as an input and outputs action data (e.g., action data 338). Processing logic identifies actions being performed in association with the received image data. For example, a series of images may show an employee performing an action such as scooping a sauce. Processing logic receives the series of images and identifies the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

e. Instance segmenter—Processing logic may receive image data (e.g., from the data acquisition system 302 through the feature extractor 312). Processing logic may segment images into discreet boundaries. For example, processing logic may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, processing logic may receive object data that includes a detected hand and/or a detected cooking utensil.

f. Depth determiner—Processing logic identifies individual segmented objects (e.g., individual kitchen containers) from received image data. Process logic may receive sensor data indicative of a detected depth of an image (e.g., an image taken using a LIDAR camera). Processing logic may further receive object specification data (e.g., dimensions of kitchen containers (e.g., length, width, and depth)). From one or more of the described inputs, processing logic may determine the depth and/or fill level of contents of individual containers.

g. Pose classifier—Process logic receives image data and determines a pose of an employee. For example, processing logic may output pose data 344 indicative of locations and/or orientations of employees (e.g., hand, arms, body) and other kitchen equipment (e.g., utensils ovens, counters, etc.). In some embodiments, pose data is indicative of one or more locations of hands of employees in the presence of occlusions. For example, pose data may indicate a location and orientation of an arm that is visible in an image frame and determine the location and/orientation of a hand (e.g., that is not visible in an image frame).

In some embodiments, one or more of the above tasks are performed using rule-based logic rather than trained machine learning models. For example, depth determiner may determine depth based on sensor measurements and without the assistance of machine learning. In another example, order tracker may track orders and pacing determine may determine a pacing of orders based on the output of one or more machine learning models, but may not itself be a machine learning model. For example, order tracker may include rules on how to track orders based on received metadata from multiple frames of one or more video feeds.

One type of machine learning model that may be used is an artificial neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In objection detection, for example, the raw input may include one or more image frames indicative of a state of a meal preparation area including one or more meal preparation items; the second layer may compose feature data associated with a meal preparation area (e.g., appliance locations, kitchen floorplan, and/or layout, etc.); the third layer may include one or more meal preparation items a model is expecting to be disposed within the one or more image frames (e.g., one or more meal preparation items identified in one or more pending meal orders). Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future received image frames and make predictions based on this continuous processing information. RNNs may be trained using a training dataset to generate a fixed number of outputs (e.g., to detect an amount of objects and/or actions associated with the image frames). One type of RNN that may be used is a long short term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset.

For the model training workflow 474, a training dataset containing hundreds, thousands, tens of thousands, hundreds of thousands, or more image frames (e.g., image data 475) should be used to form a training dataset. In embodiments, the training dataset may also include associated pending meal orders (e.g., order data 476). In embodiments, the training dataset may also include expected output data 496 (e.g., output data 330), for forming a training dataset, where each data point and/or associated output data may include various labels or classifications of one or more types of useful information (e.g., object detection, action detection, pose classification, pacing data, instance segmentation data, and so on). Each case may include, for example, one or more image frames and labels associated with one or more meal preparation items, poses and/or actions. This data may be processed to generate one or multiple training datasets 477 for training of one or more machine learning models. The machine learning models may be trained, for example, to detect objects and/or actions associated with the images, among other things.

In one embodiment, generating one or more training datasets 477 includes receiving one or more image frames indicative of a state of a meal preparation area. The labels that are used may depend on what a particular machine learning model will be trained to do. For example, to train a machine learning model to perform object detection, a training dataset 477 may include data indicative of meal preparation items (e.g., ingredients, appliances, meal preparations stations, etc.).

To effectuate training, processing logic inputs the training dataset(s) 477 into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above. Training may be performed by inputting one or more of the image data 475, order data 476, and expected output data 496 into the machine learning model one at a time.

The machine learning model processes the input to generate an output. An artificial neural network includes an input layer that consists of values in a data point. The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction, and/or output that the machine learning model can produce.

Accordingly, the output may include one or more predictions or inferences. For example, an output prediction or inference may include a detected object associated with one or more image frames. Processing logic may then compare the predicted or inferred output to known labels of the one or more expected output data 496 (e.g., known objects associated with the image frames, known actions associated with the image frames, known outputs associated with the one or more image frames) that was included in the training data item. Processing logic determines an error (i.e., a classification error) based on the differences between the output of a machine learning model and the known classification (e.g., known objects, known actions, known pacing data, known poses, known segmented image data, known order tracking, etc.). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., object detector 481, order tracker 482, pacing determiner 483, action detector 484, instance segmenter 485, depth determiner 486, pose classifier 487) is trained to determine output data (e.g., object data 488, tracking data 489, pacing data 490, action data 491, instance segmentation data 492, depth data 493, pose data 494). A similar process may be performed to train machine learning models to perform other tasks such as those set forth above. A set of many (e.g., thousands to millions) image frames (e.g., image frames indicative of a state of a meal preparation area) may be collected and combined with order data (e.g., one or more pending meal orders associated with a current state of the meal preparation area) and expected output data 496 (e.g., known objects, known actions, know order tracking data, know pacing determinations, known segmented image data, known depth data, known pose classifications, etc.).

Once one or more trained machine learning models 478 are generated, they may be stored in model storage 479, and may be added to a kitchen management application (e.g., kitchen management component 118 on server 116 of FIG. 1). Kitchen management application may then use the one or more trained ML models 478 as well as additional processing logic to implement an automatic mode, in which user manual input of information is minimized or even eliminated in some instances.

In one embodiment, the one or more machine learning models are trained using data from one or multiple kitchens, and once trained may be deployed to other kitchens that may be different from those from which the training data was generated. In such an instance, a brief retraining may or may not be performed for one or more of the kitchens to tune the machine learning model for those kitchens. The brief retraining may begin with the trained machine learning model and then use a small additional training data set of data from a specific kitchen to update the training of the machine learning model for that specific kitchen.

In one embodiment, model application workflow 474 includes one or more trained machine learning models that function as one or more of an object detector 481, order tracker 482, pacing determiner 483, action detector 484, instance segmenter 485, depth determiner 486, and/or pose classifier 487. These logics may be implemented as separate machine learning models or as a single combined machine learning model in embodiments. For example, one or more of object detector 481, order tracker 482, pacing determiner 483, action detector 484, instance segmenter 485, depth determiner 486, and/or pose classifier 487 may share one or more layers of a deep neural network. However, each of these logics may include distinct higher level layers of the deep neural network that are trained to generate different types of outputs. The illustrated example is shown with only some of the functionality that is set forth in the list of tasks above for convenience. However, it should be understood that any of the other tasks may also be added to the model application workflow 495.

For model application workflow 495, according to one embodiment, input data 480 may be input into object detector 481, which may include a trained neural network. Based on the input data 480, object detector 481 outputs information (e.g., object data 488) indicative of objects associated with one or more image frames associated with a state of the kitchen. This may include outputting a set of classification probabilities for one or more objects of the object data 488. For example, processing logic may identify objects such as food items (e.g., burgers, fries, beverages), meal packaging, ingredients, employees (e.g. hand, arms, etc.), vehicles (e.g., in the drive-thru queue), cooking equipment (e.g., ovens, utensils, preparation area, counters, machines, etc.), and the like.

For model application workflow 495, according to one embodiment, input data 480 (e.g., one or more outputs of object detector 481 and/or location data associated with the object data 488) may be input into action detector 484, which may include a trained neural network. Based on the input data 480, action detector 484 outputs information (e.g., action data 491) indicative of actions associated with one or more image frames associated with a state of the kitchen. This may include outputting a set of classification probabilities for one or more actions of the action data 491. For example, action detector 484 may output the action performed (e.g., scooping the sauce), the location of the action (e.g., a first sauce station), and/or a time data (e.g., a timestamp) associated with the action. Some actions may include scooping an ingredient, placing an ingredient on a burger, filling a drink, placing an item in a toaster or a panini press, packing and/or assembly an item, and so on.

For model application workflow 495, according to one embodiment, input data 480 (e.g., outputs of one or more object detector 481, action detector 484), may be input into instance segmenter 485, which may include a trained neural network. Based on the input data 480, instance segmenter 485 outputs information (e.g., instance segmentation data 492) indicative of segmented image data of the received one or more image frames indicative of a state of the meal preparation area. For example, instance segmenter 485 may receive an image, identify the boundaries of different ingredient containers (e.g., ingredient containers 112 of FIG. 1), and output the discretized ingredient containers as instance segmentation data. In some embodiments, processing logic may associate various segmented and/or discretized boundaries. For example, instance segmenter 485 may receive object data that includes a detected hand and/or a detected cooking utensil.

For model application workflow 495, according to one embodiment, input data (e.g., ranging data, LIDAR data 480 may be input into depth determiner 486. Based on the input data 480, depth determiner 486 outputs information (e.g., depth data 493) indicative of detected depth of an image (e.g., an image taken using a LIDAR camera). Depth determiner 486 may further receive object specification data (e.g., dimensions of kitchen containers (e.g., length, width, and depth)). From one or more of the described inputs, the depth determiner 486 may determine the depth and/or fill level of contents of individual containers.

For model application workflow 495, according to one embodiment, input data 480 may be input into pose classifier 487, which may include a trained neural network. Based on the input data 480, pose classifier 487 outputs information (e.g., pose data 494) indicative of locations and/or orientations of employees (e.g., hand, arms, body) and other kitchen equipment (e.g., utensils, ovens, counters, etc.) In some embodiments, pose data is indicative of one or more locations of hands of employees in the presence of occlusions. For example, pose data may indicate a location and orientation of an arm that is visible in an image frame and determine the location/orientation of a hand (e.g., that is not visible in an image frame).

For model application workflow 495, according to one embodiment, input data 480 may be input into order tracker 482. Based on the input data 480 (e.g., one or more outputs of object detector 481, action detect 484, pose classifier 487), order tracker 482 outputs information (e.g., tracking data 489) indicative of one or more order associations, locations, and/or statuses associated with one or more image frames indicative of a state of the kitchen. This may include outputting a set of order tracking classification probabilities for one or more objects of the object data 488. For example, there may be probabilities associated with detected associations, statuses, and/or locations of a currently pending order currently being prepared. For example, processing logic may output tracking data that includes an indication of top data or data indicative of the last action associated with an order. For example, processing logic may combine object data with action data to determine a series of actions associated with an order.

For model application workflow 495, according to one embodiment, input data 480 (e.g., one or more outputs of object detector 481, action detect 484, order tracker 482), may be input into pacing determiner 483. Based on the input data 480, pacing determiner 483 outputs information (e.g., pacing data 490) indicative of a pace of one or more meal preparation procedures. For example, not to be interpreted as an exhaustive list, the following could be pacing actions outputted by the processing logic: prepping dough, placing toppings, loading and/or unloading a pizza to/from an oven, cutting a pizza, refilling ingredients, opening a restaurant, prepping sides, hand washing, using a POS system, checking temperature, using the cooler/freezer, assembling a product, packaging a product, attending a phone call, processing an order, counting inventory, delivering food to customer, drive-thru queue, and so on.

Figure 5A:
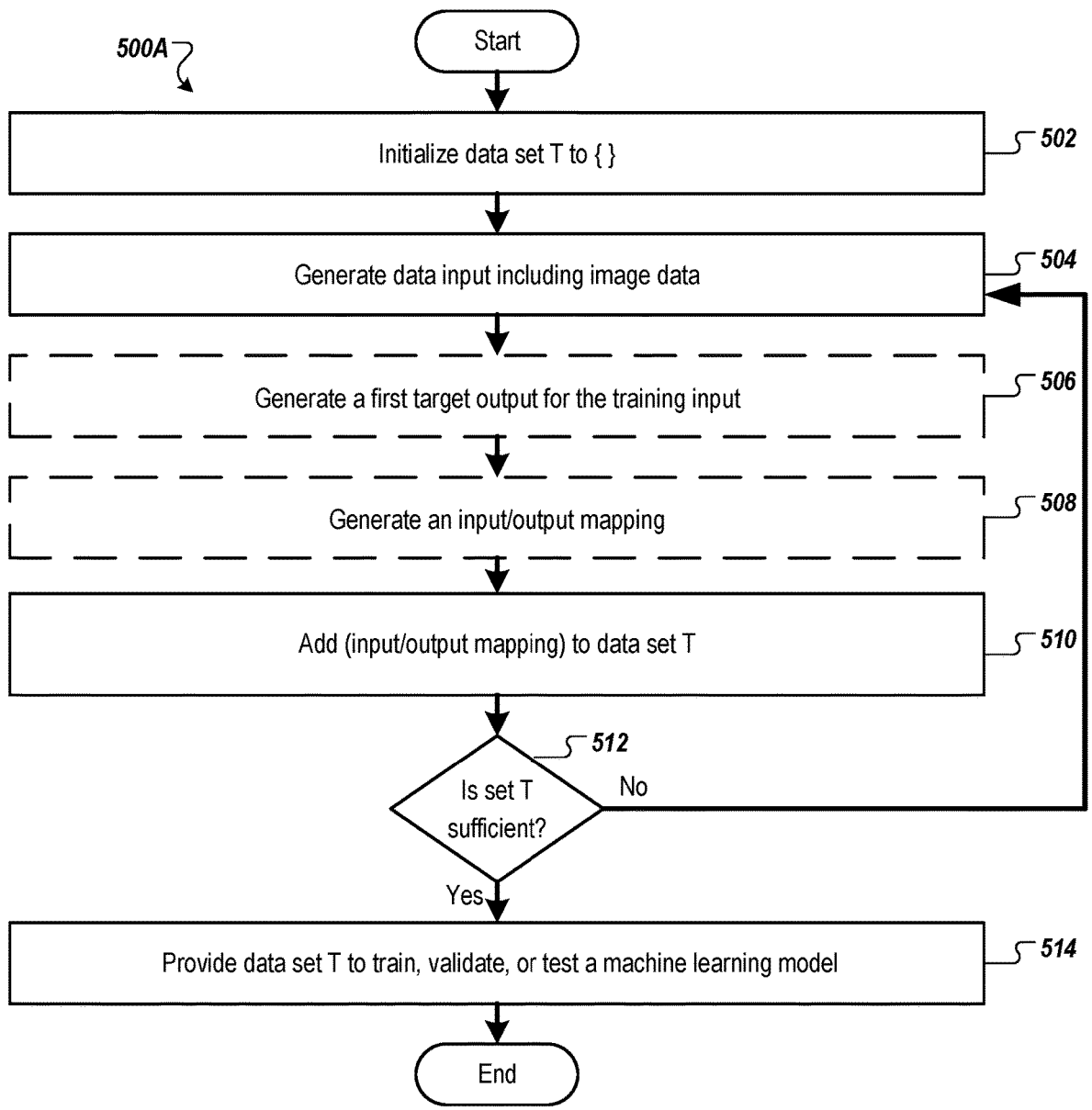
FIGS. 5A-C are flow diagrams of methods associated with processing image-based data, in accordance with some implementations of the present disclosure.
Figure 5B:
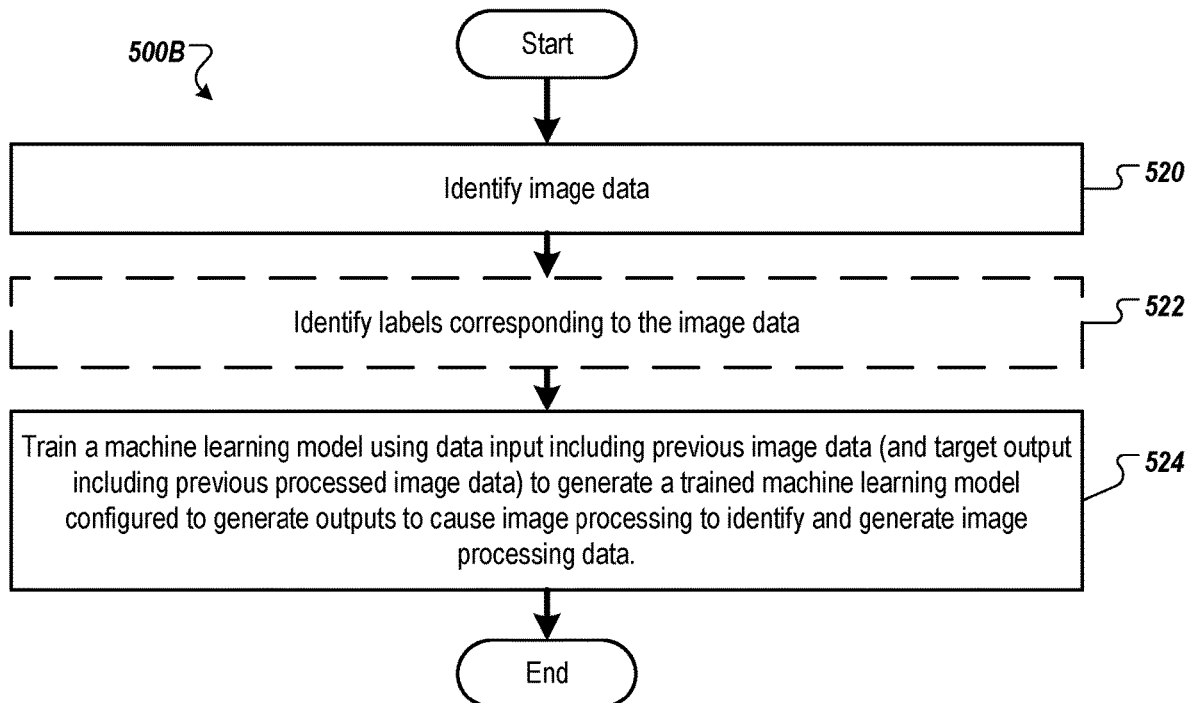
Figure 5C:
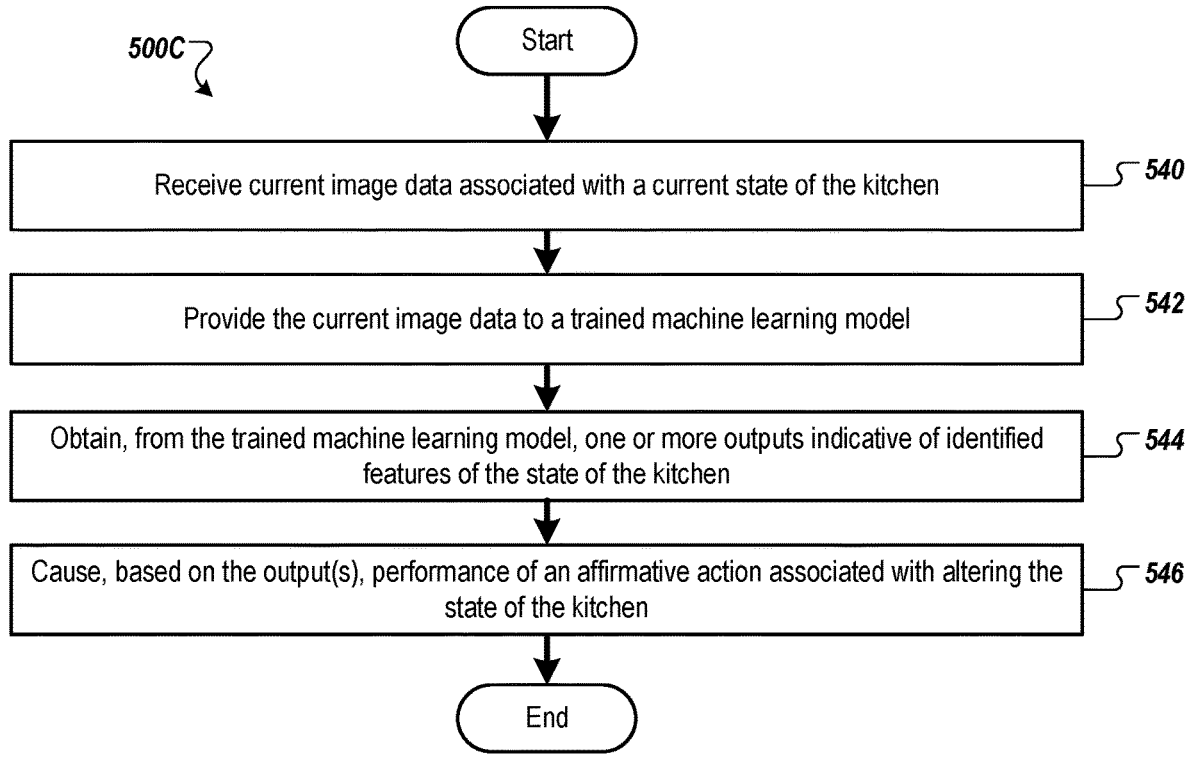

FIG. 5A-C are flow diagrams of methods 500A-C associated with processing image-based data, in accordance with some implementations of the present disclosure. Methods 500A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500A may be performed, in part, by machine learning system 210 (e.g., server machine 270, data set generator 272, etc.). Machine learning system 210 may use method 500A to at least one of train, validate, or test a machine learning model, in accordance with embodiments of the disclosure. In some embodiments, one or more operations of method 500A may be performed by data set generator 272 of server machine 270 as described with respect to FIGS. 2 and 4A. In some embodiments, methods 500B-C may be performed, in part, by machine learning system 210 (e.g., kitchen management server 212, kitchen management component 214, etc.). Machine learning system 210 may use method 500B to train a machine learning model, in accordance with embodiments of the disclosure. Machine learning system 210 may use method 500C to use a trained machine learning model, in accordance with embodiments of the disclosure. In some embodiments, one or more operations of methods 500B-C may be performed by kitchen management component 214 of kitchen management server 212 as described with respect to FIGS. 2 and 4B. It may be noted that components described with respect to one or more of FIGS. 1, 2, 3, 4A-B may be used to illustrate aspects of FIGS. 5A-C. In some embodiments, a non-transitory storage medium stores instructions that when executed by a processing device (e.g., of machine learning system 210) cause the processing device to perform methods 500A-C.

For simplicity of explanation, methods 500A-C are depicted and described as a series of acts. However, acts in accordance with this disclosure can occur in various orders concurrently, in parallel with multiple instances per store, and/or with other acts not presented and described herein. Furthermore, not all illustrated acts may be performed to implement the methods 500A-C in accordance with the disclosed subject matter. In addition, those skilled in the art will understand and appreciate that the methods 500A-C could alternatively be represented as a series of interrelated states via a state diagram or events.

Referring to FIG. 5A, method 500A is associated with generating a data set for a machine learning model for processing images to generate outputs 330.

At block 502, the processing logic implementing method 500A initializes a training set T to an empty set.

At block 504, processing logic generates first data input (e.g., first training input, first validating input) that includes image data (e.g., image frames captured using cameras 108A-C).

In some embodiments, at block 506, processing logic generates a first target output for one or more of the data inputs (e.g., first data input). The first target output may be, for example, object data 332, pacing data 334, tracking data 336, action data 338, etc. The processing logic may generate the target output based on the image data 252.

At block 508, processing logic optionally generates mapping data that is indicative of an input/output mapping. The input/output mapping (or mapping data) may refer to the data input (e.g., one or more of the data inputs described herein), the target output for the data input (e.g., where the target output identifies output data 266), and an association between the data input(s) and the target output. Processing logic may perform gradient descent and back propagation to update weights for nodes at one or more layers of a machine learning model, for example.

At block 510, processing logic adds the data input generated at block 504 and/or the mapping data generated at block 508 to data set T.

At block 512, processing logic branches based on whether data set T is sufficient for at least one of training, validating, and/or testing machine learning model 290. If so, execution proceeds to block 514, otherwise, execution continues back at block 504. In some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 514, processing logic provides data set T (e.g., to server machine 280) to train, validate, and/or test machine learning model 290. In some embodiments, data set T is a training set and is provided to training engine 282 of server machine 280 to perform the training. In some embodiments, data set T is a validation set and is provided to validation engine 284 of server machine 280 to perform the validating. In some embodiments, data set T is a testing set and is provided to testing engine 286 of server machine 280 to perform the testing. In the case of a neural network, for example, input values of a given input/output mapping (e.g., numerical values associated with data inputs 401) are input to the neural network, and output values (e.g., numerical values associated with target outputs 403) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 514, machine learning model (e.g., machine learning model 290) can be at least one of trained using training engine 282 of server machine 280, validated using validating engine 284 of server machine 280, or tested using testing engine 286 of server machine 280. The trained machine learning model may be implemented by kitchen management component 214 (of kitchen management server 212) to generate output data 330 for further use by kitchen management procedures (e.g., order accuracy tool 222, anticipatory preparation tool 224, gamification tool 226, drive-thru management tool 228, and/or limited time offer tool 229.

Referring to FIG. 5B, method 500B is associated with training a machine learning model for processing images to generate outputs (e.g., ML model outputs 264) that are actionable by a kitchen management component.

At block 520, processing logic identifies image data associated with a state of a kitchen. The image data may be acquired through cameras (e.g., cameras 108A-C). The sets of image data (e.g. image data 252) may be historical data corresponding images indicative of a past or previous state of the kitchen.

In some embodiments, at block 522, processing logic identifies labels corresponding to the image data. In some embodiments, the labels indicate object data (e.g., detected object in the image), pacing data (e.g., paces of action, recipes, food preparation steps, etc.), tracking data (e.g., tracking order through multiple images), location data (e.g., where a detected object or action is taking place), depth data (e.g., amount of ingredient left in a bin), and/or top data (e.g., the last action to be performed on a recipe).

At block 524, processing logic trains a machine learning model using data input including the image data (e.g., and target output including the labels) to generate a trained machine learning model configured to generate outputs (e.g., kitchen state data) that can be consumed by kitchen management application and/or tools.

In some embodiments, the machine learning model is trained based on data input (e.g., without target output) to generate a trained machine learning model using unsupervised learning (e.g., to cluster data). In some embodiments, the machine learning model is trained based on data input and target output to generate a trained machine learning model using supervised learning.

Referring to FIG. 5C, method 500C is associated with using a machine learning model for processing images to generate outputs (e.g., ML model outputs 264) that are actionable by a kitchen management component.

At block 540, processing logic receives current data. In some embodiments, the current data is image data associated with a current state of the kitchen and/or drive-thru. In some embodiments, the current data images including LIDAR data. The current data may include current frames of video captured by one or more cameras of a kitchen, for example.

At block 542, processing logic provides the current data (e.g., image data) to a trained machine learning model. The trained machine learning model may be trained by method 500B.

At block 544, processing logic obtains, from the trained machine learning model, one or more outputs. In some embodiments, the outputs include object data (e.g., object data 332), pacing data (e.g., pacing data 334), tracking data (e.g., tracking data 336), action data (e.g., action data 338), instance segmentation data (e.g., instance segmentation data 340), depth data (e.g., depth data 342), and/or pose data (e.g., pose data 344). At block 546, processing logic sends the generated outputs to an associated kitchen management subsystem. For example, processing logic may send the outputs to one of an order accuracy tool 222, anticipatory prep tool 224, gamification tool 226, drive-thru management tool 228, and/or limited time offer tool 229 as described in FIG. 2.

Figure 6:
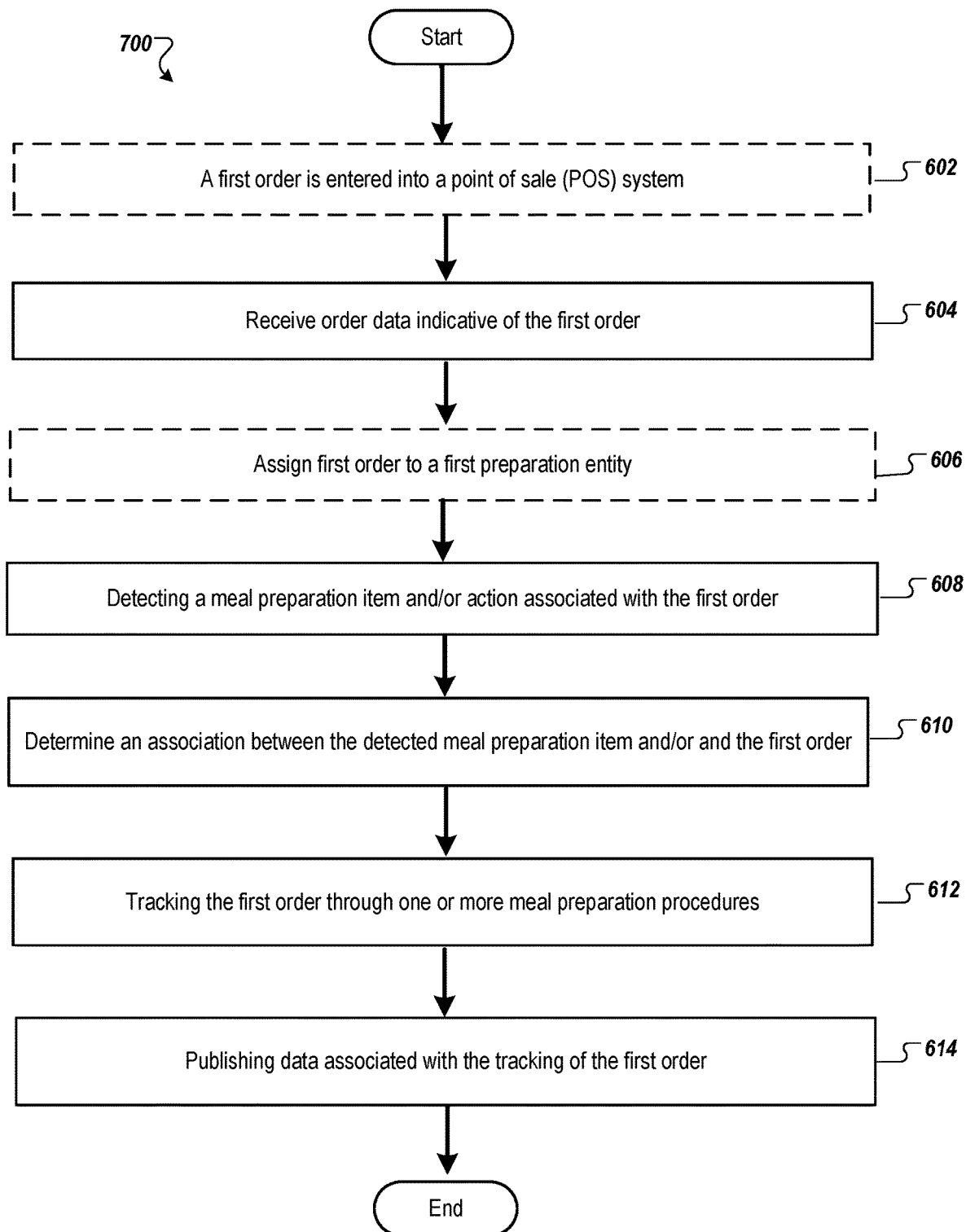
FIG. 6 depicts a flow diagram of one example method for assembly of an order throughout one or more meal preparation procedure, in accordance with some implementations of the present disclosure.

FIG. 6 depicts a flow diagram of one example method 600 for assembly of an order throughout one or more meal preparation procedures, in accordance with some implementations of the present disclosure. Method 600 is performed by processing logic that may comprise hardware (circuitry, dedicated logic, etc.), software (such as is run on a general purpose computer system or a dedicated machine), or any combination thereof. In one implementation, the method is performed using image processing tool 310 (e.g., tracking model 324) and/or kitchen management tool 350 (e.g., order accuracy tool 222, order accuracy logic 352) of FIG. 3, while in some other implementations, one or more blocks of FIG. 6 may be performed by one or more other machines not depicted in the figures.

At block 602, a first order is, optionally, entered into a point of sale (POS) system. The POS system may include one or more features and/or descriptions associated with POS system 102 and/or data integration system 202 of FIG. 1 and FIG. 2, respectively. In some embodiments, the first order is entered into the POS system by an employee interface (e.g., a register with POS interface capabilities). For example, order may be received in a lobby of a restaurant. In another example, order may be received through at a drive-thru. In some embodiments, the first order may be received electronically from a location a distance away from an associated restaurant.

At block 604, processing logic may receive order data indicative of the first order. The order data may include a list of one or more meal components to prepare and/or one or more meal preparation procedures to perform to complete the first order. In some embodiments, processing logic is integrated with a kitchen display system (KDS). For example, the first order may be displayed on the KDS, responsive to receiving the data indicative of the first order.

At block 606, processing logic, optionally, may assign the first order to a first preparation entity. The meal preparation area may operate with a one-to-one relationship between orders and meal preparation areas. For example, an order may be received and proceed through an assembly line of procedures before being completed where each order is filled sequentially one after another. The first order may be assigned to a first meal preparation station and/or meal preparation order and may be reassigned to another preparation entity and upon processing logic detecting completion of one or more meal preparation procedures. For example, the order may be presented to a first preparation station where a first meal preparation procedure is performed (e.g., preparing pizza dough), and then transferred to a second preparation station where a second meal preparation procedure is performed. In some embodiments, the POS may provide data to a kitchen display indicating information associated with an order. For example, the POS may indicate an order number and the contents of the order to the KDS.

In some embodiments, one or more actions may be detected. Processing logic may determine compound actions based on detecting the one or more actions. For example, processing may track a hand and detect the hand picking up an ingredient, tracking the hand, and then detecting the hand putting down the ingredient. Processing logic may string the action together and determine a compound action of relocating the ingredient from a first location to a second location. The series of multiple frame may occur across multiple image frames. For example, Pose data (e.g., pose data 344) may include data indicative of a pose of an employee. Pose data may include poses and/or gestures of people and/or their body parts, such as hands in specific positions associated with certain actions. Pose data may include an indication of the location and current position of a hand of the employee. For example, pose data may be associated with an action being performed (e.g., an employee scooping a first ingredient).

At block 608, processing logic may detect a meal preparation item or action associated with the first order. Processing logic may detect a first meal preparation item (e.g., pizza dough). Processing logic may detect movement of a meal preparation item to another meal preparation station and/or proximity to employee to perform a second meal preparation procedure (e.g., applying toppings to the pizza dough).

At block 610, processing logic may determine an association between the detected meal preparation item and/or action and the first order. Processing logic may associate an order with a preparation entity (e.g., an employee, preparation station) with the detected meal preparation item and/or action. For example, an employee proximate the detected meal item may be associated with preparing the first order (e.g., an employee who is actively contacting pizza dough may be associated with preparing an order associated with the instance of pizza dough).

In some embodiments, a state of the kitchen may include having more than one pending meal order. Orders may be assigned as they come in and newly detected objects may be compared against one or more pending meal order that have not been assigned to one or more meal preparation items, stations, and/or employees. For example, a state of the kitchen may include 6 pending meal orders currently being prepared. Processing logic can determine based on what meal preparation items have left the meal preparation area (e.g., delivered to a customer), whether one or more of the pending meal orders has been fulfilled. Based on the orders that remain unfulfilled, a detected meal preparation item or action may be associated with one or more of the unfulfilled pending meal orders.

In some embodiments, matching a detected meal preparation item and/or meal preparation action may include comparing a set of components of a first order to the detected meal preparation item. One of the set of components of the first order may have been associated with a previously prepared meal preparation item. For example, a hamburger may be detected. Another hamburger may have previously detected and assigned to a first order. The hamburger may be assigned to a second order based on the first order already assigned the first hamburger. In some embodiments, a distance algorithm (Euclidean distance, Cosine distance, etc.) may be used with data (metadata, embedded feature vectors, etc.) indicative of one or more detected meal preparation items and/or meal preparation actions to determine a proximity between the one or more detected meal preparation items and/or meal preparation actions. Processing logic may assign an order most proximate (e.g., feature vectors determined to be closest) to the one or more detected meal preparation items and/or actions.

In some embodiments, orders are assigned during the assembly of the one or more components at the end of the one or more meal preparation procedures. For example, at the conclusion of meal preparation the one or more meal components are assembled (e.g., packaged in a common container (e.g., bag)). As will be discussed in later embodiments, processing logic may compare an order prepped for delivery (e.g., at a bagging area where components of an order are compiled together in a bag) with a list of pending meal orders to determine one or more errors in the completed order. For example, processing logic may determine an absence of a meal preparation item based on a comparison between a detected meal prepped for delivery and the one or more pending meal orders.

In some embodiments, it may be determined from image data that an order (or subset of an order) is completed. Processing logic may compare the completed order (or subset of the order) against order data and determine whether the completed order (or subset of the order) is identified with one or more of the pending order of the order data. For example, processing logic may determine an employee is packaging a cheeseburger. For example, processing logic may search the order data and determine whether a cheeseburger is found within one of the pending meal orders. As will be discussed further in association with FIG. 8, processing logic may determine a meal preparation error, for example, by failing to identify a cheeseburger within the pending meal orders. For example, a field of view of a camera may include a food delivery area to a drive-thru. An order may be tracked as components are placed into a bag. Processing logic can track which items are placed in the bag and track the bag as it is delivered to a customer. Processing logic can determine errors associated with food delivery. The items associated with each bag may be accounted for as the one or more bags are delivered to a customer within a vehicle. Processing logic may detect a customer leaving and indicate one or more meal preparation items that were missing from the delivered meal.

At block 612, processing logic tracks the first order through one or more meal preparation procedures. Processing logic may continue to track the pending meal order through a meal preparation area by detecting relocation of one or more meal preparation items associated with the first order and detecting further meal preparation procedures (e.g., cooking the pizza, boxing the pizza, delivering the pizza, etc.).

In some embodiments, tracking of meals within the restaurant occurs frame by frame as the one or more meal preparation items relocates within the meal preparation area. Alternatively or additionally, meals may be tracked based on predicted actions to be performed. Processing logic may predict a time duration a meal preparation item may be occluded from a view of a camera. Processing logic may predict a future location of a meal preparation item. For example, a current meal may include instructions to cook a first item for a first duration and processing logic may predict the first item may be disposed proximate a cooking appliance. In a further example, processing logic may infer that first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the present of object detections of the first item a second location (e.g., output from the oven).

In some embodiments, processing logic tracks a "top" action and/or meal preparation item. A "top" item/action may indicate the meal preparation item and/or meal preparation action most recently associated with a meal being prepared. Often the top meal preparation item is located on top of a meal currently being prepared. For example, an employee may add a hamburger to a bun. The hamburger may be the top meal preparation item. An employee may add tomato to the burger. The tomato may then be the top meal preparation item. The top meal item may be tracked over the course of preparing a meal order to determine any meal preparation errors. In some embodiments, preparing one or more pending meal orders may include performing actions in a specific order. Tracking what action and/or meal item on top allows for processing logic to determine meal preparation errors associated with ordering of meal preparation steps.

In some embodiments, processing logic tracks an order based on actions associated with pose data (e.g., pose data 344 of FIG. 3). As previously described, pose data may include detecting the location of hands and meal preparation tools (e.g., scooping utensil) and making associations between the detected hands and meal preparation tools. In some embodiments, processing logic may determine a meal preparation tool (e.g., a serving utensil, a meal delivery tool, etc.) based on the image data. For example, a serving spoon may be identified. Processing logic may determine an association between one or more pending meal order and a preparation entity. For example, based on the image data, processing logic may determine an association between a serving spoon and a first employee responsive to detecting a proximity between the employee and the serving spoon (e.g., the employee is hold the serving spoon).

Processing logic may determine an association between a meal preparation item or meal preparation action and the preparation entity. For example, the employee may scoop a first ingredient into a bowl associated with a meal order. The employee may then be associated with preparing the meal order. Processing logic may assign or otherwise associate the employee with the meal order.

In some embodiments, processing logic tracks a list of ingredients and some metadata about those ingredients. The metadata may include actions and timestamps associated with the list of ingredients. For example, the metadata may include a location of where the ingredient was added and a timestamp when they were added to a meal being prepared. Metadata may also indicate a state of the ingredient. For example, an ingredient may be occluded (e.g., the ingredient is packaged or placed in a bag). The metadata may include instructions for processing logic to continue tracking an object when an ingredient changes state (e.g., placed into a bag).

At block 614, processing logic may publish data associated with the tracking of the first order. The published data may be used by one or more kitchen management processes. For example, order accuracy logic (e.g., order accuracy logic 352 of FIG. 3), anticipatory prep logic (e.g., anticipatory prep logic 354 of FIG. 3), gamification logic (e.g., gamification logic 356 of FIG. 3), drive-thru management logic 358 of FIG. 3), and/or limited time offer logic (e.g., limited time offer logic 360 of FIG. 3) may utilize the published order tracking data.

The data may include a list of ingredients, actions, timestamps, and/or other information associated with an order. The data may be used by pacing logic (e.g., pacing model 334 or method 700 of FIG. 7) to further determine pacing data (e.g., pacing data 322) based on the published data. For example, the published data may include a tabulation of all actions that were performed on an order at different time and which objects were detected for that order at different times. The published data may also include data indicative of identified image frames and locations within the image frames where detections (e.g., actions, objects, etc.) occurred (e.g., pixel locations). The data may include instructions for a display device to highlight or otherwise indicate where detections are being made on one or more image frames.

In some embodiments the published data can be accessible by an endpoint device such as a client device (e.g., client device 207 of FIG. 2) or kitchen display system (e.g., KDS 104 of FIG. 1). An endpoint device can receive a video feed for one or more particular orders. For example, a particular order may be requested (e.g., order number 'x' on a given day). The published data may include image data (e.g., a video stream) of the detections made by the processing logic over the course of preparing that particular meal. The published data may include a list of timestamps that are associated with that particular order. The image data may include a segmented video stream with image data spliced together of the timestamps where one or more detections are made by the processing logic.

Figure 7:
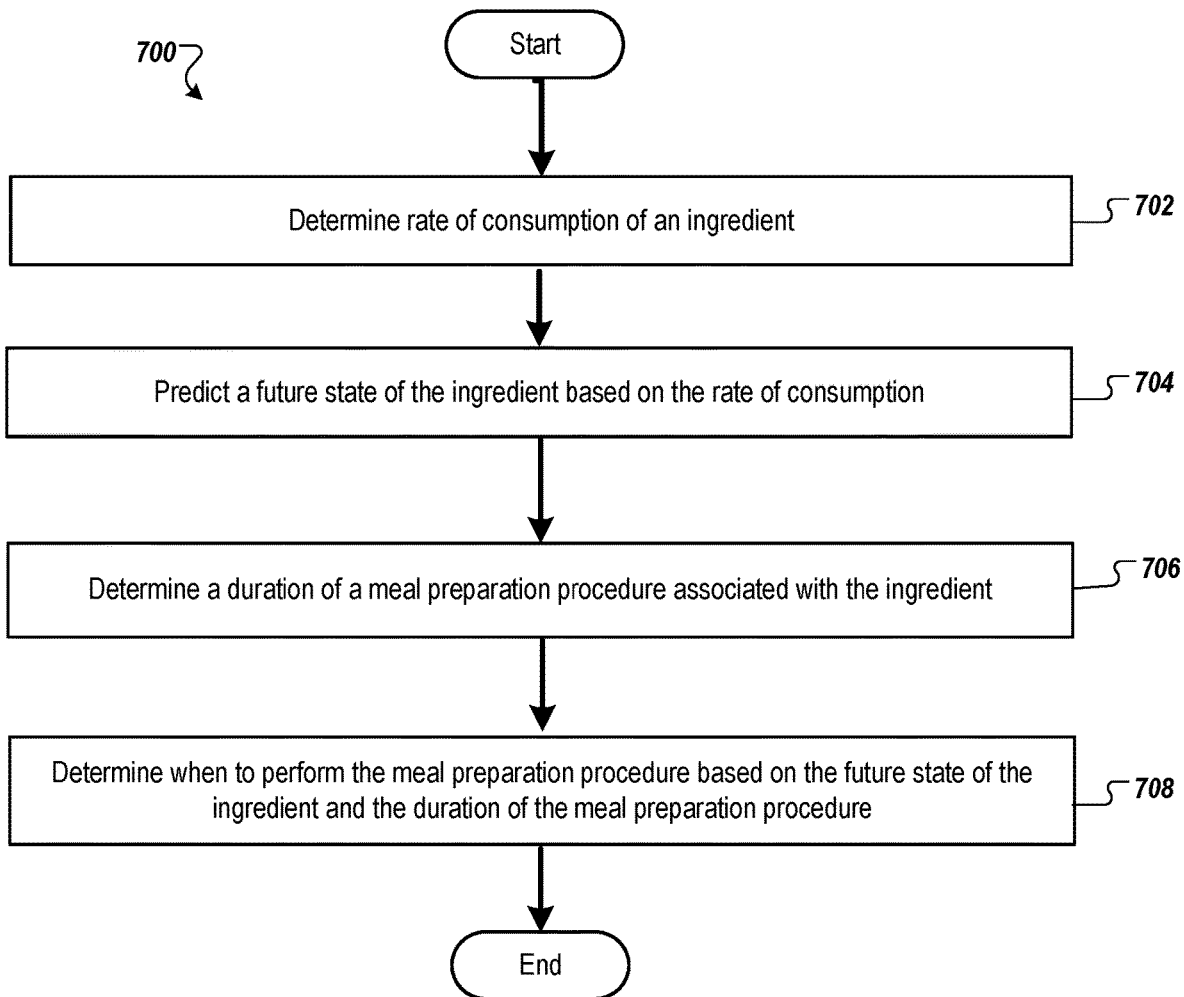
FIG. 7 depicts a flow diagram of one example method for processing one or more image data to determine pacing data, in accordance with some implementations of the present disclosure.

FIG. 7 depicts a flow diagram of one example method 700 for processing one or more image data to determine pacing data, in accordance with some implementations of the present disclosure. Method 700 may be performed by processing logic that may comprise hardware (circuitry, dedicated logic, etc.), software (such as is run on a general purpose computer system or a dedicated machine), or any combination thereof. In one implementation, the method is performed using image processing tool 310 (e.g., pacing model 322) and/or kitchen management system 220 (e.g., order accuracy tool 222, anticipatory prep tool 224, gamification tool 226, drive-thru management tool 228) of FIG. 3 and FIG. 2, respectively, while in some other implementations, one or more blocks of FIG. 7 may be performed by one or more other machines not depicted in the figures.

At block 702, processing logic may determine a rate of consumption of an ingredient. In some embodiments the rate of consumption includes an inventory forecast over an upcoming time duration. Processing logic may receive a current quantity of the ingredient. For example, methodology associated with FIGS. 9 and 12 may be used to determine a volume of an ingredient with the bin and determine an overall quantity of an ingredient. Processing logic may use a historical rate of change of the ingredient to determine the rate of consumption of the ingredient. For example, process logic may receive past image frames and determine actions associated with the ingredient and how much of an ingredient is being used with each action.

In some embodiments, customer flow data may be received by processing logic and used to determine the rate of consumption of the ingredient. For example, processing logic may determine an average consumption of the ingredient per order (e.g., 70% of orders order a meal item with the first ingredient, or on average 1.2 units of the first ingredient are consumed per order) and predict using customer flow data (e.g., amount of people and/or cars entering an order placement area) how many upcoming orders are expected over an upcoming time duration. In some embodiments, image data including one or more image frames indicative of a quantity of cars in the drive-thru or order queue line may be leveraged to determine the customer flow data.

At block 704, processing logic may predict a future state of the ingredient based on the rate of consumption. The future state may be indicative of consuming a first prepared ingredient. The first ingredient may include one or more preparation steps. For example, fries may need to be cut, cooked, salted and the future state may be associated with the consumption of the prepared fries. The future state may be indicative of the consumption of a first ingredient within a first container. For example, a first container may include a condiment that whose quantity within the first container is consumed. The condiment may or may not require additional preparation steps to replace an inventory of the condiment disposed within the first container. The future state of the ingredient may be associated with an expiration or a time duration associated with a time of use deadline. For example, after a predicted time, a first ingredient should be replaced to prevent expiration of the ingredient.

At block 706, processing logic may determine a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action has occurred. Processing logic may query multiple image frames to determine an average action duration. The average action duration may take into account the state of the kitchen or a predicted future state of the kitchen. For example, processing logic may determine a number of employees currently available to perform the action, resource commitments to other actions (e.g., an oven being used by another meal preparation procedure), an inventory forecast (e.g., a quantity of available resources or a prediction of a future quantity of an available resource), prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on is associated with the meal preparation procedure and may be attributed to a portion of the duration of the meal preparation procedure.

At block 708, processing logic may determine when to perform the meal preparation procedure based on the future state of the ingredient and the duration of the meal preparation procedure. In some embodiments, the meal preparation procedure is displayed on a graphical user interface (GUI). For example, processing logic may determine that the preparation of a first quantity of fries should be initiated within a future time window (e.g., 5-10 minutes). The instruction to initiate preparation of the French fried may be displayed on a KDS (e.g., KDS 104 of FIG. 1).

In some embodiments, pacing data (e.g., a duration of a meal preparation procedure determined at block 706) may be used in associated with order tracking methodology (e.g., method 600 of FIG. 6) to determine pacing data associated with one or more orders as they are assembled. A time duration of one or more steps of order preparation may be tabulated and aggregated into pacing data associated with an example. For example, a time duration for making a hamburger from start to finish may be aggregated by adding up the action times of the individual steps. For example, metadata stored in association with an order may store and aggregate pacing data (e.g., timestamps of actions performed, list of meal preparation steps, etc.).

In some embodiments, pacing data may be used to perform inventory forecasting for an operational duration of the kitchen. For example, processing logic may determine a number of bins of a first ingredient to prepare at the beginning of a day. Processing logic may determine whether the inventory prepared in the morning will last the entirety of the day and if more inventory of the first ingredient needs to be prepared. Processing logic may predict a future time associated with the first ingredient being consumed and a future time in which a meal preparation action should be performed to maintain an active prepared inventory of the first ingredient throughout the day. In some embodiments, the inventory forecasting determined by the processing device may be based on macroscopic changes in the inventory (e.g., a rate of inventory consumption through a minimum threshold window). For example, sudden changes in inventory over a smaller window of time (e.g., microscopic) inventory change may be calculated with many small windows of time to get an average macroscopic inventory rate of consumption.

In some embodiments, processing logic publishes pacing data (e.g., one or more action durations, rate of consumptions, meal preparation time durations, etc.) for other processing logic to utilize. In some embodiments, the pacing data may include data associated with a testing pacing of various meal preparation actions and can be sorted and organized associated with an employee, an action, a meal item, etc. An endpoint may access the pacing data and/or query the pacing data using one or more of these pacing data associations. For example, the pacing data may be filtered by pacing of actions performed by a first employee, actions performed at a first preparation station, actions performed in associated with a specific order, among other filtering limitations. In some embodiments, the pacing data may be aggregated from many actions to provide a broader statistical representation of one or more meal preparation actions associated with the kitchen. For example, a time duration between filling sequential orders of orders within a requested time period may be accessed. In another example, the pacing analytics can be filtered more granularly. Pacing data for a specific action (e.g., scooping the chicken and/or sprinkling the lettuce) may be determined for the orders that occurred within the requested time period. The pacing data may be filtered and aggregated to form data selected flexible data analytics associated with the state of the kitchen as various timestamps throughout operation.

In some embodiments, process logic may associate the pacing data with financial data. Processing logic may determine a financial cost associated with one or more meal preparation actions durations. For example, an action duration may be compared with one or more of an employee hourly rate, inventory cost, equipment operation costs, and/or the like in determining a cost to perform an action. Processing logic may determine one or more lost profits associated with one or more meal preparation actions. Pacing data associated with one or more meal preparation items may be indicative of one or more meal preparation dependencies. For example, pacing data of one or more action steps may be indicative of a bottleneck associated with one or more meal preparation items and/or actions. A set of actions may be delayed based on equipment limitations (e.g., awaiting an oven to be available), and/or ingredient preparation instructions (e.g., topping a pizza is delayed due to awaiting the ingredients to be prepped to top the pizza, and the like).

Figure 8:
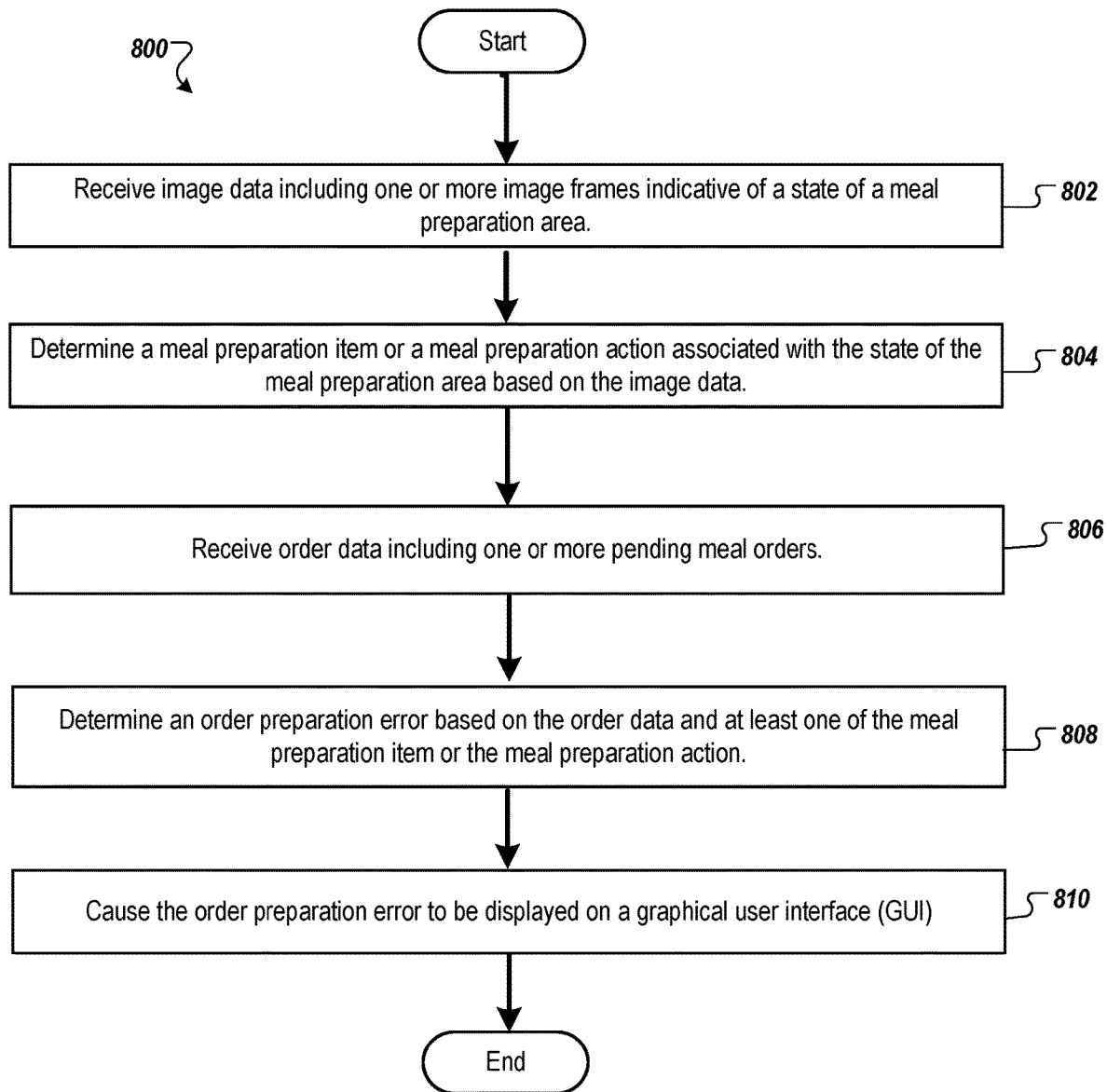
FIG. 8 depicts a flow diagram of one example method for processing image data to determine an order preparation error, in accordance with some implementations of the present disclosure.

FIG. 8 depicts a flow diagram of one example method 800 for processing image data to determine an order preparation error, in accordance with some implementations of the present disclosure. Method 800 is performed by processing logic that may comprise hardware (circuitry, dedicated logic, etc.), software (such as is run on a general purpose computer system or a dedicated machine), or any combination thereof. In one implementation, the method is performed using kitchen management tool 350 (e.g., order accuracy tool 222, order accuracy logic 352) of FIG. 3, while in some other implementations, one or more blocks of FIG. 8 may be performed by one or more other machines not depicted in the figures.

Method 800 may include receiving image data (e.g., through data acquisition system 230 of FIG. 2) associated with a state of a meal preparation area and processing the image data to determine a meal preparation item or meal preparation action associated with the image data. The determined meal preparation item or meal preparation action is further used with order data (e.g., a list of pending meal orders) to determine an order preparation error.

At block 802, image data including one or more image frames indicative of a state of a meal preparation is received. As described in association with other embodiments, the image data may include one or more image frames captures by one or more cameras disposed at or proximate to a meal preparation area. For example, one or more cameras may be disposed at an elevated location (e.g., ceiling) and orientated to capture image frames of a meal being prepared in a meal preparation area (e.g., kitchen). The one or more image frames of the image data may be sequential image frames taken by the same camera with a similar point of view. In some embodiments, the images data may include one or more non sequential image frames (e.g., images taken earlier or later). In some embodiments, the image data may include one or more image frames captured by different cameras with different points of view of a meal preparation area (e.g., simultaneously or at different times). For example, one camera may be positioned in a drive-thru area while another camera may be positioned at an ingredient preparation area.

At block 804, processing logic determines at least one of a meal preparation item or a meal preparation action associated with the state of the meal preparation area based on the image data. The image data may include various image frames of a state of the meal preparation area. In some embodiments, the image frames may include multiple meal preparation items (e.g., ingredients, packaging, kitchen appliances, storage containers, and so on) within the captured images. In some embodiments, the image frame may capture actions performed within the kitchen (e.g., scooping an ingredient, cooking an ingredient, packaging an ingredient, delivering a prepared meal, etc.). The image data may be processed (e.g., using image processing tool 310) to determine objects, recognize actions, and track orders, among other things.

In some embodiments, image data is used as input to one or more trained machine learning models. The machine learning model(s) may be trained to receive the image data and generate one or more outputs. The one or more outputs may be indicative of a meal preparation item and/or a meal preparation action. For example, one or more image frames indicative of a state of a kitchen may be received by the one or more trained machine learning model. The trained machine learning model(s) may each generate an output indicating a detected ingredient (e.g., a hamburger, fries, a drink, etc.) and/or that an action is being performed (e.g., cooking a hamburger, salting fries, filling a drink, etc.). The detected meal preparation item and/or meal preparation action may be associated with one or more pending meal orders. For example, order tracking methodology (e.g., method 600 of FIG. 6) may be employed to associate with one or more meal preparation item and/or actions with an associated pending meal order.

In some embodiments, the machine learning model(s) generates one or more outputs that indicate a level of confidence that the meal preparation item or the meal preparation action is associated with the order data and the image data. Processing logic may further determine that the level of confidence satisfies a threshold condition. For example, the machine learning model may receive image data and generate a first output that identifies a first ingredient and a second output that indicate a level of confidence of the first output. Processing logic may determine whether the level of confidence meets a threshold condition (e.g., a minimum level of confidence) before proceeding to further steps of method 600.

In some embodiments, processing logic may determine or infer a first meal preparation action by determining one or more related meal preparation actions. For example, a first meal preparation action may be inferred even if it is not captured in image data. Processing logic may determine a second meal preparation action based on a first image frame of image data. Processing logic may determine the first meal preparation action based on the second meal preparation action. The first meal preparation action may occur outside a line of sight (LOS) of an image capture device associated with the image data. As discussed in later embodiments, actions performed in the meal preparation area may be performed outside a LOS of a camera. For example, ingredient retrieval from a storage location (e.g., freezer) may occur outside the field of view of a camera. In another example, actions may be obstructed from view of a camera. An employee may obstruct the view of the camera and the camera may not capture an action being performed, however, a later action may be used to determine that the obstructed action was performed. For example, an employee may be preparing a hamburger and reach for a tomato and place the tomato on the hamburger. However, the placement of the tomato on the hamburger may be obstructed from view of the camera. The camera may capture the employee retrieving the tomato from a bin and processing logic may determine that the tomato was placed on the hamburger. Accordingly, processing logic may use information on a first state of a food preparation area from a first time and a later second state of the food preparation area at a second time to determine that a particular action must have been performed to transition the food preparation area from the first state to the second state. In some embodiments, image data showing the first state and image data showing the second state may be input into a trained machine learning model, which may generate an output indicating the performed action was performed at a time between the first time and the second time.

At block 606, processing logic receives order data including one or more pending meal orders. In some embodiments, the systems may receive order data by pulling data from a kitchen management (e.g., point of sale (POS) system) application programming interface (API). Order data may include one or more pending meal orders. A pending meal order may include one or more meal preparation items and/or one or more meal preparation actions (e.g., preparation instructions) to be prepared for a customer. In some embodiments, a pending meal order may include a set of items associated with a combination of meal items (e.g., a "combo"). In some embodiments, meal preparation may include a target quantity. For example, a "chicken nugget meal" may include a target quantity of 6 chicken nuggets. A target quantity may be associated with a meal preparation action. For example, a meal item may include a "bowl of ice cream" and a target quantity may include two scoops. In another example, a meal may include a set of target meal components based on the order data. The processing logic may determine an absence of one of the set of target meal components based on the image data.

In some embodiments, tracking of meals within the restaurant occurs frame by frame as the one or more meal preparation items relocates within the meal preparation area.

For example, for each frame of a video feed, one or more actions, poses and/or objects associated with a particular order may be identified and marked. Metadata may be generated indicating the order, the detected action, pose, object, etc., the location in the frame that the action, pose, object, etc. was detected, and so on. Alternatively or additionally, meals may be tracked based on predicted actions to be performed. Processing logic may predict a time duration that a meal preparation item may be occluded from a view of a camera. Processing logic may then expect the meal preparation item to enter a field of view of the camera after the time duration has expired. Processing logic may predict a future location of a meal preparation item based on a current location of the meal preparation item, a detected action being performed on the meal preparation item, a user post, and/or other information. For example, a current meal may include instructions to cook a first item for a first duration and processing logic may predict that the first item may be disposed proximate to a cooking appliance at the end of the first duration. In a further example, processing logic may infer that a first item may be occluded from the view of the camera when placed inside the cooking appliance. Processing logic may also determine a future location of the first item after cooking is completed (e.g., a pizza oven may have a first location to input the item and a second location to output the item). Processing logic may infer the absence of object detections of the first item for a duration and may infer the presence of object detections of the first item at a second location (e.g., output from the oven). In some embodiments, to determine errors, processing logic uses one or more order tracking methodology such as process logic associated with FIG. 6.

At block 808, processing logic determines an order preparation error based on the order data and at least one of the meal preparation item or the meal preparation action. An order preparation error may include, but is not limited to, determining an inaccurate ingredient (e.g., missing lettuce or too little of an ingredient), incorrect item (e.g., missing drink), inaccurate packaging (e.g., used cheeseburger packaging but should have used hamburger packaging), incorrect number of items (e.g., seven chicken pieces instead of six) missing miscellaneous item (e.g., missing sauce packets, utensils, etc.), missing or incorrect sets of items in a completed order (e.g., missing a hamburger, or used chicken taco instead of chicken burrito), incorrect quantity of items, and other meal preparation errors.

In some embodiments, processing logic may include determining an order density based on the order data. For example, processing logic may determine a number of orders that are currently pending. In some embodiments, the order data may be given a classification. For example, the order density may be classified as light, average, or heavy based on a number of currently pending orders. As discussed previously, order density may be used to alter a threshold condition for accepting and/or further processing outputs from one or more of the machine learning models discussed herein.

In some embodiments, processing logic tracks a "top" action and/or meal preparation item. A "top" item/action may indicate the meal preparation item and/or meal preparation action most recently associated with a meal being prepared. Often the top meal preparation item is located on top of a meal currently being prepared. For example, an employee may add a hamburger to a bun. The hamburger may be the top meal preparation item. An employee may add tomato to the burger. The tomato may then be the top meal preparation item. The top meal item may be tracked over the course of preparation a meal order to determine any meal preparation errors. In some embodiments, preparing one or more pending meal orders may include performing actions in a specific order. Tracking what action and/or meal item on top allows for processing logic to determine meal preparation errors associated with ordering of meal preparation steps.

In some embodiments, order data may include a one-to-one mapping between meal items to prepare and preparation entities (e.g., employee, preparation stations) to prepare the meal item. For example, a meal item (e.g., a sandwich) may be prepared entirely by the same employee and/or at the same preparation station. In some embodiments, processing logic may determine a meal preparation tool (e.g., a serving utensil, a meal delivery tool, etc.) based on the image data. For example, a serving spoon may be identified. Processing logic may determine an association between one or more pending meal orders and a preparation entity. For example, based on the image data, processing logic may determine an association between a serving spoon and a first employee responsive to detecting a proximity between the employee and the serving spoon (e.g., the employee is holding the serving spoon).

Processing logic may determine an association between a meal preparation item or meal preparation action and the preparation entity. For example, the employee may scoop a first ingredient into a bowl associated with a meal order. The employee may then be associated with preparing the meal order. Processing logic may assign or otherwise associate the employee with the meal order.

In some embodiments, processing logic may determine a meal preparation error based on an identified meal preparation item or action and an association between an employee or preparation station and a meal order. Processing logic may determine an error when an employee who has been assigned with making a meal order performs an action not used or not associated with the preparation of the assigned meal preparation item. For example, processing logic may determine an error when an employee who has been assigned to prepare a hamburger picks up a hot dog. In some embodiments, an employee or preparation station may be assigned or otherwise associated with preparing a portion of an order. For example, a first employee may cook a first ingredient and a second employee may retrieve and assemble the first ingredient into a packaged meal combination.

In some embodiments, it may be determined from image data that an order (or subset of an order) is completed. Processing logic may compare the completed order (or subset of the order) against order data and determine whether the completed order (or subset of the order) is identified with one or more of the pending orders of the order data. For example, processing logic may determine an employee is packaging a cheeseburger. Processing logic may search the order data and determine whether a cheeseburger is found within one of the pending meal orders. Processing logic may determine a meal preparation error by failing to identify a cheeseburger within the pending meal orders.

In some embodiments, processing logic may determine a meal preparation error based on an inferred quantity of the meal preparation item associated with one or more pending meal orders. For example, processing logic can determine that a quantity of a scoop of an ingredient is outside a threshold target quantity range (e.g., above an upper target threshold or below a lower target threshold). The quantity estimation of the scoop may be determined using quantity estimation described in association with FIG. 10.

In some embodiments, the determined meal preparation error may be associated with an error severity indicator. Processing logic may further determine if the error severity indicator meets a severity threshold condition. In some embodiments, a first error may be assigned as a level one error, and a second error may be assigned as a level two error. For example, a first error level may be associated with missing one or more auxiliary meal preparation items (e.g., napkins). A second error level may be associated with missing one or more components of a combination order (e.g., missing hamburger, fries, and/or a beverage of a meal combination). The order severity threshold may be modified by other received inputs and/or conditions. Processing logic may alter or use different severity threshold conditions based on the state of the meal preparation area. For example, as will be discussed further in later embodiments, processing logic may determine an order density of upcoming meal orders. In one instance, an order density may include a current volume of orders corresponding to a current state of the kitchen. In another instance, an order density may include a volume of orders within a target meal delivery time window. In another instance, image data captured of an order placement area (e.g., at a register, drive thru, etc.) may be used to predict an upcoming order volume which can be used to determine the order density. During conditions when the order density is above a threshold density level, the severity threshold condition may include a higher severity level requirement. For example, during busy (e.g., high order density) states of the kitchen, detected errors only of a high level of severity (e.g., second severity level) will be further processed relative to less busy (e.g., lower order density) states of the kitchen. Accordingly, during busy periods minor errors such as missing napkins may not be corrected. However, during less busy periods such minor errors may be corrected.

At block 810, processing logic may cause the order preparation error to be displayed on a graphical user interface (GUI). In some embodiments, the order preparation error is displayed on a kitchen display system (e.g., KDS 104 of FIG. 1). The order preparation error may be displayed proximate to an associated order. The order preparation error may include remedial instructions associated with correcting the order preparation error. For example, the error may include incorrect packaging for a first meal item, and remedial instruction may include replacing incorrect packaging with correct packaging. In another example, an error may include an incorrect quantity of a meal item and remedial instruction may include adding or removing an amount of the meal item to satisfy a target quantity. In another example, the processing logic may determine a quantity does not meet target quantity.

In some embodiments, the order preparation error is indicated to a meal preparation area via an auditory or visual feedback system. An auditory and/or visual feedback may alert one or more employees to a meal preparation error determined by the processing logic. In some embodiments the order preparation error is indicated to one or more employees dynamically (e.g., while steps of a meal order are concurrently occurring). The error may be indicated prior to the completion of the order. For example, later meal preparation items may be saved from use on an incorrectly prepared order by alerting the one or more employees while preparation is occurring. In some embodiments, the auditory or visual feedback system may include an auditory device that emanates a sound (e.g., a tone or song) associated with a meal preparation error. For example, processing logic may cause a sound to play when one or more meal preparation errors are determined in a live meal preparation environment. In some embodiments, the auditory or visual feedback system includes a light source (e.g., a light emitting diode (LED)). The light source may be visible in a meal packaging area and may emit a light responsive to processing logic determining a meal preparation error. In some embodiments, the auditory or visual feedback system may include one or more other visual, audio, and/or haptic (e.g., device vibrations) feedback output by (e.g., displayed, emitted from, etc.) by a meal preparation component (e.g., a KDS, speak system, POS, etc.).

In some embodiments, the order preparation error may be indicated to one or more employees at or near the end of a meal preparation procedure. For example, an employee may receive a notification indicating the order preparation error during packaging (e.g., bagging) an order into a deliverable container. In some embodiments, the notification may include an animation on a graphical user interface (GUI) (e.g., on a KDS monitor near a packaging/bagging area). In some embodiments, processing logic may cause a digital model (e.g., popup model) indicating a location of the error within a meal preparation area on a GUI.

In some embodiments, processing logic may prevent a meal order from being processed or may otherwise alter processing of a meal order based on determining a meal preparation error. Processing logic may prevent an order from being closed on a POS system. For example, processing logic may be prevent marking an order as complete on a touchscreen KDS system (e.g., in or near a packaging/bagging area). In another example, processing logic may prevent one or more inputs (e.g., press a button, dragging action (a "swipe"), etc.) on a touchscreen KDS (e.g., in or near a packaging/bagging area) responsive to determining the meal preparation error.

In some embodiments, processing logic may leverage one or more of the aforementioned feedback mechanisms (e.g., auditory or visual feedback system) independent of the determined specific type of meal preparation errors. For example, one or more feedback mechanism may be employed to indicate meal preparation mistakes, such as using an incorrect type and/or quantity of a meal preparation item throughout and/or at the completion of preparation of a meal order. In another example, the one or more feedback mechanisms may be employed to indicate when one more meal items are delivered to the wrong customer. In another example, one or more feedback mechanisms may be employed to determine meal preparation and/or quality deficiencies identified through processing methodology described herein.

In some embodiments, processing logic may receive an input from the one or more employees indicative of an accuracy or inaccuracy of the displayed meal preparation error. For example, processing logic may display a meal preparation error that is inaccurate. The employee may provide an input (e.g., using employee interface 206 of FIG. 2). The input may indicate the error was proper or improper. The input associated with the properness of the error may be used to further train the machine learning model (e.g., to increase accuracy of object detection model 314, tracking model 324, action recognition model 316, and/or order accuracy logic 352). In some embodiments, an input may be received to label meal preparation errors. For example, labels may include labeling meal preparation errors as proper and/or improper.

In some embodiments, the meal preparation errors may be aggregated and presented collectively on a graphical user interface. For example, many meal preparation errors may be stored and viewed together (e.g., in a post-mortem analysis of kitchen operations). Algorithms may be performed on the meal preparation errors to determine statistics of the meal preparation errors such as most common meal preparation errors, error density, relationships between error densities to order densities, and so on.

Figure 9:
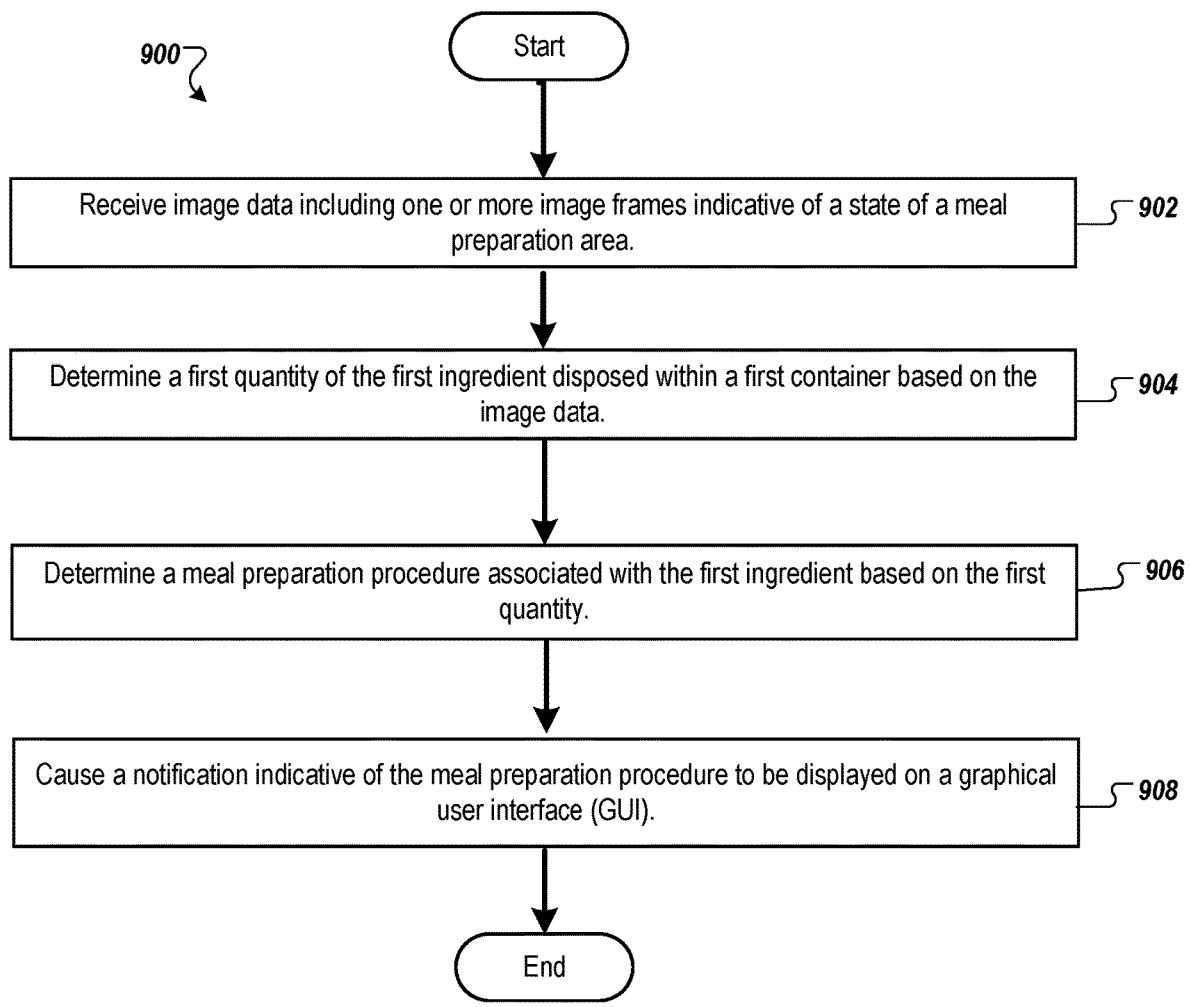
FIG. 9 depicts a flow diagram of one example method for processing image data to determine meal preparation procedures to be performed in anticipation of a future state of a meal preparation area, in accordance with some implementations of the present disclosure.

FIG. 9 depicts a flow diagram of one example method for processing image data to determine meal preparation procedures to be performed in anticipation of a future state of a meal preparation area, in accordance with some implementations of the present disclosure. Method 900 is performed by processing logic that may comprise hardware (circuitry, dedicated logic, etc.), software (such as is run on a general purpose computer system or a dedicated machine), or any combination thereof. In one implementation, the method is performed using kitchen management tool 350 (e.g., anticipatory prep logic 354) of FIG. 3, while in some other implementations, one or more blocks of FIG. 9 may be performed by one or more other machines not depicted in the figures.

Method 900 may include receiving image data (e.g., through data acquisition system 230 of FIG. 2) associated with a state of a meal preparation area and processing the image data to determine a first quantity of an ingredient disposed within a first container based on the image data. The determined quantity may be used further to determine an order preparation procedure associated with the ingredient.

At block 902, image data including one or more image frames indicative of a state of a meal preparation are received. As described in association with other embodiments, the image data may include one or more image frames captured at or proximate to a meal preparation area. For example, one or more cameras may be disposed at an elevated location (e.g., ceiling) and orientated to capture image frames of meals being prepared in a meal preparation area (e.g., kitchen). The one or more image frames of the image data may be sequential image frames taken by the same camera with a similar point of view. In some embodiments, the image data may include one or more non-sequential image frames (e.g., images taken earlier or later). In some embodiments, the image data includes one or more image frames taken by different cameras with different points of view of a meal preparation area (e.g., simultaneously or at different times). For example, one camera may be positioned in a drive-thru area while another camera may be positioned at an ingredient preparation area.

At block 904, processing logic determines a first quantity of a first ingredient disposed within a first container based on the image data. In some embodiments, as will be discussed in association with FIG. 12, processing logic may determine depth data from image data and/or from ranging data to determine a depth of one or more containers storing one or more meal preparation items. Depth data (e.g., an array of distances from the one or more cameras to a first ingredient stored within a meal preparation container) may be used to determine how much of an ingredient is remaining within a meal preparation container. In some embodiments, a cross-sectional area of the meal preparation container may be used with the depth data to determine the remaining volume of an ingredient stored within a container.

In some embodiments, as will be discussed further in association with FIG. 8, processing logic may segment the image data into regions associated with one or more containers. For example, a meal preparation area may include multiple ingredient containers used to store individual ingredients to be used to prepare an order. Processing logic may determine a first container location of a first container within the meal preparation area. Processing logic may identify a first ingredient based on the first container location. Processing logic may determine a first quantity of the first ingredient based on identifying the first ingredient. For example, a first ingredient (e.g., sliced tomatoes) may be stored at a first location. Processing logic may identify the first ingredient (e.g., sliced tomatoes) based on the location of the associated container storing the tomatoes. Processing logic may further determine a quantity of the sliced tomatoes (e.g., using depth/ranging data as described previously). In some embodiments, the identity of an ingredient may be used with the depth data to determine a first quantity. For example, a first ingredient may include an average density, an average thickness, an average diameter, and/or an average chunkiness, which process logic may use to determine a remaining quantity of the first ingredient disposed within a container. For example, processing logic may have access to information indicating a depth of a container, and indicating a distance between a camera and the top of the storage container when the storage container is full. Processing logic may determine a depth of the contents of the container below the top of the container and use that determined depth to determine a remaining depth and volume of the container is full. Processing logic may further determine a quantity of food preparation items in the container based on known average geometries of the food preparation items in the container and the remaining volume of the container occupied by the food preparation items.

In some embodiments, the processing logic may determine a container moved from a first location to a second location within a meal preparation area based on the image data (e.g., depth/ranging data). For example, a container housing a first ingredient may be identified at a first location. From the image data, processing logic can determine that the first container holding the first ingredient has moved to a second location. Actions associated with the second location can be associated with the first ingredient based on determining the location change.

In some embodiments, processing logic may determine a rate of consumption of an ingredient. In some embodiments the rate of consumption includes an inventory forecast over an upcoming time duration. Processing logic may receive a current quantity of the ingredient. For example, methodology associated with FIG. 12 may be used to determine a volume of an ingredient within the bin and determine an overall quantity of an ingredient. Processing logic may use a historical rate of change of the ingredient to determine the rate of consumption of the ingredient. For example, process logic may receive past image frames and determine actions associated with the ingredient and how much of an ingredient is being used with each action. Estimated rate of change of the ingredient may be based on types of orders, time of day, a business state of the kitchen, and/or other information, for example.

At block 906, processing logic determines a meal preparation procedure associated with the first ingredient based on the first quantity. The meal preparation procedure may be a procedure that prepares the first ingredient so that it is ready to be used in orders. Processing logic may receive pacing data (e.g., pacing data 334 of FIG. 3) and/or data indicative of a state of the kitchen and/or predicted future state of the kitchen. Processing logic may determine a duration of a meal preparation procedure associated with the ingredient.

As previously described, image data may be received and processing logic may detect one or more action outputs from one or more image frames. The one or more action outputs may be associated with a start and/or end time of an action. The start and end time of an action may be indicative of how long an action requires to be completed. Processing logic may query multiple image frames to determine an average action duration. The average action duration may take into account the state of the kitchen. Determining the meal preparation procedure may be based on pacing data using one or more pacing methodologies (e.g., using method 700 of FIG. 7).

The meal preparation procedure may include refilling the first ingredient within the first container and/or replacing the first container with a second container including the first ingredient. In some embodiments, the meal preparation procedure may include preparing a meal preparation tool. For example, the meal preparation procedure may include turning on/off meal preparation equipment (e.g., preheating an oven, starting up a cutting device, etc.) In another example, the meal preparation procedure may include packaging/unpackaging equipment, preparing a store for opening/closing, and/or relocating one or more meal preparation items (e.g., delivering a completed order).

In some embodiments, processing logic determines a time duration indicative of an amount of time the first ingredient is disposed within a container. The processing logic may use the amount of time to determine a meal preparation procedure. For example, a first ingredient may have a lifetime time duration before expiration or safe consumption. A time duration may indicate when the ingredient may be replaced to prevent expiration.

In some embodiments, processing logic receives (e.g., from a point of sale (POS) system) order data indicative of one or more pending meal orders. Processing logic may determine a meal preparation procedure further using the order data. For example, order tracking methodology (e.g., method 600 of FIG. 6) may be used to track one or more orders within a meal preparation order. The order tracking methodology may associate one or more meal preparation items and/or orders to one or more pending meal orders of the order data. A quantity of pending meal orders may be indicative of an order density. As previously noted, processing logic may predict a depletion rate of the first ingredient based on image data and use the current quantity to predict a future meal preparation procedure time. The depletion rate may be used along with a time an ingredient is disposed within a container to predict a replacement time at which the container may be empty and need to be refilled and/or replaced.

In some embodiments, processing logic may predict a duration of a meal preparation procedure associated with the ingredient. As previously described, image data may be received and processing logic may detect one or more action outputs from one or more image frames. The one or more action outputs may be associated with a start and/or end time of an action. The start and end time of an action may be indicative of how long an action has taken. Processing logic may query multiple image frames to determine an average action duration. Predicting the duration of the meal preparation procedure may be based on the average action duration. Predicting the duration of the meal preparation action may further be based on a predicted future state of the kitchen. For example, processing logic may determine a number of employees available to perform the action, resource commitments to other actions (e.g., an oven being used by another meal preparation procedure), an inventory forecast (e.g., a quantity of available resources), and/or prerequisite actions (e.g., a pan must first be cleaned to be used to cook an ingredient, chicken must be battered before cooked). In some embodiments, the duration of the meal preparation action is a time duration for a compound action (e.g., an action requiring multiple steps).

In some embodiments, the meal preparation procedure may include preparing a meal preparation tool associated with the ingredient. For example, preheating an oven, cleaning equipment, preparing secondary ingredients, and so on is associated with the meal preparation procedure and may be attributed to a portion of the duration of the meal preparation procedure.

In some embodiments, image data is used as input to a machine learning model. The machine learning model may be trained to receive the image data and generate one or more outputs. The one or more outputs may be indicative of a meal preparation procedure. For example, an image of a kitchen may be received by the machine learning model. The machine learning model may generate an output indicating an anticipatory preparation procedure (e.g., a future time and/or action to prepare a meal preparation item).

In some embodiments, the machine learning model generates one or more outputs that indicate a level of confidence that the meal preparation procedure should be performed. Processing logic may further determine that the level of confidence satisfies a threshold condition. For example, the machine learning model may receive image data and generate a first output that identifies a first anticipatory action and a second output that indicates a level of confidence of the first output. Processing logic may determine whether the level of confidence meets a threshold condition (e.g., a minimum level of confidence) before proceeding.

At block 908, processing logic causes a notification indicative of the meal preparation procedure to be displayed on a graphical user interface (GUI). In some embodiments, the meal preparation procedure is displayed on a kitchen display system (KDS) (e.g., KDS 104 of FIG. 1). The meal preparation procedure may include a time and action to be performed. For example, the display may indicate instructions such as "cook chicken in 5 minutes."

Figure 10:
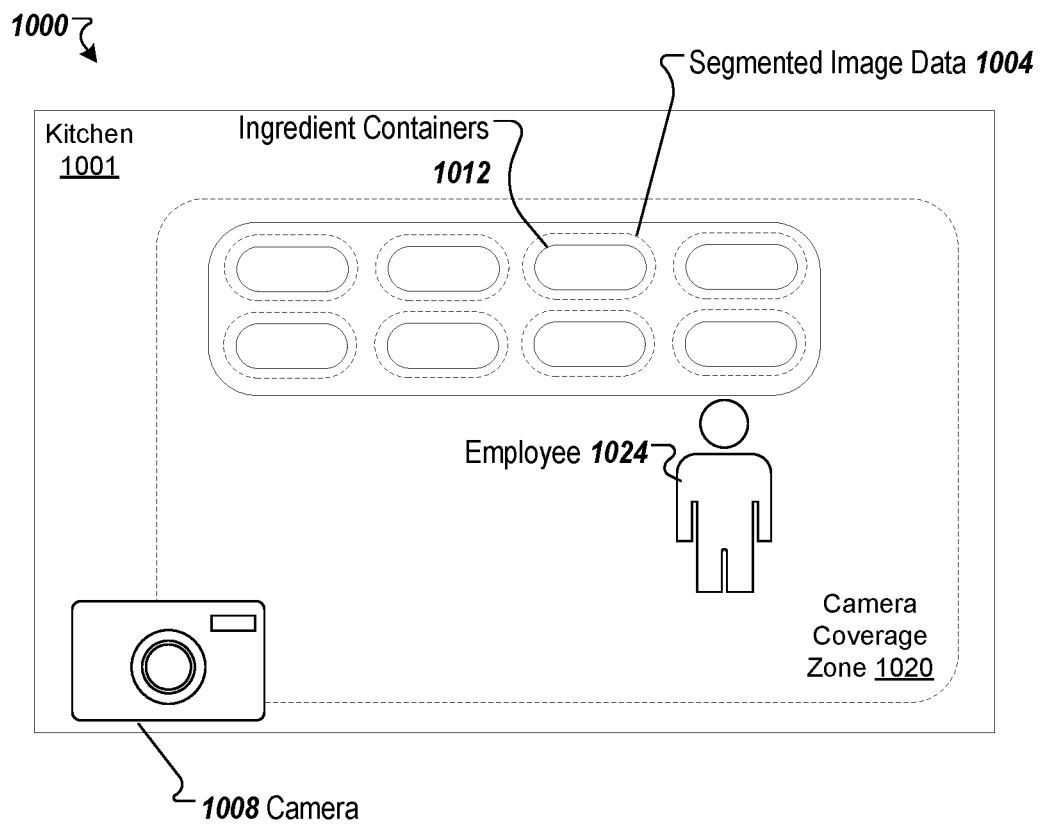
FIG. 10 depicts an image-based kitchen tracking system, according to certain embodiments.

FIG. 10 depicts an image-based kitchen tracking system 1000, according to certain embodiments. As shown in FIG. 10, the image-based kitchen tracking system 1000 may include one or more cameras 1008 with one or more camera coverage zones 1020. As described in association with other embodiments, image data captured by camera 1008 may include multiple ingredient containers 1012 disposed at various locations within a meal preparation zone.

In some embodiments, the image-based kitchen tracking system 1000 may identify ingredient containers 1012 within image frames captured within the camera coverage zone 1020 within the kitchen 1001. The image-based kitchen tracking system may segment different instances of the ingredient containers 1012 as separate containers. In some instances, image data associated with the ingredient containers 1012 may be labeled or otherwise indicate a relationship between the location within the frame and an identity of the meal preparation item stored within the container.

In some embodiments, the image-based kitchen tracking system 1000 may identify relocation of one of the ingredient containers 1012 to a different location within the kitchen 1001. Each bin may be segmented within the image data and each bin may have its location tracked over the course of many image frames capture by camera 1008. For example, an employee 1024 may pick up one of the ingredient containers 1012 and slide the container to a new location. The image-based kitchen tracking system 1000 may detect this change across multiple image frames and update labeling of the system with the updated location of the container.

In some embodiments, the image-based kitchen tracking system 1000 detects replacement of one of the ingredient containers (e.g., to and/or from a location outside the camera coverage zone 1020). The image-based kitchen tracking system 1000 may determine (e.g., using replacement and relocation tracking) a duration a meal preparation item has been disposed within the container.

Figure 11:
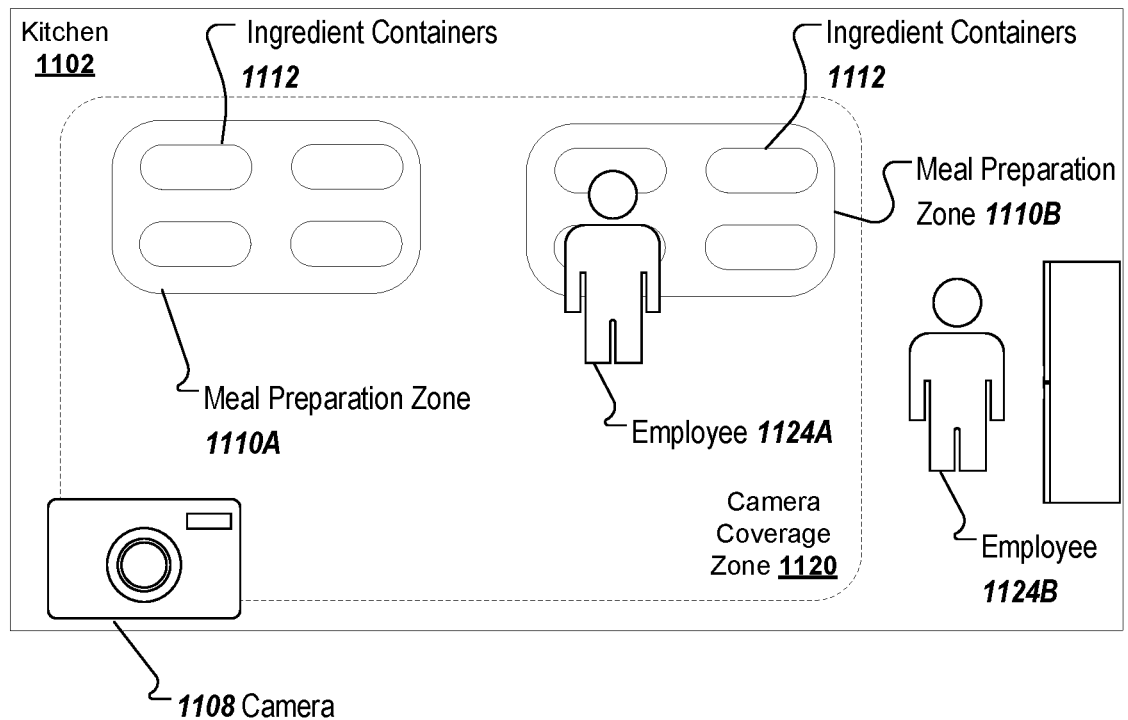
FIG. 11 depicts an image-based kitchen tracking system, according to certain embodiments.

FIG. 11 depicts an image-based kitchen tracking system 1100, according to certain embodiments. As shown in FIG. 11, the image-based kitchen tracking system 1100 includes one or more cameras 1108 and associated camera coverage zones 1120 of a kitchen 1102. The kitchen 1102 may include one or more meal preparation zones 1110A-B. The meal preparation zones 1110A-B may include one or more ingredient containers 1112. The ingredient containers 1112 may house one or more meal preparation ingredients.

As noted in previous embodiments, order data may be matched or otherwise associated with an employee 1124A-B and/or a meal preparation zone 1110A-B. The image-based kitchen tracking system 1100 may detect order preparation errors (e.g., using order accuracy tool 222) based on actions performed by one or more employees 1124A-B and/or performed at one or more meal preparation zones 1110A-B. Processing logic may determine an error when an employee who has been assigned with making a meal order performs an action not used or not associated with the preparation of the assigned meal preparation item. For example, processing logic may determine an error when an employee who has been assigned to prepare a hamburger picks up a hot dog. In some embodiments, an employee 1124A-B and/or meal preparation zone 1110A-B may be assigned or otherwise associated with preparing a portion of an order. For example, a first employee may cook a first ingredient and a second employee may retrieve and assemble the first ingredient into a packaged meal combination.

In some embodiments, processing logic may determine a first meal preparation action by determining one or more related meal preparation actions. Processing logic may determine a second meal preparation action based on a first image frame of image data. Processing logic may determine the first meal preparation action based on the second meal preparation action. The first meal preparation action may occur outside a line of sight (LOS) of a camera (e.g., behind an obstruction, outside the camera coverage zone 1120) associated with the image data. Meal preparation actions performed in the meal preparation area may be performed outside a LOS of a camera. For example, ingredient retrieval from a storage location (e.g., freezer) may occur outside the field of view of a camera. In another example, actions may be obstructed from view of a camera. An employee may obstruct the view of the camera and the camera may not capture an action being performed, however, a later action may be used to determine the obstructed action was performed. For example, an employee may be preparing a hamburger and reach for a tomato and place the tomato on the hamburger. However, the placement of the tomato on the hamburger may be obstructed from view of the camera. The camera may capture the employee retrieving the tomato from a bin and determine the tomato was placed on the hamburger.

The image-based kitchen tracking system 1100 may include tracking logic to track meal items throughout the kitchen 1102. The image-based kitchen tracking system 1100 may use meal tracking to determine and/or to facilitate object identification (e.g., when visual object detection is difficult to infer an object and/or action). For example, the image-based kitchen tracking system 1100 may detect a burger within the camera coverage zone 1120. However, for object detection it may be difficult to distinguish a beef burger against a veggie burger. Tracking logic may identify the burger based on past labeling of the object based on where the object was retrieved. For example, burgers may be stored at a first known location and veggie patties may be stored at a second known location. A burger may be retrieved from the first known location, and processing logic may label the detected object that could be either a burger or a veggie patty as a burger based on the location from which it was retrieved. Processing logic may track the burger across video frames from one or more cameras, and associate the burger label with the burger identified in each of those frames.

In some embodiments, image-based kitchen tracking system 1100 may include tracking logic that identities actions and can predict future obstructions and/or future states of the kitchen 1102 when an object may no longer be obstructed. For example, a meal may be placed within an oven for a predetermined amount of time. The image-based kitchen tracking system 1100 may expect the meal to be obstructed for a duration of time and expect the meal to be unobstructed after the duration of time (e.g., cooking time of the meal). The image-based kitchen tracking system 1100 may track a list of ingredients (e.g., associated with pending meal orders) and metadata associated with the list of ingredients. The metadata may include when and/or where an ingredient was detected, a quantity of the ingredient, an action associated with the ingredient (e.g., cooking in the oven, packaged and/or ready for delivery, etc.), and so on. The metadata may store a collection of timestamps of objects and/or action detections associated with the meal. In some embodiments, the metadata may include a location (e.g., a pixel within an image frame) each object and/or action is detected. The metadata may be used to identify an object (e.g., a pixel within the image frame may be assigned a first ingredient location). The metadata may be used by order tracking logic (e.g., method 600 of FIG. 6) to track an order across frames of a video and/or cameras, to maintain an association between an order and an employee and/or to maintain an association between an order and a preparation station. For example, the metadata may include an order identification, ingredient identification(s), action identification(s), pose identification(s), an employee identification and/or preparation station identification (e.g., kitchen staff 1 and/or preparation station 1).

In some embodiments, metadata from multiple object and/or action detections may be combined (e.g., when multiple objects and/or actions are associated with the same meal). For example, a combination meal, or a meal having multiple components, may combine metadata and/or data indicative of meal preparation history for each meal component of the combination into an individual associated data unit. The meal preparation history (e.g., metadata) may be used to determine a meal preparation error. A meal preparation error may be determine once a set of meal objects are assembled. For example, when a set of meal items are being packaged for delivery to a customer, the data associated with a set of meal preparation items may be confirmed (e.g., an error may be detected and indicated to an employee to remedy).

In some embodiments, object and/or action detections along with order tracking may be used to determine pacing data of meal preparation procedures. Timestamps at the start and end of actions may be aggregated to determine a pace of an associated action. Some exemplary actions that may be paced in a kitchen include: prepping dough, placing ingredients, loading/unloading meal to/from oven, cutting a meal, refilling ingredients, opening/closing kitchen, prepping ingredients, cleaning procedures, using freezer, assembling a meal, packaging meals, acquiring meal orders, delivering meal order, taking inventory and so on. Various actions may be combined to predict pacing of compound procedures (e.g., making a meal start to finish). As previously described, in some embodiments, the pacing data may be used by various embodiments to determine anticipatory preparation procedures. For example, processing logic may determine a rate of ingredient preparation (e.g., pacing data) to determine a future ingredient preparation time to ensure the ingredient will not be consumed prior to a new batch of the first ingredient being prepped. In another example, preparation time associated with a meal preparation tool (e.g., an oven) may be used to determine a time to preheat in preparation of preparation an associated meal preparation item.

Figure 12:
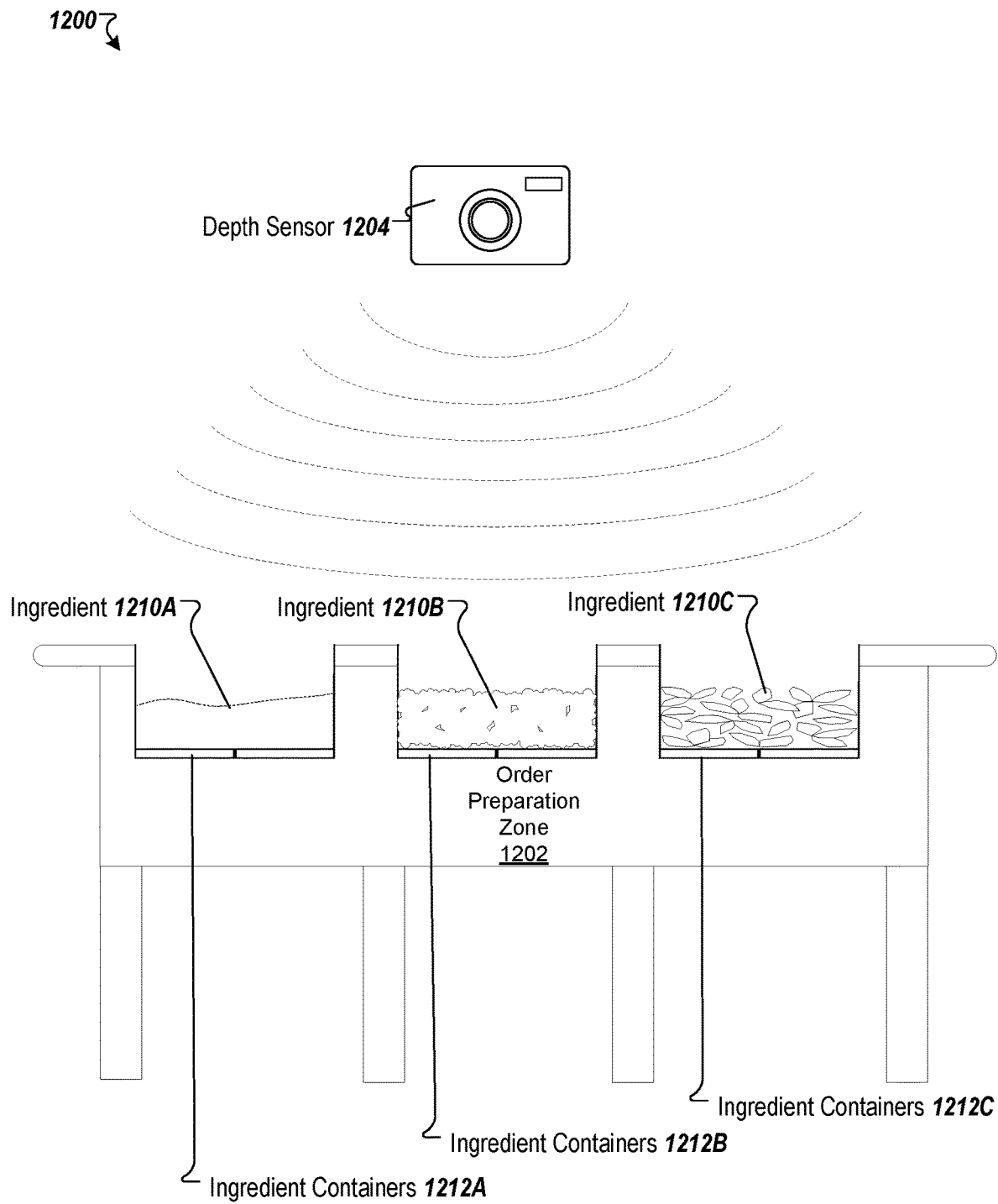
FIG. 12 depicts an image-based kitchen tracking system, according to certain embodiments.

FIG. 12 depicts an image-based kitchen tracking system 1200, according to certain embodiments. As noted previously, the image-based kitchen tracking system 1200 may include one or more depth sensors 1204. For example, the image-based kitchen tracking system 1200 may include a LIDAR camera. Other types of depth sensors include stereo cameras, cameras that use structured light projection, and so on. The depth sensor may determine depth of one or more ingredient containers 1212A-C of an order preparation zone 1202. The image-based kitchen tracking system 1200 may determine a depth of the unoccupied portion of the ingredient along with surface area data of the one or more ingredient containers 1212A-C to determine a volume of an ingredient 1210A-C within a container.

In some embodiments, a cross-sectional area of the meal preparation container may be used with the depth data and/or a known depth of the container to determine the remaining volume of an ingredient stored within a container. For example, processing logic may have access to information indicating a depth of a container 1212A-C, and indicating a distance between a camera (e.g., depth sensor 1204) and the top of the storage container 1212A-C when the storage container 1212A-C is full. Processing logic may determine a depth of the contents of the container (e.g., ingredient 1012A-C) below the top of the container and use that determined depth to determine a remaining depth and volume of the container. Processing logic may further determine a quantity of food preparation items in the container based on known average geometries of the food preparation items in the container and the remaining volume of the container occupied by the food preparation items.

In some embodiments, the image-based kitchen tracking system 1200 may segment the image data into regions associated with one or more containers. For example, a meal preparation area may include multiple ingredient containers used to store individual ingredients to be used to prepare an order. Processing logic may determine a first container location of a first container within the meal preparation area. Processing logic may identify a first ingredient based on the first container location. Processing logic may determine a first quantity of the first ingredient based on identifying the first ingredient. For example, a first ingredient (e.g., sliced tomatoes) may be stored at a first location. Processing logic may identify the first ingredient (e.g., sliced tomatoes) based on the location of the associated container storing the tomatoes. Processing logic may further determine a quantity of the first ingredient (e.g., sliced tomatoes), such as by using depth/ranging data as described previously. In some embodiments, the identity of an ingredient may be used with the depth data to determine a first quantity. For example, a first ingredient may include an average density, an average thickness, an average diameter, and/or an average chunkiness, which process logic may use to determine a remaining quantity of the first ingredient disposed within a container.

In some embodiments, the image-based kitchen tracking system 1200 may determine a volume of an ingredient (e.g., ingredient 1210A) before and after a meal preparation action to determine a quantity of an ingredient associated with the meal preparation action. For example, prior to retrieving the first ingredient 1210A, the imaged-based kitchen tracking system 1200 may determine a first volume of the first ingredient 1210A. A quantity of the first ingredient may be retrieved. After the quantity of the first ingredient is retrieved, the image-based kitchen tracking system 1200 may determine a second volume of the first ingredient 1210A disposed within the first ingredient container 1212A. The image-based kitchen tracking system 1200 may determine the quantity removed from the ingredient container 1212A based on a difference between the first and second volumes.

In some embodiments, the image-based kitchen tracking system 1200 may determine an upcoming order volume and/or density (e.g., from a second camera disposed in a meal ordering zone and/or meal retrieval zone and/or order data retrieved from a POS system). The image-based kitchen tracking system 1200 may determine a depletion rate of one or more ingredients 1210A-C based on one or more determined volumes and/or upcoming order volume and/or density.

In some embodiments, pose data (e.g., pose data 344) may be used to determine when to estimate a volume of an ingredient within the container. For example, pose data 334 may indicate when a meal preparation tool (e.g., ingredient retrieval device such as a serving spoon) is not currently disposed within a container (e.g., as to not affect depth/ranging data captured by depth sensor 1004).

Figure 13:
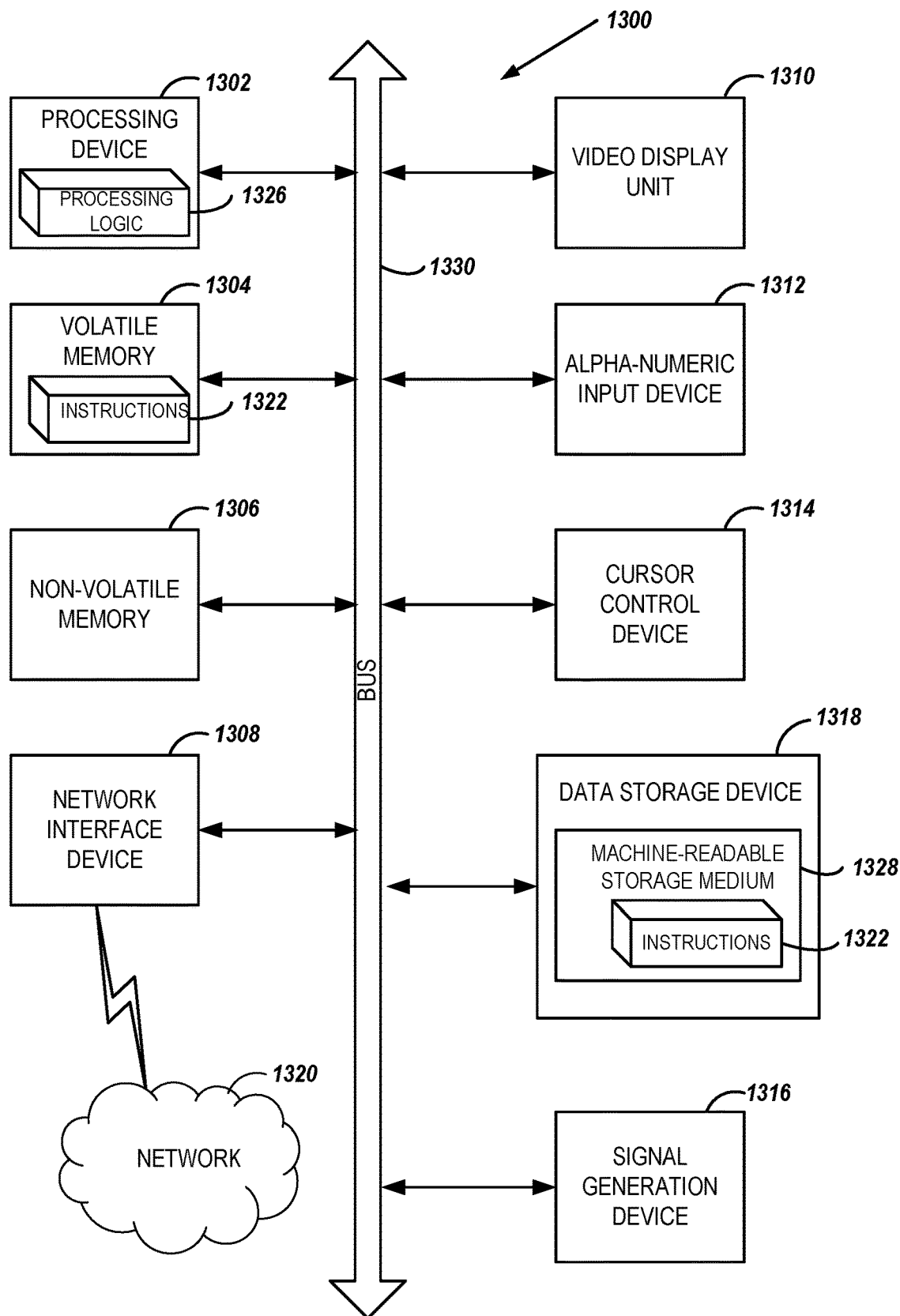
FIG. 13 depicts a block diagram of an example computing device, operating in accordance with one or more aspects of the present disclosure.

FIG. 13 depicts a block diagram of an example computing device 1300, operating in accordance with one or more aspects of the present disclosure. In various illustrative examples, various components of the computing device 1300 may represent various components of the POS 102, KDS 104 server 116, illustrated in FIG. 1 and machine learning system 210, data integration system 202, client device 207, data acquisition system 230, kitchen management system 220, illustrated in FIG. 2.

Example computing device 1300 may be connected to other computer devices in a LAN, an intranet, an extranet, and/or the Internet. Computing device 1300 may operate in the capacity of a server in a client-server network environment. Computing device 1300 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1300 may include a processing device 1302 (also referred to as a processor or CPU), a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a secondary memory (e.g., a data storage device 1318), which may communicate with each other via a bus 1330.

Processing device 1302 represents one or more general-purpose processing devices such as a microprocessor, central processing unit, or the like. More particularly, processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1302 may be configured to execute instructions implementing methodology described in association with FIGS. 1-12.

Example computing device 1300 may further comprise a network interface device 1308, which may be communicatively coupled to a network 1320. Example computing device 1300 may further comprise a video display 1310 (e.g., a liquid crystal display (LCD), a touch screen, or a cathode ray tube (CRT)), an alphanumeric input device 1312 (e.g., a keyboard), a cursor control device 1314 (e.g., a mouse), and an acoustic signal generation device 1316 (e.g., a speaker).

Data storage device 1318 may include a machine-readable storage medium (or, more specifically, a non-transitory machine-readable storage medium) 1328 on which is stored one or more sets of executable instructions 1322. In accordance with one or more aspects of the present disclosure, executable instructions 1322 may comprise executable instructions associated with methodology associated with FIGS. 1-12.

Executable instructions 1322 may also reside, completely or at least partially, within main memory 1304 and/or within processing device 1302 during execution thereof by example computing device 1300, main memory 1304 and processing device 1302 also constituting computer-readable storage media. Executable instructions 1322 may further be transmitted or received over a network via network interface device 1308.

While the computer-readable storage medium 1328 is shown in FIG. 13 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a processing device, image data comprising one or more image frames indicative of a state of a meal preparation area;
   determining, by the processing device, a first quantity of a first ingredient disposed within a first container based on the image data;
   determining, by the processing device, at least one of a depletion rate, a stock level, or a replenishment rate of the first ingredient based on the image data;
   determining, by the processing device, a meal preparation procedure associated with the first ingredient based on the first quantity and the at least one of the depletion rate, the stock level, or the replenishment rate; and
   causing, by the processing device, a notification indicative of the meal preparation procedure to be displayed on a graphical user interface (GUI).

2. The method of claim 1, wherein the meal preparation procedure comprises refilling the first ingredient within the first container or replacing the first container with a second container comprising the first ingredient.

3. The method of claim 1, further comprising:
   segmenting the image data into regions associated with one or more containers;
   determining a first container location of the first container within the meal preparation area; and
   identifying the first ingredient based at least in part on the first container location, wherein the first quantity is determined based at least in part on an identity of the first ingredient.

4. The method of claim 1, further comprising:
   determining a time duration prediction associated with performing the meal preparation procedure; and
   determining the meal preparation procedure further based on the time duration prediction.

5. The method of claim 4, wherein the meal preparation procedure is to generate more of the first ingredient disposed within the first container, the method further comprising:
   determining a time to start the meal preparation procedure such that it will be completed before the first ingredient is depleted within the first container.

6. A method, comprising:
   receiving, by a processing device, image data comprising one or more image frames indicative of a state of a meal preparation area;
   determining, by the processing device, a first quantity of a first ingredient disposed within a first container based on the image data;
   segmenting the image data into regions associated with one or more containers;
   determining a first container location of the first container within the meal preparation area;
   identifying the first ingredient based at least in part on the first container location, wherein the first quantity is determined based at least in part on an identity of the first ingredient;
   determining that the first container moved from a second container location to the first container location based on the image data;
   determining, by the processing device, a meal preparation procedure associated with the first ingredient based on the first quantity; and
   causing, by the processing device, a notification indicative of the meal preparation procedure to be displayed on a graphical user interface (GUI).

7. A method, comprising:
   receiving, by a processing device, image data comprising one or more image frames indicative of a state of a meal preparation area;
   determining, by the processing device, a first quantity of a first ingredient disposed within a first container based on the image data;
   determining a time duration indicative of an amount of time the first ingredient is disposed within the first container;
   determining the time duration exceeds an expiration time of the first ingredient disposed within the first container;
   determining, by the processing device, a meal preparation procedure associated with the first ingredient based on the first quantity and responsive to determining that the time duration exceeds an expiration time of the first ingredient; and
   causing, by the processing device, a notification indicative of the meal preparation procedure to be displayed on a graphical user interface (GUI).

8. A method, comprising:
   receiving, by a processing device, image data comprising one or more image frames indicative of a state of a meal preparation area;
   determining, by the processing device, a first quantity of a first ingredient disposed within a first container based on the image data;
   receiving second image data comprising one or more image frames indicative of a state of customer queue area;
   determining, by the processing device, a meal preparation procedure associated with the first ingredient based on the first quantity and the second image data; and
   causing, by the processing device, a notification indicative of the meal preparation procedure to be displayed on a graphical user interface (GUI).

9. A method, comprising:
   receiving, by a processing device, image data comprising one or more image frames indicative of a state of a meal preparation area;
   determining, by the processing device, a first quantity of a first ingredient disposed within a first container based on the image data;
   receiving, from a point of sale (POS) system, order data indicative of one of more pending meal orders; and
   determining, by the processing device, a meal preparation procedure associated with the first ingredient based on the first quantity and the order data; and
   causing, by the processing device, a notification indicative of the meal preparation procedure to be displayed on a graphical user interface (GUI).

10. A system comprising:
    a first camera to capture image data comprising one or more image frames of a first field of view of a meal preparation area, the one or more image frames indicative of a current state of the meal preparation area;
    a memory; and
    a processing device, coupled to the memory; to:
      receive, from the first camera, the image data;
      determine a first quantity of a first ingredient disposed within a first container based on the image data;

determine at least one of a depletion rate, a stock level, or a replenishment rate of the first ingredient based on the image data;

determine a meal preparation procedure associated with the first ingredient based on the first quantity and the at least one of the depletion rate, the stock level, or the replenishment rate; and cause an indication associated with the meal preparation procedure to be displayed on a graphical user interface (GUI).

11. The system of claim 10, wherein the first camera comprises a light detection and ranging (LIDAR) camera.

12. A system, comprising:

a first camera to capture image data comprising one or more image frames of a first field of view of a meal preparation area, the one or more image frames indicative of a current state of the meal preparation area;

a second camera to capture second image data comprising one or more image frames indicative of a state of a customer queue area;

a memory; and a processing device, coupled to the memory; to:
receive, from the first camera, the image data;
receive, from the second camera, the second image data;
determine a first quantity of a first ingredient disposed within a first container based on the image data;
determine a meal preparation procedure associated with the first ingredient based on the first quantity and the second image data; and
cause an indication associated with the meal preparation procedure to be displayed on a graphical user interface (GUI).

13. A system, comprising:

a first camera to capture image data comprising one or more image frames of a first field of view of a meal preparation area, the one or more image frames indicative of a current state of the meal preparation area;

a point of sale system;

a memory; and a processing device, coupled to the memory; to:
receive, from the first camera, the image data;
receive, from the point of sale (POS) system, order data indicative of one or more pending meal orders;
determine a first quantity of a first ingredient disposed within a first container based on the image data;
determine a meal preparation procedure associated with the first ingredient based on the first quantity and the order data; and
cause an indication associated with the meal preparation procedure to be displayed on a graphical user interface (GUI).

14. A method, comprising:

receiving, by a processing device from a depth sensor, ranging data indicative of a current state of a meal preparation area, wherein the ranging data indicates a depth of a first ingredient disposed within a first container;

determining, by the processing device, a first quantity of the first ingredient disposed within the first container based on the ranging data;

determining, by the processing device, a meal preparation procedure associated with the first ingredient based on the first quantity; and causing, by the processing device, a notification indicative of the meal preparation procedure to be displayed on a graphical user interface (GUI).

15. The method of claim 14, further comprising:

identifying the first ingredient within the first container based on the ranging data.

16. The method of claim 14, further comprising:

determining that the first container moved from a first location to a second location within the meal preparation area based on the ranging data.

17. The method of claim 14, further comprising:

determining a second quantity indicative of an amount of the first ingredient removed from the first container associated with a meal preparation action.

18. The method of claim 14, wherein the depth sensor comprises a light detection and ranging (LIDAR) camera.

19. A method, comprising:

receiving, by a processing device from a depth sensor, ranging data indicative of a current state of a meal preparation area;

determining, by the processing device, a first quantity of a first ingredient disposed within a first container based on the ranging data;

segmenting the ranging data into regions associated with one or more containers; and determining a first container location of the first container within the meal preparation area based on the segmented ranging data;

identifying the first ingredient within the first container based on the first container location;

determining, by the processing device, a meal preparation procedure associated with the first ingredient based on the first quantity an identity of the first ingredient; and causing, by the processing device, a notification indicative of the meal preparation procedure to be displayed on a graphical user interface (GUI).

* * * * *